(12) United States Patent
Kitagawa et al.

(10) Patent No.: US 10,421,264 B2
(45) Date of Patent: Sep. 24, 2019

(54) METHOD OF PRODUCING ROLL OF LAMINATE STRIP WITH POLARIZING FILM

(75) Inventors: Takeharu Kitagawa, Ibaraki (JP); Takuya Nakazono, Ibaraki (JP); Shusaku Goto, Ibaraki (JP); Minoru Miyatake, Ibaraki (JP); Tomohiro Mori, Ibaraki (JP); Takashi Kamijo, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 1551 days.

(21) Appl. No.: 13/224,063

(22) Filed: Sep. 1, 2011

(65) Prior Publication Data

US 2012/0055608 A1    Mar. 8, 2012

(30) Foreign Application Priority Data

Sep. 3, 2010   (JP) .................................. 2010-197413
May 13, 2011   (JP) .................................. 2011-108630

(51) Int. Cl.
  *B32B 41/00*    (2006.01)
  *B26D 11/00*    (2006.01)
  (Continued)

(52) U.S. Cl.
  CPC .............. *B32B 41/00* (2013.01); *B26D 1/151* (2013.01); *G02B 5/3033* (2013.01); *B26D 11/00* (2013.01); *B32B 2457/20* (2013.01)

(58) Field of Classification Search
  CPC ....... B02B 5/3033; B26D 1/151; B32B 38/10; B32B 41/00
  (Continued)

(56) References Cited

U.S. PATENT DOCUMENTS 3,536,550 A * 10/1970 Hofe .............................. 156/64
3,762,250 A    10/1973 Huskey
(Continued)

FOREIGN PATENT DOCUMENTS

JP    02-256002      10/1990
JP    H10-40004 A    2/1998
(Continued)

OTHER PUBLICATIONS

H.W. Siesler; Rheo-Optical Fourier-Transform Infared Spectroscopy; Advanced Polymeric Science; 1984; pp. 9-15.
(Continued)

*Primary Examiner* — Mark A Osele
*Assistant Examiner* — Christopher C Caillouet
(74) *Attorney, Agent, or Firm* — Hauptman Ham, LLP

(57) ABSTRACT

A method of producing a roll of an optical film laminate strip includes the steps of: forming an optical film laminate which includes an optical film having a continuous web of polarizing film, and a resin film bonded to the optical film; creating a reference mark to extend across the optical film laminate in a width direction thereof; performing a defect inspection for detecting a defect existing in the optical film, and, when a defect is detected, recording a position of the defect in the form of a laminate widthwise position and a laminate lengthwise position as measured from the reference mark; cutting the optical film laminate along a direction parallel to the length direction to form a plurality of continuous webs of laminate strips; based on the widthwise position of the defect detected by the defect inspection, determining which of the cut laminate strips has the defect, and, with respect to a specific laminate strip which is determined to have the defect, storing information about the defect together with identification information for identify- (Continued)

ing the specific laminate strip; and winding each of the laminate strips into a roll.

15 Claims, 36 Drawing Sheets

(51) Int. Cl.
*B26D 1/15* (2006.01)
*G02B 5/30* (2006.01)

(58) Field of Classification Search
USPC ......... 156/64, 250, 252, 256, 259, 264, 269, 156/270, 271
See application file for complete search history.

(56) References Cited

U.S. PATENT DOCUMENTS

| | | | |
|---|---|---|---|
| 4,659,523 A | 4/1987 | Rogers et al. | |
| 4,895,769 A * | 1/1990 | Land | G02B 1/08 264/1.34 |
| 6,072,566 A | 6/2000 | Fujii et al. | |
| 6,188,451 B1 | 2/2001 | Fujii et al. | |
| 7,413,766 B2 | 8/2008 | Satake et al. | |
| 7,759,442 B2 | 7/2010 | Okada et al. | |
| 7,781,068 B2 | 8/2010 | Nakamura et al. | |
| 8,016,965 B2 | 9/2011 | Nakazono et al. | |
| 8,248,558 B2 | 8/2012 | Kimura et al. | |
| 8,259,263 B2 | 9/2012 | Kimura et al. | |
| 8,277,587 B2 | 10/2012 | Kimura et al. | |
| 8,404,334 B2 | 3/2013 | Kimura et al. | |
| 8,491,737 B2 | 7/2013 | Kimura et al. | |
| 8,500,937 B2 | 8/2013 | Kitada et al. | |
| 2002/0154307 A1* | 10/2002 | Bjork | 356/430 |
| 2003/0137732 A1* | 7/2003 | Sugino | B29C 55/04 359/487.01 |
| 2004/0012851 A1 | 1/2004 | Sato et al. | |
| 2005/0073633 A1 | 4/2005 | Satake et al. | |
| 2005/0199337 A1* | 9/2005 | Nishikubo et al. | 156/247 |
| 2005/0264904 A1 | 12/2005 | Sato et al. | |
| 2007/0128370 A1 | 6/2007 | Takada et al. | |
| 2008/0233312 A1 | 9/2008 | Nakamura et al. | |
| 2008/0274272 A1 | 11/2008 | Satake et al. | |
| 2009/0207491 A1* | 8/2009 | Takebe et al. | 359/500 |
| 2009/0257003 A1 | 10/2009 | Yoshihara et al. | |
| 2009/0263608 A1 | 10/2009 | Kitada et al. | |
| 2010/0033443 A1 | 2/2010 | Hashimoto | |
| 2010/0186890 A1 | 7/2010 | Kitada et al. | |
| 2010/0202051 A1 | 8/2010 | Yoshimi et al. | |
| 2010/0283943 A1 | 11/2010 | Kimura et al. | |
| 2010/0288420 A1* | 11/2010 | Kimura et al. | 156/64 |
| 2010/0288432 A1 | 11/2010 | Kitada et al. | |
| 2010/0304135 A1 | 12/2010 | Okada et al. | |
| 2010/0316817 A1 | 12/2010 | Kimura et al. | |
| 2011/0061801 A1 | 3/2011 | Kitada et al. | |
| 2011/0083791 A1 | 4/2011 | Nakazono et al. | |
| 2012/0160420 A1 | 6/2012 | Kimura et al. | |
| 2012/0180930 A1 | 7/2012 | Kimura et al. | |
| 2012/0211167 A1 | 8/2012 | Kimura et al. | |
| 2012/0216937 A1 | 8/2012 | Kimura et al. | |
| 2014/0043292 A1 | 2/2014 | Hashimoto | |
| 2015/0177888 A1 | 6/2015 | Hashimoto | |
| 2016/0147374 A1 | 5/2016 | Hashimoto | |
| 2017/0102819 A1 | 4/2017 | Hashimoto | |
| 2017/0371482 A1 | 12/2017 | Hashimoto | |

FOREIGN PATENT DOCUMENTS

| | | |
|---|---|---|
| JP | H1090675 A | 4/1998 |
| JP | 2000-338329 | 12/2000 |
| JP | 2001-343521 | 12/2001 |
| JP | 2002-156920 A | 5/2002 |
| JP | 2002-258269 | 9/2002 |
| JP | 2003-043257 | 2/2003 |
| JP | 2003043257 A | 2/2003 |
| JP | 2003248123 A | 9/2003 |
| JP | 2003279748 A | 10/2003 |
| JP | 2004029852 A | 1/2004 |
| JP | 2004-078143 | 3/2004 |
| JP | 2004-338379 | 12/2004 |
| JP | 2005-114624 | 4/2005 |
| JP | 2005114624 A | 4/2005 |
| JP | 2005-248173 | 9/2005 |
| JP | 2007-171892 | 7/2007 |
| JP | 2008-129293 A | 6/2008 |
| JP | 4149200 B2 | 9/2008 |
| JP | 2009-75473 A | 4/2009 |
| JP | 2009-093074 A | 4/2009 |
| JP | 2009-282424 A | 12/2009 |
| JP | 2010-015045 A | 1/2010 |
| JP | 2010-39816 A | 2/2010 |
| JP | 2010113357 A | 4/2010 |
| JP | 2010-151910 A | 7/2010 |
| JP | 4503692 B1 | 7/2010 |
| JP | 2010-191479 A | 9/2010 |
| JP | 2011-002759 | 1/2011 |
| KR | 10-2010-0084167 A | 7/2010 |
| TW | 200932527 A | 8/2009 |
| TW | 201009444 A | 3/2010 |
| WO | 2007/119560 A1 | 10/2007 |
| WO | 2009/128241 | 10/2009 |
| WO | 2009128241 A1 | 10/2009 |

OTHER PUBLICATIONS

European Search Report for EP11179967 dated May 3, 2012, citing the above reference(s).
Office Action dated Feb. 10, 2016 regarding Japanese Patent Application No. 2015-096083, citing the above reference(s).
Japanese Office Action dated Mar. 6, 2017 for Japanese Application No. 2016-116424, citing the above reference(s).
Indian Examination Report dated Oct. 17, 2017 from Intellectual Property India in connection with the counterpart Indian Patent Application No. 2522/DEL/2011, citing the above reference(s).
Japanese Office Action dated Nov. 6, 2017 from JPO in connection with the counterpart Japanese Patent Application No. 2016-254161, citing the above reference(s).
Japanese Office Action dated Dec. 4, 2017 for corresponding Japanese Patent Application No. 2016-116424.

* cited by examiner

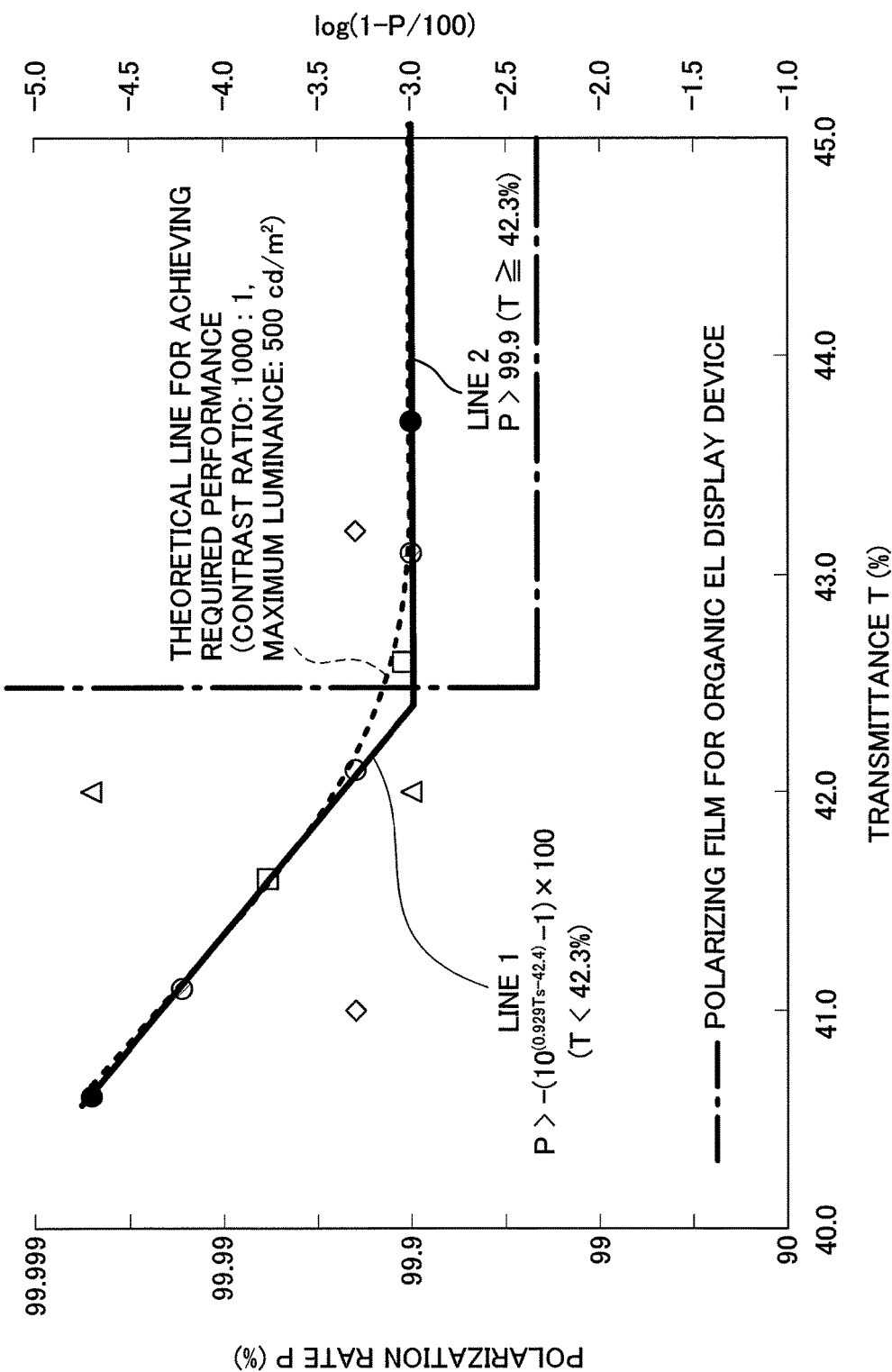

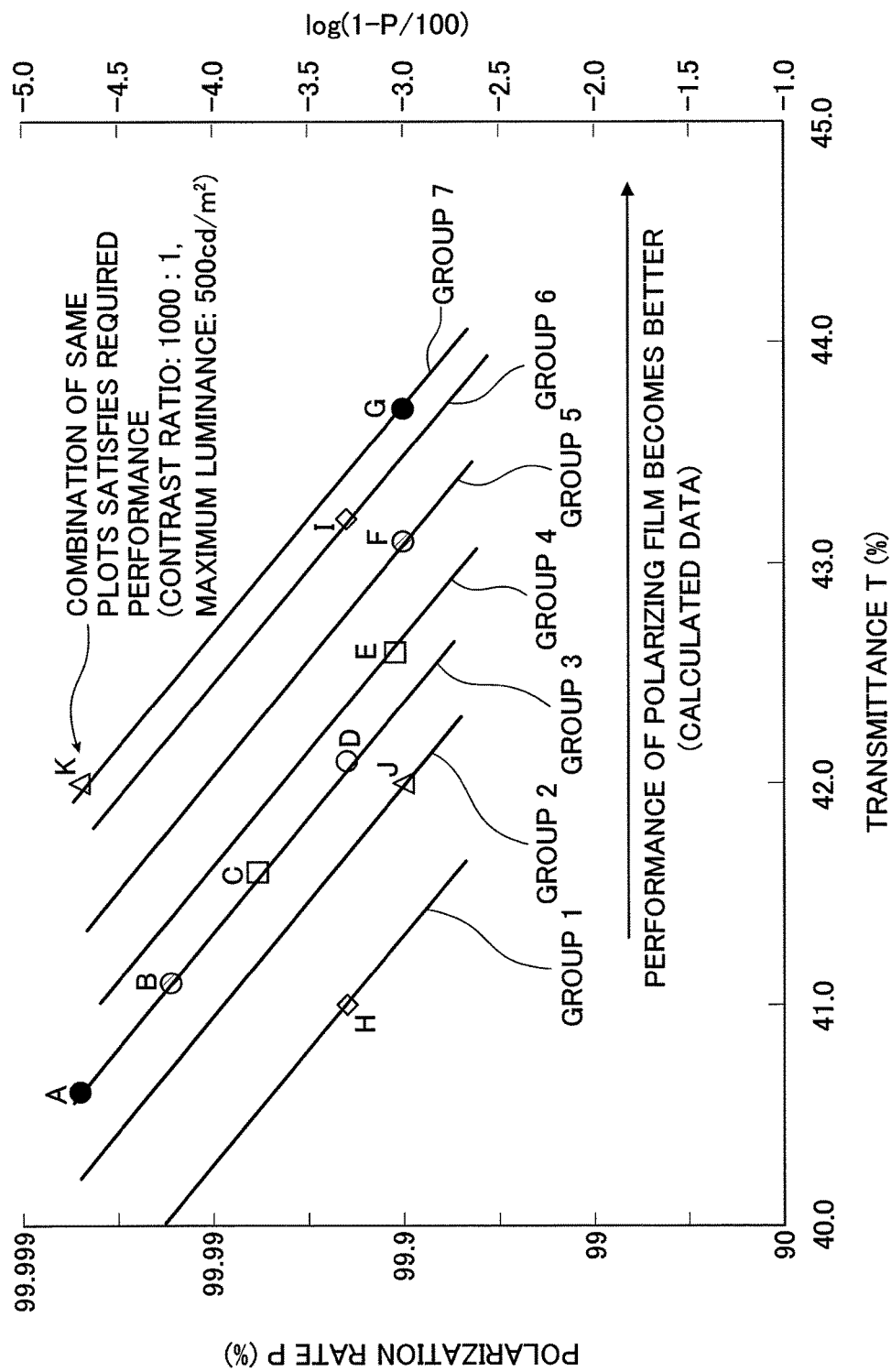

FIG.6

| CONDITIONS | IODINE CONCENTRATION OF DYEING BATH (wt%) | | | | | |
|---|---|---|---|---|---|---|
| | 0.10 | 0.15 | 0.20 | 0.25 | 0.30~ |
| EVALUATION RESULT | × DISSOLUTION OF PVA IN DYEING BATH | × DISSOLUTION OF PVA IN DYEING BATH | × DISSOLUTION OF PVA IN DYEING BATH | × DISSOLUTION OF PVA IN DYEING BATH | ○ NO DISSOLUTION OF PVA |

<DETAILS OF TEST>

※RESIN SUBSTRATE : ISOPHTHALIC ACID-COPOLYMERIZED PET

※THICKNESS OF PVA TYPE RESIN LAYER : 7 μm

※CONDITIONS OF ELEVATED TEMPERATURE IN-AIR STRETCHING : 130°C, 1.8

※FIRST INSOLUBILIZATION STEP : WITHOUT

※DYEING STEP : SOLUTION TEMPERATURE = 30°C, IODINE CONCENTRATION = 0.1 wt% to 1.0 wt%

※CROSS-LINKING STEP INCLUDING SECOND INSOLUBILIZATION : WITH

※CONDITIONS OF IN-BORIC-ACID -SOLUTION STRETCHING : 75°C, 3.3

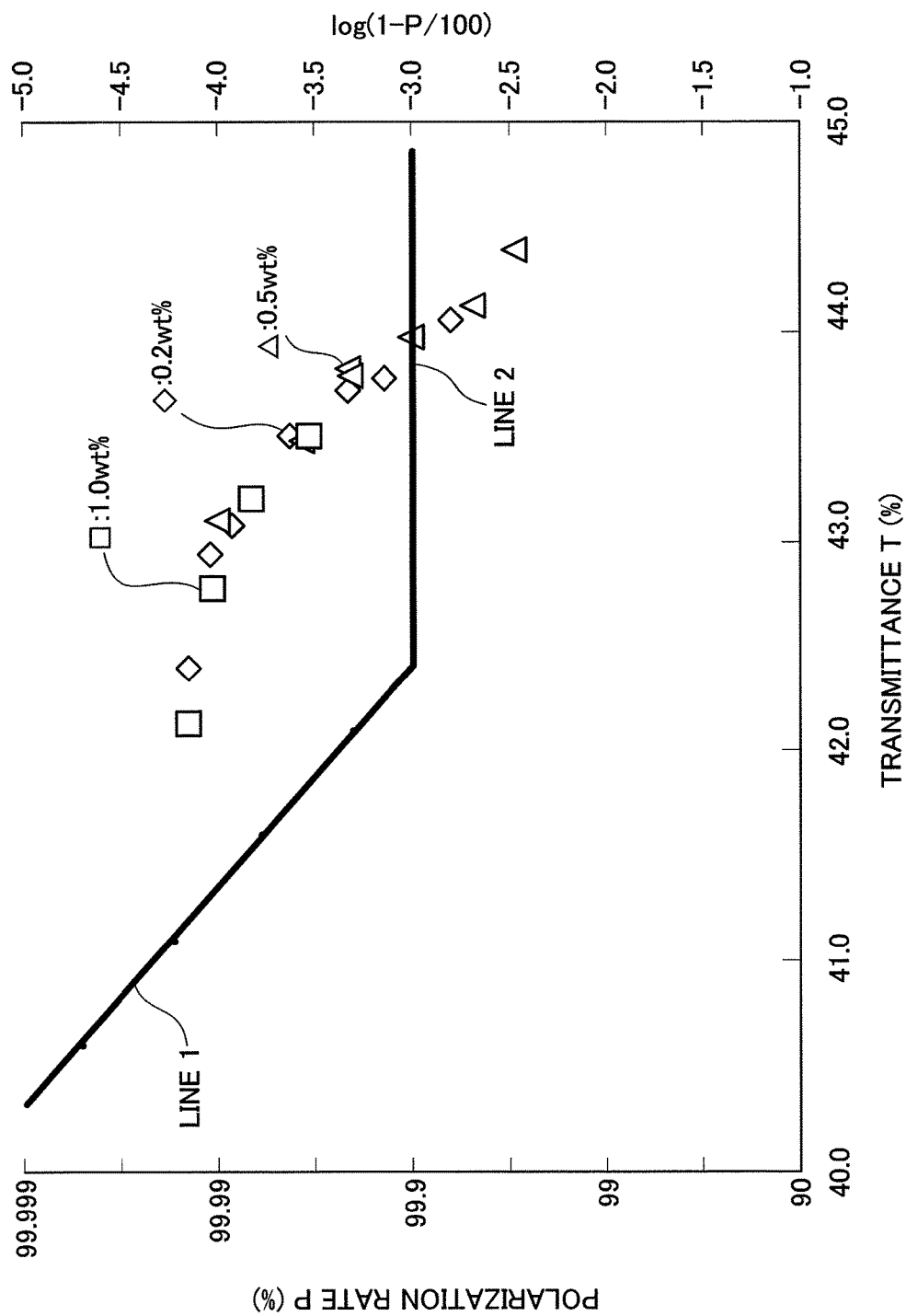

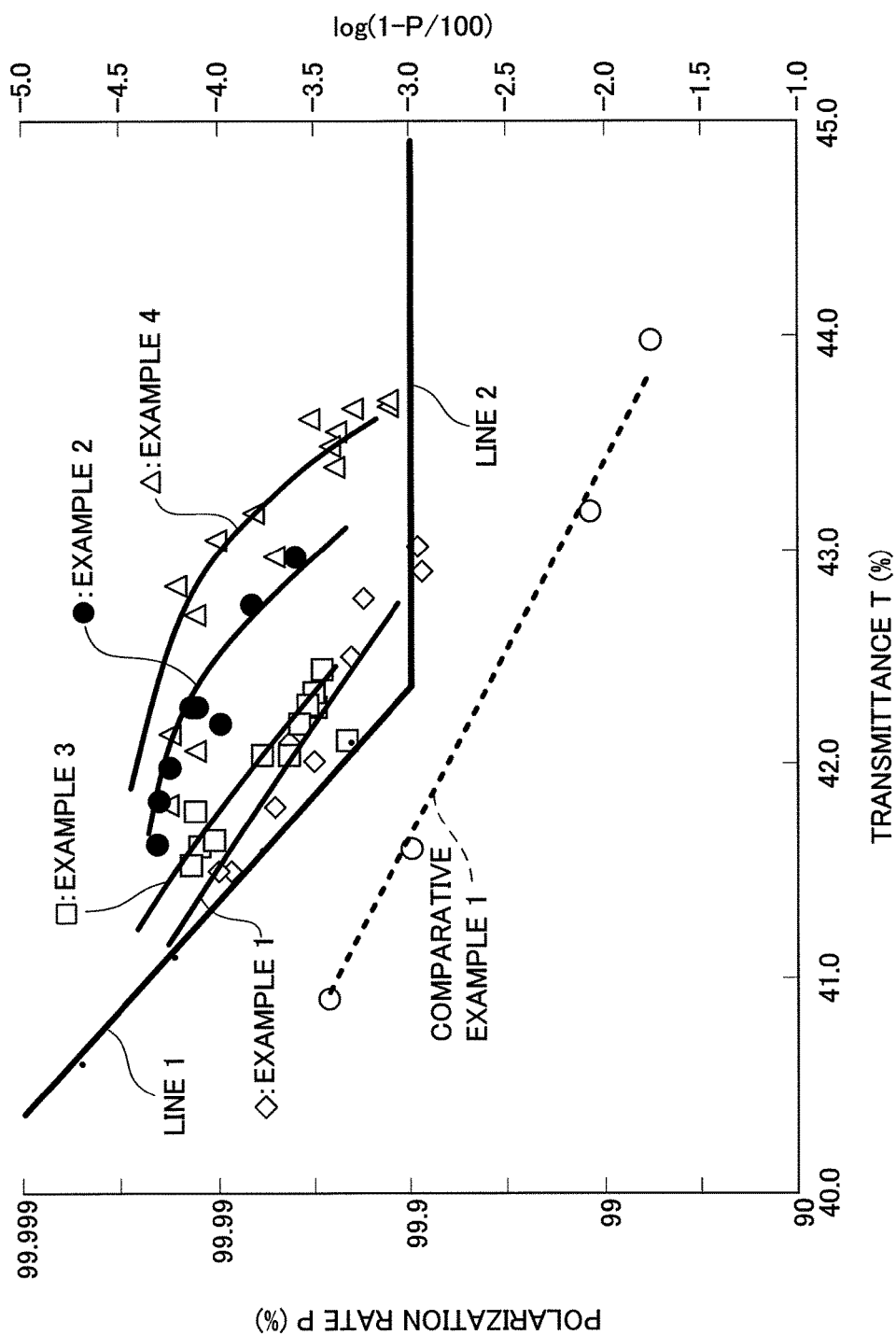

FIG. 27

| EXAMPLE NO. | PURPOSE | COPOLYMERIZING MATERIAL WITH PET SUBSTRATE | PVA THICKNESS (μm) | ELEVATED TEMPERATURE IN-AIR STRETCHING TEMPERATURE (°C) | RATIO | PROCESS | REMAINING WIDTH RATE (%) | PVA THICKNESS (μm) | FIRST INSOLUBILIZATION STEP | IODINE CONCENTRATION IN DYEING STEP (wt%) | SECOND INSOLUBILIZATION STEP | IN-BORIC-ACID-SOLUTION STRETCHING TEMPERATURE (°C) | RATIO | TOTAL STRETCHING RATIO | POLARIZER THICKNESS (μm) |
|---|---|---|---|---|---|---|---|---|---|---|---|---|---|---|---|
| 1 | DIFFERENCE IN INSOLUBILIZATION | ISOPHTHALIC ACID | 7 | 130 | 1.8 | END-FREE | 65 | 5 | WITHOUT | 0.3 | WITHOUT | 65 | 3.3 | 5.94 | 3 |
| 2 | DIFFERENCE IN INSOLUBILIZATION | ISOPHTHALIC ACID | 7 | 130 | 1.8 | END-FREE | 65 | 5 | WITHOUT | 0.3 | WITH | 75 | 3.3 | 5.94 | 3 |
| 3 | STANDARD | ISOPHTHALIC ACID | 7 | 130 | 1.8 | END-FREE | 65 | 5 | WITH | 0.12-0.25 | WITHOUT | 65 | 3.3 | 5.94 | 3 |
| 4 | STANDARD | ISOPHTHALIC ACID | 7 | 130 | 1.8 | END-FREE | 65 | 5 | WITH | 0.12-0.25 | WITH | 75 | 3.3 | 5.94 | 3 |
| 5 | DIFFERENCE IN THICKNESS | ISOPHTHALIC ACID | 12 | 130 | 1.8 | END-FREE | 65 | 9 | WITH | 0.12-0.25 | WITH | 75 | 3.3 | 5.94 | 5 |
| 6 | DIFFERENCE IN SUBSTRATE | CHDM | 7 | 130 | 1.8 | END-FREE | 65 | 5 | WITH | 0.12-0.25 | WITH | 75 | 3.3 | 5.94 | 3 |
| 7 | DIFFERENCE IN STRETCHING RATIO FOR ELEVATED TEMPERATURE IN-AIR STRETCHING | ISOPHTHALIC ACID | 7 | 130 | 1.2 | END-FREE | 85 | 6 | WITH | 0.12-0.25 | WITH | 75 | 4.9 | 5.88 | 3 |
| 8 | DIFFERENCE IN STRETCHING RATIO FOR ELEVATED TEMPERATURE IN-AIR STRETCHING | ISOPHTHALIC ACID | 7 | 130 | 1.5 | END-FREE | 75 | 6 | WITH | 0.12-0.25 | WITH | 75 | 4.0 | 6.0 | 3 |
| 9 | DIFFERENCE IN STRETCHING RATIO FOR ELEVATED TEMPERATURE IN-AIR STRETCHING | ISOPHTHALIC ACID | 7 | 130 | 2.5 | END-FREE | 55 | 4 | WITH | 0.12-0.25 | WITH | 75 | 2.4 | 6.0 | 3 |
| 10 | DIFFERENCE IN STRETCHING TEMPERATURE FOR ELEVATED TEMPERATURE IN-AIR STRETCHING | ISOPHTHALIC ACID | 7 | 95 | 1.8 | END-FREE | 75 | 5 | WITH | 0.12-0.25 | WITH | 75 | 3.3 | 5.94 | 3 |

FIG. 28

| | | | | | | | | | | |
|---|---|---|---|---|---|---|---|---|---|---|
| 11 | DIFFERENCE IN STRETCHING TEMPERATURE FOR ELEVATED TEMPERATURE IN-AIR STRETCHING | ISOPHTHALIC ACID | 7 | 110 | 1.8 | END-FREE | 70 | 5 | WITH | 0.12-0.25 | WITH | 75 | 3.3 | 5.94 | 3 |
| 12 | | ISOPHTHALIC ACID | 7 | 150 | 1.8 | END-FREE | 65 | 5 | WITH | 0.12-0.25 | WITH | 75 | 3.3 | 5.94 | 3 |
| 13 | DIFFERENCE IN STRETCHING RATIO | ISOPHTHALIC ACID | 7 | 130 | 1.8 | END-FREE | 65 | 5 | WITH | 0.12-0.25 | WITH | 75 | 2.8 | 5.04 | 3 |
| 14 | | ISOPHTHALIC ACID | 7 | 130 | 1.8 | END-FREE | 65 | 5 | WITH | 0.12-0.25 | WITH | 75 | 3.1 | 5.58 | 3 |
| 15 | | ISOPHTHALIC ACID | 7 | 130 | 1.8 | END-FREE | 65 | 5 | WITH | 0.12-0.25 | WITH | 75 | 3.6 | 6.48 | 3 |
| 16 | DIFFERENCE IN STRETCHING RATIO FOR FIXED-END STRETCHING | ISOPHTHALIC ACID | 7 | 130 | 1.8 | END-FIXED | 100 | 4 | WITH | 0.12-0.25 | WITH | 75 | 3.3 | 5.94 | 2 |
| 17 | | ISOPHTHALIC ACID | 7 | 130 | 1.8 | END-FIXED | 100 | 4 | WITH | 0.12-0.25 | WITH | 75 | 3.9 | 7.02 | 2 |
| 18 | | ISOPHTHALIC ACID | 7 | 130 | 1.8 | END-FIXED | 100 | 4 | WITH | 0.12-0.25 | WITH | 75 | 4.4 | 7.92 | 2 |

FIG. 29

| EXAMPLE NO. | COPOLYMERIZING MATERIAL WITH PET SUBSTRATE | ELEVATED TEMPERATURE IN-AIR STRETCHING | | PET ORIENTATION FUNCTION |
| --- | --- | --- | --- | --- |
| | | TEMPERATURE (°C) | RATIO | |
| EXAMPLE 1 | ISOPHTHALIC ACID | 130 | 1.8 | 0.02 |
| EXAMPLE 2 | ISOPHTHALIC ACID | 130 | 1.8 | 0.01 |
| EXAMPLE 3 | ISOPHTHALIC ACID | 130 | 1.8 | 0.01 |
| EXAMPLE 4 | ISOPHTHALIC ACID | 130 | 1.8 | 0.01 |
| EXAMPLE 5 | ISOPHTHALIC ACID | 130 | 1.8 | 0.01 |
| EXAMPLE 6 | CHDM | 130 | 1.8 | 0.01 |
| EXAMPLE 7 | ISOPHTHALIC ACID | 130 | 1.2 | 0.01 |
| EXAMPLE 8 | ISOPHTHALIC ACID | 130 | 1.5 | 0.01 |
| EXAMPLE 9 | ISOPHTHALIC ACID | 130 | 2.5 | 0.01 |
| EXAMPLE 10 | ISOPHTHALIC ACID | 95 | 1.8 | 0.10 |
| EXAMPLE 11 | ISOPHTHALIC ACID | 110 | 1.8 | 0.05 |
| EXAMPLE 12 | ISOPHTHALIC ACID | 150 | 1.8 | 0.01 |
| EXAMPLE 13 | ISOPHTHALIC ACID | 130 | 1.8 | 0.01 |
| EXAMPLE 14 | ISOPHTHALIC ACID | 130 | 1.8 | 0.01 |
| EXAMPLE 15 | ISOPHTHALIC ACID | 130 | 1.8 | 0.01 |
| EXAMPLE 16 | ISOPHTHALIC ACID | 130 | 1.8 | 0.01 |
| EXAMPLE 17 | ISOPHTHALIC ACID | 130 | 1.8 | 0.01 |
| EXAMPLE 18 | ISOPHTHALIC ACID | 130 | 1.8 | 0.01 |

| REFERENCE SAMPLE No. | THERMOPLASTIC RESIN SUBSTRATE | ELEVATED TEMPERATURE IN-AIR STRETCHING | | PET ORIENTATION FUNCTION |
| --- | --- | --- | --- | --- |
| | | TEMPERATURE (°C) | RATIO | |
| REFERENCE SAMPLE 1 | CRYSTALLIZABLE PET | 110 | 4.0 | 0.51 |
| REFERENCE SAMPLE 2 | CRYSTALLIZABLE PET | 100 | 4.5 | 0.78 |
| REFERENCE SAMPLE 3 | CRYSTALLIZABLE PET | 90 | 4.5 | 0.79 |

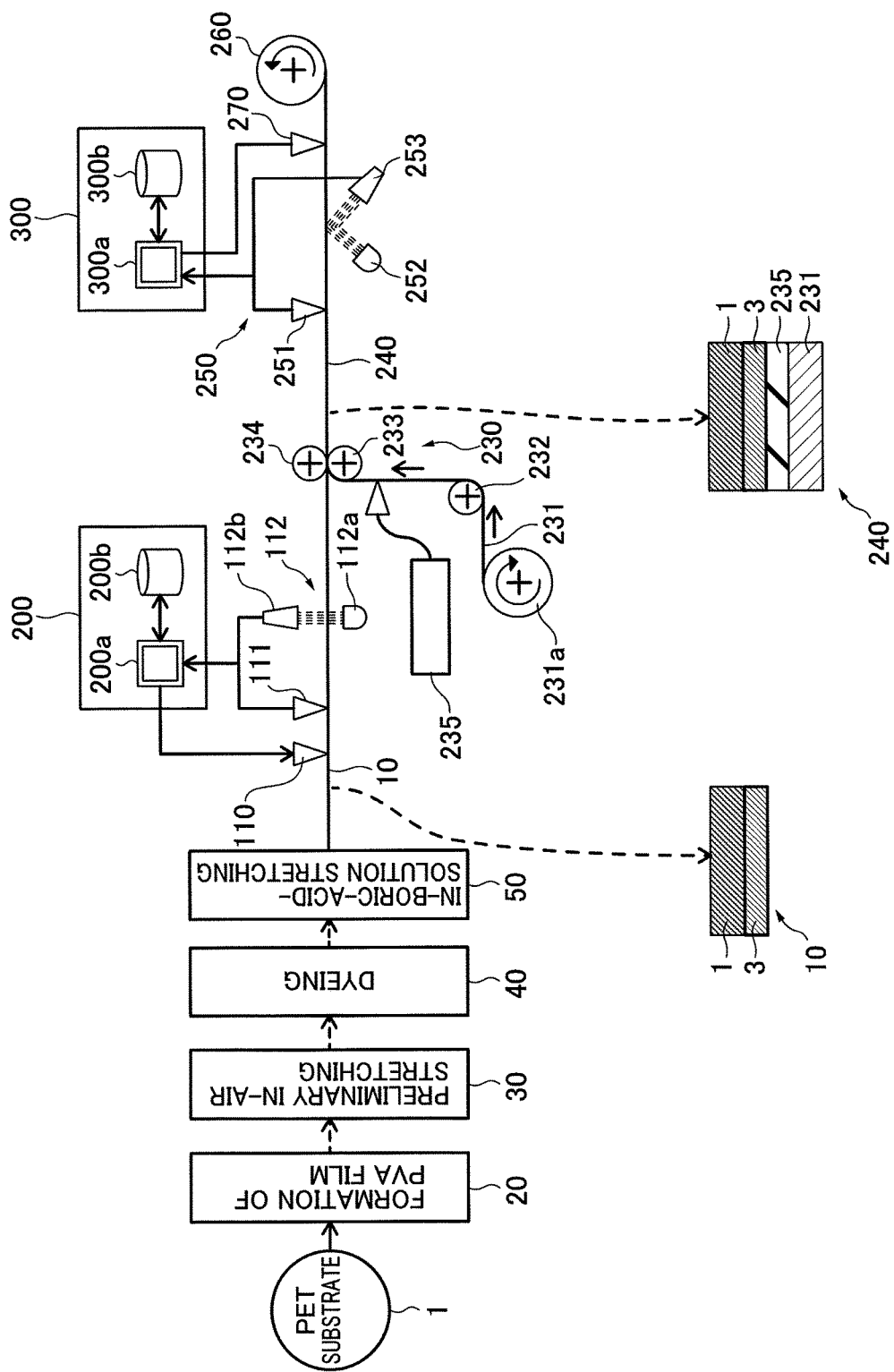

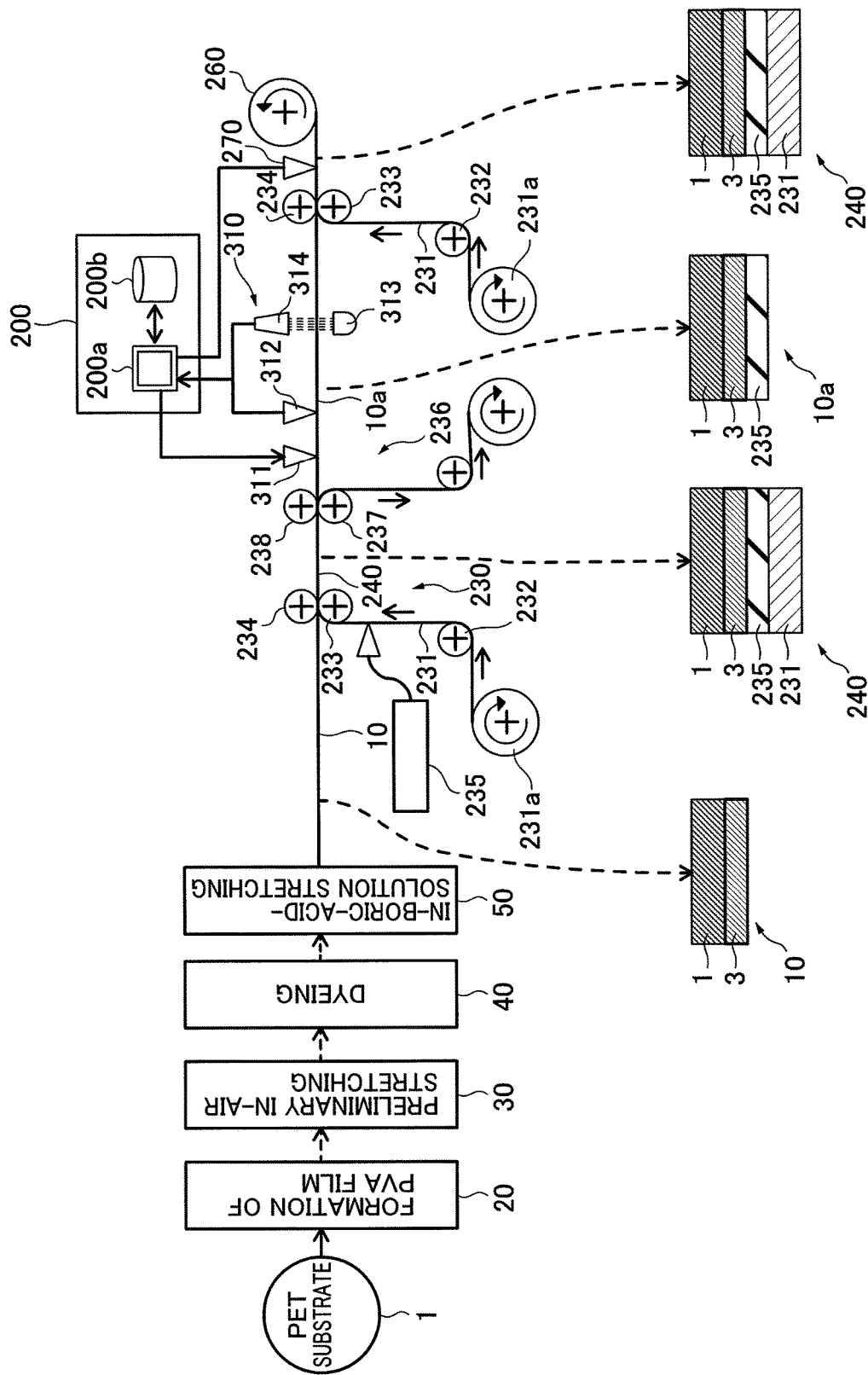

METHOD OF PRODUCING ROLL OF LAMINATE STRIP WITH POLARIZING FILM

CROSS REFERENCE TO RELATED APPLICATION

This application claims the priority of Japanese Patent Application No. 2010-197413 filed on Sep. 3, 2010, and Japanese Patent Application No. 2011-108630 filed on May 13, 2011 in the JPO (Japan Patent Office), the disclosure of which is incorporated herein in their entirety by reference.

TECHNICAL FIELD

The present invention relates to a method of producing a roll of a laminate strip with a polarizing film. In particular, the present invention relates to a method of producing a roll of a laminate strip formed from an optical film laminate including a polarizing film preliminarily subjected to a defect inspection. More specifically, the present invention is suited for, but not limited to use in, the production of a roll of a laminate strip with a thin polarizing film having a thickness of 10 μm or less.

BACKGROUND ART

There has been widely known a method in which a single layer made of a polyvinyl alcohol type resin (hereinafter referred to as "PVA type resin") formed in a film shape is subjected to dyeing and stretching to produce a polarizing film comprising a PVA type resin layer, wherein molecules of the PVA type resin are oriented in the direction of the stretching, and a dichroic material is absorbed (impregnated) in the PVA type resin in a molecularly oriented state. The thickness of a polarizing film to be obtained by the above conventional method using a PVA type resin single-layer film is in the range of about 15 to 35 μm. The conventional method makes it possible to obtain a polarizing film having the following optical characteristics of a single layer transmittance of 42% or more and a polarization rate of 99.95% or more. Currently, polarizing films produced by the conventional method are used in optical display devices for televisions, mobile phones, personal digital assistants, and other appliances.

However, since the PVA type resins are hydrophilic and highly hygroscopic, a polarizing film produced using a PVA type resin is sensitive to changes in temperature and humidity, and more likely to expand and contract due to changes in surrounding environments, which is liable to cause the occurrence of crack. Moreover, the expansion and contraction caused by environmental changes during use will produce stress in an adjacent member to which the polarizer film is joined, and thereby cause deformation, such as warp, in the adjacent member.

Thus, in order to suppress expansion and contraction of a polarizer film to reduce the impact of temperature and humidity, it is usual to employ, as a polarizing film for televisions, an optical film laminate prepared by laminating a triacetylcellulose (TAC) film having a thickness of 40 to 80 μm and serving as a protection film, on each of opposite surfaces of a polarizing film. However, even in such a structure, in cases where a single-layer polarizing film is used therein, there is a limit to thinning of the polarizing film. Thus, expansion and contraction forces of the polarizing film become unignorable, and it is difficult to completely suppress the influence of expansion and contraction of the polarizing film, so that a certain level of expansion and contraction will inevitably occur in the optical film laminate including the polarizing film. If expansion or contraction occurs in such an optical film laminate including a polarizing film, stress arising from the expansion or contraction will cause deformation, such as warp, in an adjacent member. This deformation, even if it is small, leads to the occurrence of non-uniformity of display in a liquid-crystal display device. Thus, in order to suppress the occurrence of non-uniformity of display, it is necessary to make design considerations, for example, to carefully select the material for each member to be used in the optical film laminate including the polarizing film. Further, the contraction stress of the polarizing film will cause peeling or the like of the optical film laminate from a liquid-crustal panel. Thus, a high-adhesion adhesive is required to join the optical film laminate to the liquid-crystal display panel. However, the use of such a high-adhesion adhesive gives rise to a problem of difficulty in re-working which is an operation of, when the presence of an optical defect is found in a polarizing film of an optical film laminate laminated to a liquid-crystal display panel through a subsequent inspection, peeling the optical film laminate from the liquid-crystal display panel and laminating another optical film laminate to the liquid-crystal display panel. This is a technical problem in a polarizing film to be obtained by the conventional method using a PVA type resin single-layer formed in a film shape.

Thus, there is a need for a new polarizing film production method, as an alternative to the conventional polarizing film production method using a PVA type resin single-layer, and being incapable of achieving a sufficient level of thinning of a polarizing film due to the above problem. Specifically, it is virtually impossible to produce a polarizing film having a thickness of 10 μm or less by the conventional method using a PVA type resin single-layer formed in a film shape. This is because, in producing a polarizing film using a film-shaped PVA type resin single-layer, if the thickness of the PVA type resin single-layer is excessively reduced, dissolution and/or breaking is likely to occur in a PVA type resin layer in a dyeing step and/or a stretching step, which makes it impossible to form a polarizing film having a uniform thickness.

In order to cope with this problem, there has been proposed a method designed such that a PVA type resin layer is applied and formed on a thermoplastic resin substrate, and the PVA type resin layer formed on the resin substrate is stretched together with the resin substrate, and subjected to dyeing, so as to produce a polarizing film significantly thinner than the polarizing film obtained by the conventional method. This polarizing film production method using a thermoplastic resin substrate is noteworthy in that it provides a possibility of producing a polarizing film more uniformly than the polarizing film production method using a PVA type resin single-layer.

For example, Japanese Patent JP 4279944B (Patent Document 1) discloses a polarizing plate production method which comprises steps of forming a polyvinyl alcohol resin layer having a thickness of 6 μm to 30 μm, on one of opposite surfaces of a thermoplastic resin film by a coating process, stretching the polyvinyl alcohol resin layer at a stretching ratio of 2 to 5 in such a manner that the polyvinyl alcohol resin layer is formed as a transparent coating element layer to thereby form a composite film consisting of two layers including the thermoplastic resin film and the transparent coating element layer; laminating an optical transparent resin film layer on the side of the transparent coating element layer of the composite film consisting of the two layers, through a bonding agent, peeling and removing the thermoplastic resin film, and dyeing and fixing the transparent coating element layer in such a manner that the transparent coating element layer is formed as a polarizing element layer. A polarizing plate to be obtained by this method has a two-layer structure consisting of the optical transparent resin film layer and the polarizing element layer. According to the description of the Patent Document 1, the polarizing element has a thickness of 2 to 4 µm.

The method disclosed in the Patent Document 1 is designed to perform stretching under an elevated temperature by a uniaxial stretching process, wherein the stretching ratio is restricted to the range of 2 to 5, as mentioned above. As for the reason why the stretching ratio is restricted to 5 or less, the Patent Document 1 explains that stretching at a high stretching ratio of greater than 5 makes it extremely difficult to maintain stable production. Specifically, there is described that the ambient temperature during stretching is set to 55° C. in cases where ethylene-vinyl acetate copolymer is used as the thermoplastic resin film, to 60° C. in cases where non-stretched polypropylene is used as the thermoplastic resin film, or to 70° C. in cases where non-stretched nylon is used as the thermoplastic resin film. The method disclosed in the Patent Document 1 employs a uniaxial stretching process in air under an elevated temperature. Further, as described in the Patent Document 1, the stretching ratio is restricted to 5 times or less. Thus, a polarizing film having an extremely small thickness of 2 to 4 µm, to be obtained by this method, is not enough to satisfy optical characteristics desired for a polarizing film to be used, for example, in an optical display device such as a liquid-crystal television, or an optical display device using an organic EL display element.

The method of forming a polarizing film with steps of forming a PVA type resin layer on a thermoplastic resin substrate by a coating process, and stretching the PVA type resin layer together with the substrate is also disclosed in Japanese Patent Laid-Open Publication JP 2001-343521A (Patent Document 2) and Japanese Patent Laid-Open Publication JP 2003-043257A (Patent Document 3). The methods disclosed in the Patent Documents 2 and 3 are designed such that a laminate consisting of a thermoplastic resin substrate and a PVA type resin layer applied on the substrate is subjected to uniaxial stretching at a temperature of 70° C. to 120° C., in cases where the substrate is made of a non-crystallizable polyester resin. Then, the PVA type resin layer molecularly oriented by the stretching is subjected to dyeing to allow a dichroic material to be impregnated therein. In the Patent Document 2, there is described that the uniaxial stretching may be longitudinal uniaxial stretching or may be transverse uniaxial stretching. Differently, in the Patent Document 3, a method is described in which transverse uniaxial stretching is performed, and, during or after the transverse uniaxial stretching, contracting the length in the direction perpendicular to the direction of the stretching by a specific amount. In both of the Patent Documents 2 and 3, there is described that the stretching ratio is typically set to about 4 to 8. Further, there is described that the thickness of a polarizing film to be obtained is in the range of 1 to 1.6 µm.

In the Patent Documents 2 and 3, although there is described that the stretching ratio is typically set to 4 to 8, since the Patent Documents 2 and 3 adopt an elevated temperature in-air stretching process, it is considered that the stretching ratio is limited to 5 as described, for example, in the Patent Document 1. None of the Patent Documents 2 and 3 describes a specific technique for achieving a stretching ratio of greater than 5 by the elevated temperature in-air stretching process. In fact, in Examples described in the Patent Documents 2 and 3, only a stretching ratio of 5 and a stretching ratio of 4.5 are described, respectively, in the Patent Document 2 and the Patent Document 3. Through additional tests on the methods disclosed in the Patent Documents 2 and 3, the inventors of the present invention have ascertained that it is impossible to adequately perform stretching at a stretching ratio of greater than 5 by the methods disclosed therein. Therefore, it should be understood that only a stretching ratio of 5 times or less is substantially disclosed in the Patent Documents 2 and 3. As with the Patent Document 1, the polarizing film to be obtained by the method disclosed in each of the Patent Documents 2 and 3 is not enough to satisfy optical characteristics desired for a polarizing film to be used, for example, in an optical display device such as a liquid-crystal television.

U.S. Pat. No. 4,659,523 (Patent Document 4) discloses a polarizing film production method which comprises subjecting a PVA type resin layer coated on a polyester film to uniaxial stretching together with the polyester film. This method disclosed in the Patent Document 4 is intended to form the polyester film serving as a substrate of the PVA type resin layer in such a manner as to have optical characteristics allowing the polyester film to be used together with a polarizing film, but it is not intended to produce a polarizing film comprising a PVA type resin layer and having a small thickness and excellent optical characteristic. Specifically, the method disclosed in the Patent Document 4 is no more than a technique of improving optical characteristics of a polyester resin film to be stretched together with a PVA type resin layer to be formed as a polarizing film. A polarizer material production method having the same object is also disclosed in Japanese Patent Publication JP 08-012296B (Patent Document 5).

LIST OF PRIOR ART DOCUMENTS

Patent Documents

Patent Document 1: Japanese Patent JP 4279944B
Patent Document 2: Japanese Laid-Open Patent Publication JP 2001-343521A
Patent Document 3: Japanese Laid-Open Patent Publication JP 2003-043257A
Patent Document 4: U.S. Pat. No. 4,659,523
Patent Document 5: Japanese Patent Publication JP 08-012296B
Patent Document 6: Japanese Laid-Open Patent Publication JP 2002-258269A
Patent Document 7: Japanese Laid-Open Patent Publication JP 2004-078143A
Patent Document 8: Japanese Laid-Open Patent Publication JP 2007-171892A
Patent Document 9: Japanese Laid-Open Patent Publication JP 2004-338379A
Patent Document 10: Japanese Laid-Open Patent Publication JP 2005-248173A
Patent Document 11: Japanese Laid-Open Patent Publication JP 2011-002759A Non-Patent Documents Non-Patent Document 1: H. W. Siesler, Advanced Polymeric Science, 65, 1, 1984

DISCLOSURE OF THE INVENTION

Problem to be Solved by the Invention

In any of the above conventional polarizing film production methods, a polarizing film is formed from a relatively wide material, and cut to a given width in accordance with the intended use. As means for this cutting, a conventionally adopted technique of cutting has been such that an original roll of a polarizing film having a substantial length into a plurality of rolls each having a given roll length. However, since there is a tendency the polarizing film is apt to be meandered and/or twisted when the film is being taken up into a roll, it is difficulty with this cutting procedure to perform cutting with satisfactory accuracy.

In addition, it is to be noted that a polarizing film generally includes defects caused by various factors, so that it may be a way to carry out a defect detecting inspection, prior to the polarizing film being wound into a roll, on the polarizing film to acquire information about existence of any defect. However, even if such information is acquired, there remains a problem relating to the manner of transmitting the information, such as, information on the location of the defect to the polarizing film which has been cut into a plurality of rolls.

As disclosed in the Patent Documents 1 to 5, a method has already been known in which a PVA type resin layer is formed on a thermoplastic resin substrate by a coating process, and the PVA type resin layer is stretched together with the thermoplastic resin substrate to produce a thin polarizing film. However, it has not been realized to obtain a highly-functional polarizing film usable in a display device satisfying the optical characteristics of a contrast ratio of 1000:1 or more, and a maximum luminance (brightness) of 500 cd/m$^2$ or more, which are required for a display device, typically, for liquid-crystal televisions, or a polarizing film having optical characteristics usable in an optical display device using an organic EL display element.

In order to cope with the above problems, it is a primary object of the present invention to provide a method capable of accurately cutting a wide-width polarizing film into a strip having a given width and reliably establishing the relationship between defect information acquired by a defect inspection before the cutting and the strip after the cutting.

Further, through extensive efforts, the inventors have successfully developed an optical display device comprising a polarizing film which has a significantly small thickness as compared with conventional polarizing films and exhibits required optical characteristics. It is another object of the present invention to provide a method of, using the newly developed polarizing film, producing a roll of a laminate strip with a polarizing film, which is suitable for production of optical display devices.

Means for Solving the Problem

The present invention provides a method of producing a roll of an optical film laminate strip, the method comprising a step of forming an optical film laminate which comprises an optical film having at least a continuous web of polarizing film, and a resin film bonded to the optical film. In one aspect of the present invention, the optical film laminate formed in this way is provided with a reference mark extending across the optical film laminate in a widthwise direction thereof substantially throughout its width, in a continuous line pattern or a doted pattern consisting of a plurality of dots, while feeding the optical film laminate in a lengthwise direction thereof. Then, in an inspection step, a defect inspection is carried out for detecting any defect existing in the optical film laminate while feeding the optical film laminate in the lengthwise direction, and, when a defect is detected, the position of the defect is recorded in terms of a laminate widthwise position and a laminate lengthwise position as measured from the reference mark. Then, the optical film laminate is cut along a direction parallel to the lengthwise direction to form a plurality of continuous webs of laminate strips each having a given width. Thereafter, based on the widthwise position of the defect detected by the defect inspection, one of the cut laminate strips is determined as having the defect, and, with respect to the specific one of the laminate strips which is determined to have the defect, information about the defect is stored together with identification information for identifying the specific one laminate strip. Then, each of the laminate strips is wound into a roll.

In another aspect of the present invention, a reference mark is provided on the optical film laminate at an appropriate widthwise position, for example, in the form of a dot, instead of being of a form extending across the optical film laminate in the widthwise direction, in a continuous line pattern or a dotted pattern consisting of a plurality of dots. Then, after cutting the optical film laminate into a plurality of continuous webs of laminate strips each having a given width, the amount of lengthwise feed length of the optical film laminate and that of each of the cut laminate strips are measured to determine that the position of each of the laminate strips corresponding to the reference mark reaches an individual-reference-mark applying position, and, in response to the determination, an individual reference mark is applied to each of the laminate strips.

The inventors have successfully obtained a novel polarizing film by stretching a non-crystallizable ester type thermoplastic resin substrate and a PVA type resin layer applied to and formed on the substrate together through 2-stage stretching consisting of preliminary in-air stretching and in-boric-acid-solution stretching, and subjecting the PVA type resin layer to dyeing using a dichroic dyeing material, wherein the polarizing film has a thickness of 10 μm or less, and optical characteristics of the polarizing film represented by a single layer transmittance T and a polarization rate P can satisfy characteristics required for polarizing films for use in optical display devices.

Specifically, in one preferred embodiment of the present invention, the optical film is a polarizing film formed on a continuous web of thermoplastic resin substrate to have a thickness of 10 μm or less, by a process comprising a step of subjecting a laminate comprising the continuous web of thermoplastic resin substrate and a polyvinyl alcohol type resin layer formed on the substrate, to a 2-stage lengthwise uniaxial stretching consisting of a preliminary in-air stretching and an in-boric-acid-solution stretching, to attain a total stretching ratio of 5 to 8.5 to thereby reduce the thickness of the polyvinyl alcohol type resin layer to 10 μm or less, and a step of subjecting the laminate to dyeing using a dichroic material, and the resin film is the thermoplastic resin substrate stretched together with the polyvinyl alcohol type resin layer.

Alternatively, the optical film may include at least a polarizing film formed on a continuous web of thermoplastic resin substrate by subjecting a laminate comprising the continuous web of thermoplastic resin substrate and a polyvinyl alcohol type resin layer formed on the substrate, to lengthwise uniaxial stretching, and dyeing using a dichroic material, and the resin film may be a carrier film made of a resin material and bonded to the polarizing film through an adhesive layer, wherein the surface of the carrier film in contact with the adhesive layer has an adhesion force with respect to the adhesive layer, which is weaker than an adhesion force between the optical film and the adhesive layer.

In another preferred embodiment of the present invention, when the cutting along a direction parallel to the length direction is performed to allow at least one of the laminate strips to have a widthwise dimension corresponding to the dimension of one of long and short sides of a rectangular panel, the method further comprises a step of, before the step of winding, forming a plurality of slits in the optical film strip in a widthwise direction thereof at given lengthwise intervals corresponding to the other of the long and short sides of the panel, to extend from the surface of the optical film on the side opposite to the resin film or substrate to a depth reaching a surface of the resin film or substrate adjacent to the optical film to thereby form an optical film sheet supported by the resin film or substrate, between longitudinally adjacent two of the slits. In this case, when the optical film strip includes any defect, the two slits may be formed across the defect at positions on upstream and downstream sides thereof in a feed direction of the optical film strip and spaced apart from an edge of the defect by a given distance. Further, when the distance between the two slits formed across the defect at positions on the upstream and downstream sides thereof in the feed direction of the optical film strip is greater than the given distance, at least one additional widthwise slit may be formed between the two slits formed across the defect at positions on the upstream and downstream sides thereof in the feed direction of the optical film strip to prevent the distance between two of a plurality of widthwise slits to be formed in a region having the defect from becoming greater than the given distance.

In a preferred embodiment of the present invention, the polarizing film is formed to have optical characteristics satisfying the following conditions:

$P > (10^{0.929T-42.4} - 1) \times 100$ (where $T < 42.3$); and $P \geq 99.9$ (where $T \geq 42.3$)

wherein T is a single layer transmittance, and P is a polarization rate.

In another preferred embodiment of the present invention, the polarizing film is formed to have optical characteristics satisfying the following conditions:

$T \geq 42.5$; and $P \geq 99.5$ wherein T is a single layer transmittance, and P is a polarization rate.

Preferably, in the method of the present invention, a stretching ratio during the preliminary in-air stretching is 3.5 or less. Further, the impregnation of the polyvinyl alcohol type resin layer with the dichroic material is preferably performed by immersing the polyvinyl alcohol type resin layer in a dyeing solution containing iodine in a water solvent in an iodine concentration ranging from 0.12 to 0.30 weight %.

It is also preferable that the method of the present invention further comprises a step of cleaning the optical film laminate by a cleaning solution containing an iodide salt at a solution temperature within 40° C.

It is further preferable that the method of the present invention further comprises a step of laminating a separator film on a surface of the polarizing film on a side opposite to the thermoplastic resin substrate, through an adhesive. Alternatively, the method of the present invention may further comprise a step of laminating an optically functional film on the surface of the polarizing film on the side opposite to the thermoplastic resin substrate, through a bonding agent. In this case, the method may further comprise a step of laminating a separator film on a surface of the optically functional film on a side opposite to the polarizing film, through an adhesive.

Further, the optically functional film may be a biaxial phase difference film having a three-dimensional refractive index, in which refractive indexes in triaxial directions have the relation of nx>ny>nz.

As desired characteristics of a polarizing film when it is used in an optical display device such as a liquid-crystal television, the inventors have set conditions represented by the following formulas:

$P > (10^{0.929T-42.4} - 1) \times 100$ (where $T < 42.3$); and $P \geq 99.9$ (where $T \geq 42.3$)

wherein T is a single layer transmittance, and P is a polarization rate.

Differently from the liquid-crystal display device, an organic EL display device typically has a structure using a single polarizing film. Thus, optical characteristics required for such a polarizing film becomes different from optical characteristics required for the polarizing film for use in the liquid-crystal display device. As for the optical characteristics required for the polarizing film for use in the organic EL display device, the inventors have set conditions represented by the following formulas:

$T \geq 42.5$; and $P \geq 99.5$ wherein T is a single layer transmittance, and P is a polarization rate.

The present invention makes it possible to realize a polarizing film having a thickness of 10 μm or less and exhibiting optical characteristics represented in terms of the single layer transmittance T, and the polarization rate P satisfying the above conditions. In a preferred embodiment, the present invention provides a production method for a roll of an optical film laminate strip including a polarizing film having such desired optical characteristics.

Effect of the Invention

The present invention makes it possible to obtain a roll of an optical film laminate strip having a given width and comprising a polarizing film whose absorption axis created as the result of the lengthwise uniaxial stretching is accurately oriented in a lengthwise direction of the laminate strip. Further, according to the present invention, information relating to any defect detected by the preliminary inspection can be reliably recorded for each of a plurality of rolls of optical film laminate strips cut to have respective given widths. Further, the present invention makes it possible to obtain a roll of an optical film laminate strip using a polarizing film which is significantly reduced in thickness as compared to conventional polarizing film while exhibiting required optical characteristics, such as a polarizing film which consists of a polyvinyl alcohol type resin layer with a molecularly oriented dichroic material and has a thickness of 10 μm or less and required optical characteristics.

As mentioned above, any case of using a thermoplastic resin substrate and subjecting a PVA type resin layer formed on the substrate to uniaxial stretching to attain a stretching ratio of 5 or more cannot be found in prior art documents.

Representative examples of a polarizing film production method for use in the present invention, and a method of producing a roll of an optical film laminate strip, according to preferred embodiments of the present invention, will now be specifically described with reference to the accompanying drawings.

BRIEF DESCRIPTION OF THE DRAWINGS

FIG. 4 is a graph illustrating a range of optical performance required for a polarizing film for use in an optical display device with a liquid-crystal display panel.

FIG. 5 is a graph illustrating theoretical values of polarization performances of polarizing films 1 to 7 based on dichroic ratio.

FIG. 6 is a comparative table comparatively illustrating the presence or absence of dissolution of a PVA type resin layer depending on a difference in iodine concentration of a dyeing bath.

FIG. 7 is a comparative graph illustrating a relationship between an iodine concentration of a dyeing bath and polarization performance of a polarizing film formed by a PVA type resin layer.

FIG. 8 is a graph illustrating respective polarization performances of polarizing films in inventive examples.

FIG. 27 is a table illustrating conditions for producing a polarizing film or an optical film laminate including the polarizing film, in each Example subjected to the 2-stage stretching.

FIG. 28 is a table illustrating conditions for producing a polarizing film or an optical film laminate including the polarizing film, in each Example subjected to the 2-stage stretching.

FIG. 29 is a comparative table illustrating values of the orientation function in Examples subjected to the 2-stage stretching and reference samples 1 to 3.

FIG. 30 is a schematic diagram illustrating a process of performing defect inspection for an optical film laminate subjected to 2-stage stretching, in a production process for a roll of an optical film laminate, according to one embodiment of the present invention.

FIG. 31 is a schematic diagram illustrating a process of performing the defect inspection, in a production process for a roll of an optical film laminate, according to another embodiment of the present invention.

DESCRIPTION OF EMBODIMENTS

[Technical Background of Polarizing Films]

Figure 1:
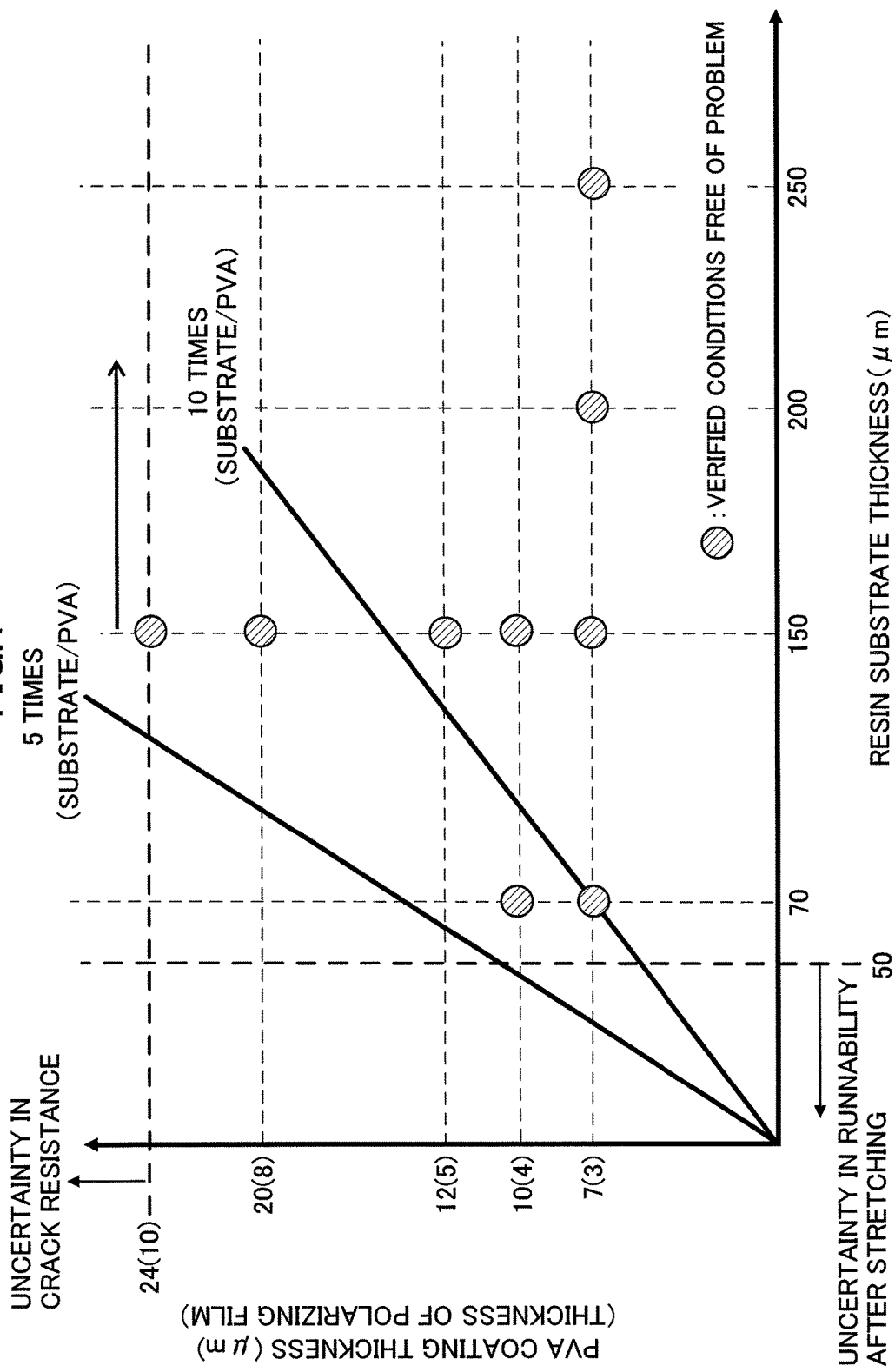
FIG. 1 is a diagram illustrating an appropriate thickness of a resin substrate with respect to a thickness of a PVA type resin layer (or a thickness of a polarizing film).
Figure 2:
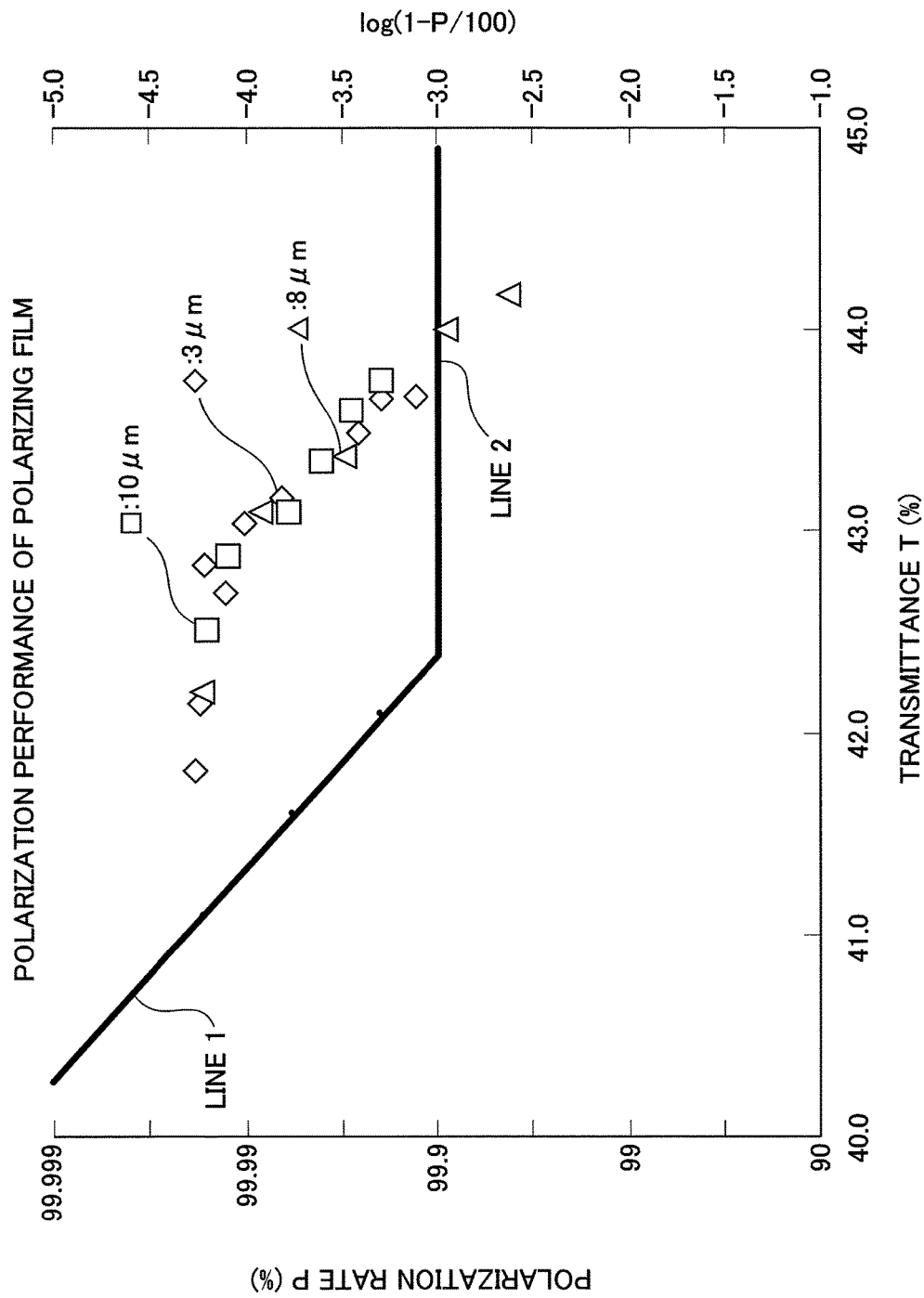
FIG. 2 is a comparative graph illustrating respective polarization performances of polarizing films having thicknesses of 3 μm, 8 μm and 10 μm.

As the background art of polarizing films, descriptions will be made on optical characteristics represented by material characteristics of a thermoplastic resin substrate to be used in the present invention and polarization performance of a polarizing film.

Firstly, descriptions will be made on general material characteristics of a thermoplastic resin suitable for use in the present invention.

Thermoplastic resins are roughly classified into two types, one being the type which is in a state in which polymer molecules are orderly oriented; and the other being the type which is in a state in which molecules are not orderly oriented or only a small portion of polymer molecules are orderly oriented. The former is referred as "crystallized state", and the latter as "amorphous or non-crystallized state. Correspondingly, one type of thermoplastic resin having a property capable of being transformed from a non-crystallized state into a crystallized state depending on conditions is called "crystallizable resin", and the other type of thermoplastic resin which does not have such a property is called "non-crystallizable resin". On the other hand, regardless of whether a crystallizable resin or a non-crystallizable resin, a resin which is not in a crystallized state or has not been transformed into a crystallized state, is called "amorphous or non-crystalline resin". The term "amorphous or non-crystalline" will be used herein in distinction from the term "non-crystallizable" which means a property incapable of transformation into a crystallized state.

For example, the crystallizable resin may include olefin type resins such as polyethylene (PE) and polypropylene (PP), and ester type resins such as polyethylene terephthalate (PET) and polybutylene terephthalate (PBT). One feature of the crystallizable resin is that, based on heating and/or stretching/orienting, polymer molecules are orderly arranged, and crystallization is progressed. Physical properties of the resin vary according to the degree of crystallization. On the other hand, even in the crystallizable resin, such as polypropylene (PP) or polyethylene terephthalate (PET), it is possible to suppress crystallization by inhibiting polymer molecules from being orderly oriented which may otherwise be caused by heating or stretching/orienting. Such crystallization-inhibited polypropylene (PP) and polyethylene terephthalate (PET) will hereinafter be referred to respectively as "non-crystallizable polypropylene" and "non-crystallizable polyethylene terephthalate", and collectively referred as "non-crystallizable olefin type resin" and "non-crystallizable ester type resin", respectively.

For example, in the case of polypropylene (PP), the resin may be made to have an atactic structure having no stereoscopic regularity to thereby produce a crystallization-inhibited non-crystallizable polypropylene (PP). Further, for example, in the case of polyethylene terephthalate (PET), it is possible to produce a crystallization-inhibited non-crystallizable polyethylene terephthalate (PET) by copolymerizing isophthalic acid or a modifier group such as 1,4-cyclohexanedimethanol, as a polymerizing monomer, or by copolymerizing a molecule which inhibits crystallization of polyethylene terephthalate (PET).

Secondly, brief description will be made on optical characteristics of a polarizing film usable in a large-sized liquid-crystal display element.

Basically, the term "optical characteristic" of a polarizing film is used herein to mean a polarization performance represented by a polarization rate P and a single layer transmittance T. In general, the polarization rate P and the single layer transmittance T of a polarizing film are in a trade-off relationship. The two optical characteristic values can be expressed by a T-P graph. In the T-P graph, it can be interpreted that a polarizing film has a better polarizing performance if a plotted line for the polarizing film is located on a higher side in terms of the single layer transmittance and on a higher side in terms of the single layer transmittance and on a higher side in terms of the polarization rate in the T-P graph.

Figure 3:
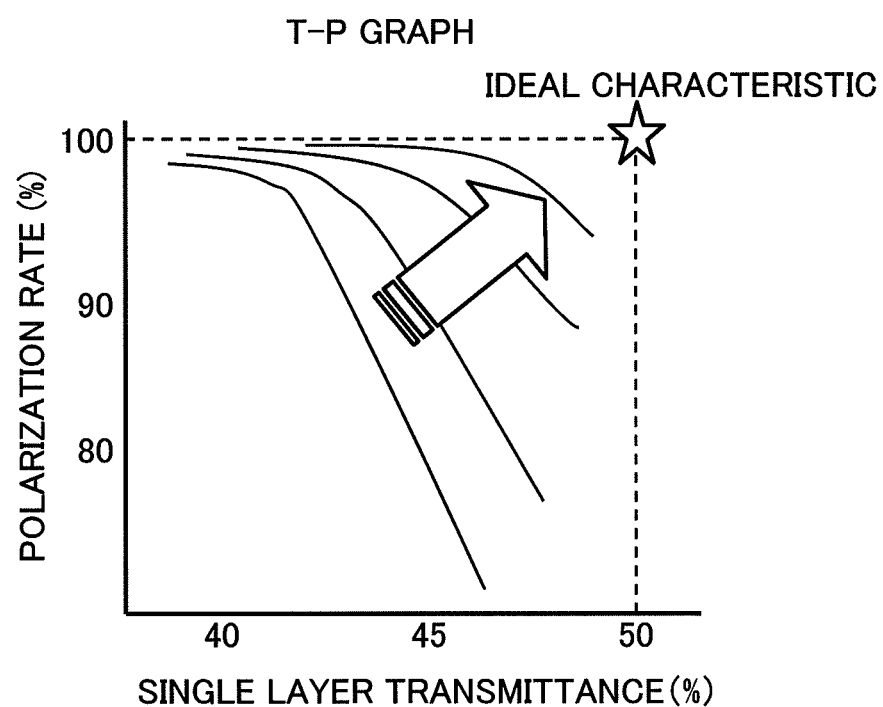
FIG. 3 is a graph illustrating a relationship between the single layer transmittance P and the polarization rate T.

Referring to FIG. 3 illustrating such T-P graph, an ideal optical characteristic is a state in which P becomes 100% when T is 50%. As see in FIG. 3, it is easy to increase the value of P in the range where T has a lower value, and it is difficult to have the P value increased in the range where T has a higher value. Further, referring to FIG. 4 illustrating the polarization performance of a polarizing film based on the relationship between the transmittance T and the polarization rate P, it is noted that, in a range defined as a region above the line 1 and the line 2, the single layer transmittance T and the polarization rate P of the polarizing film have values satisfying the "required performance" which would be required for a liquid-crystal display device, wherein a liquid-crystal display device using this polarizing film will have a contrast ratio of 1000:1 or more, and a maximum luminance of 500 cd/m$^2$ or more. This required performance is considered to be optical characteristics required as performance of a polarizing film for a large-sized liquid-crystal display element or the like, currently or even in future. An ideal value of the single layer transmittance T is 50%. However, when light transmits through a polarizing film, a phenomenon occurs that a part of light is reflected at an interface between the polarizing film and air. Considering this reflection phenomenon, the single layer transmittance T is reduced by an amount corresponding to the reflection, and an actually attainable maximum value of the single layer transmittance T is in the range of about 45 to 46%.

On the other hand, the polarization rate P can be converted to a contrast ratio (CR) of a polarizing film. For example, a polarization rate P of 99.95% corresponds to a contrast ratio of a polarizing film of 2000:1. In a display device prepared by using this polarizing film in each of opposite sides of a liquid-crystal display panel for a liquid-crystal television, the contrast ratio will be 1050:1. As above, the contrast ratio of the display device is less than that of the polarizing film, because depolarization occurs within the display panel. The depolarization occurs because of a phenomenon wherein, when light transmitted through the polarizing film on a backlight side transmits through the display panel, the light is scattered and/or reflected by a pigment in a color filter, a liquid-crystal molecule layer and a thin-film transistor (TFT), and so that the polarization state of a part of the light is changed. As the contrast ratio of each of the polarizing film and the display panel becomes larger, the liquid-crystal television has better contrast and better visibility.

Meanwhile, the contrast ratio of a polarizing film is defined as a value obtained by dividing a parallel transmittance (Tp) by a cross transmittance (Tc). On the other hand, the contrast ratio of a display device is defined as a value obtained by dividing a maximum luminance by a minimum luminance. The minimum luminance is a luminance in a black screen. In a liquid-crystal television designed assuming a typical viewing environment, the minimum luminance is set to 0.5 cd/m² or less as a reference required value. If the minimum luminance is greater than this value, color reproducibility will be deteriorated. The maximum luminance is a luminance in a white screen. In a liquid-crystal television designed for a typical viewing environment, a display having a maximum luminance ranging from 450 to 550 cd/m² is used. If the maximum luminance is less than this range, visibility of the liquid-crystal television will be decreased because display becomes dark.

Performance required for a display device of a liquid-crystal television using a large-sized display element includes a display contrast ratio of 1000:1 or more and a maximum luminance of 500 cd/m² or more. This may be considered as a "required performance". The line 1 (T<42.3%) and the line 2 (T>42.3%) in FIG. 4 denote limit values of the polarization performance of a polarizing film necessary to achieve the required performance of the display device. These lines have been determined by the following simulation, based on a combination of a backlight-side polarizing film and a viewing-side polarizing film, illustrated in FIG. 5.

The contrast ratio and the maximum luminance of a display device for a liquid-crystal television can be calculated based on a light intensity of a light source (backlight), transmittances of two polarizing films disposed on backlight and viewing sides, a transmittance of a liquid-crystal display panel, polarization rates of the two backlight-side and viewing-side polarizing films, and a depolarization rate of the liquid-crystal display panel. The lines 1 and 2 in FIG. 4 satisfying the required performance can be derived by preparing a plurality of combinations of two polarizing films different in polarization performance and calculating a contrast ratio and a maximum luminance of a display device for a liquid-crystal television for each of the combinations, using basic values of a light intensity (10,000 cd/m²) of a light source of a typical liquid-crystal television, a transmittance (13%) of a liquid-crystal display panel of the liquid-crystal television and a depolarization ratio (0.085%) of the liquid-crystal display panel. Specifically, if a polarizing film having performance below the line 1 and the line 2 is used, the contrast ratio becomes less than 1000:1, and the maximum luminance becomes less than 500 cd/m2. Formulas used for the calculation are as follows.

Formula (1) is used for deriving the contrast ratio of a display device. Formula (2) is used for deriving the maximum luminance of the display device. Formula (3) is used for deriving a dichroic ratio of a polarizing film.

$$CRD = Lmax/Lmin, \quad \text{Formula (1):}$$

$$Lmax = (LB \times Tp - (LB/2 \times k1B \times DP/100)/2 \times (k1F - k2F)) \times Tcell/100, \text{ and} \quad \text{Formula (2):}$$

$$DR = A_{k2}/A_{k1} = \log(k2)/\log(k1) = \log(Ts/100 \times (1 \times P/100)/T_{PVA})/\log(Ts/100 \times (1 + P/100)/T_{PVA}), \quad \text{Formula (3):}$$

where:

$$Lmin = (LB \times Tc + (LB/2 \times k1B \times DP/100)/2 \times (k1F - k2F)) \times Tcell/100;$$

$$Tp = (k1B \times k1F + k2B \times k2F)/2 \times T_{PVA};$$

$$Tc = (k1B \times k2F) + k2B \times k1F)/2 \times T_{PVA};$$

$$k1 = Ts/100 \times (1 + P/100)/T_{PVA}; \text{ and}$$

$$k2 = Ts/100 \times (1 - P/100)/T_{PVA},$$

wherein:
CRD: contrast ratio of the display device;
Lmax: maximum luminance of the display device;
Lmin: minimum luminance of the display device;
DR: dichroic ratio of the polarizing film;
Ts: single layer transmittance of the polarizing film;
P: polarization rate of the polarizing film;
k1: first primary transmittance;
k2: second primary transmittance;
k1F: k1 of the viewing-side polarizing film;
k2F: k2 of the viewing-side polarizing film;
k1B: k1 of the backlight-side polarizing film;
k2B: k2 of the backlight-side polarizing film;
$A_{k1}$: absorbance of the polarizing film in a direction of a transmission axis;
$A_{k2}$: absorbance of the polarizing film in a direction of an absorption axis;
LB: light intensity of the light source (10,000 cd/m²);
Tc: cross transmittance of the polarizing films (combination of the viewing-side polarizing film and the backlight-side polarizing film);
Tp: parallel transmittance of the polarizing films (combination of the viewing-side polarizing film and the backlight-side polarizing film);
Tcell: transmittance of the cell (liquid-crystal display panel) (13%);
DP: depolarization rate of the cell (0.085%); and
$T_{PVA}$: transmittance of a PVA film having no iodine absorbed therein (0.92).

The line 1 in FIG. 4 (T<42.3%) is derived based on the polarization performance of polarizing films located on the straight line indicated "group 3" in FIG. 5. Among the polarizing films belonging to the group 3 in FIG. 5, the polarizing film D which is the plot D (white circle) represented by coordinates (T, P)=(42.1%, 99.95%) may be used on each of backlight and viewing sides of a display device for a liquid-crystal television. In this case, the required performance can be satisfied.

On the other hand, although the polarizing film A (T=40.6%, P=99.998%), the polarizing film B (T=41.1%, P=99.994%) and the polarizing film C (T=41.6%, P=99.98%) also belong to the group 3, they are located in a region having a lower single layer transmittance (darker). Thus, if one of these polarizing films is used on each of the backlight and viewing sides, the required performance cannot be satisfied. In cases where one of the polarizing films A, B and C is used on either one of the backlight and viewing sides, in order to achieve the required performance, it is necessary to use, as a polarizing film to be used on the other side, a polarizing film having a single layer transmittance greater than that of the polarizing films in the group 3 and excellent polarization performance, specifically, at least a polarization rate of 99.9% or more, such as the polarizing film E in the group 4, the polarizing film F in the group 5 or the polarizing film G in the group 7.

Respective polarization performances of the polarizing films belonging to the groups 1 to 7 are calculated in accordance with the Formula (3). The Formula (3) can be used to calculate the single layer transmittance T and the polarization rate P based on the dichroic ratio (DR) serving as an index of polarization performance of a polarizing film. The term "dichroic ratio" means a value obtained by dividing an absorbance in a direction of an absorption axis of a polarizing film by an absorbance in a direction of a transmission axis thereof. A higher value of the dichroic ratio indicates better polarization performance. For example, each polarizing film in the group 3 is calculated as a polarizing film having polarization performance in which the dichroic ratio is about 94. This means that any polarizing film having a dichroic ratio of less than this value does not achieve the required performance.

Further, in cases where a polarizing film having polarization performance inferior to those of the polarizing films in the group 3, such as the polarizing film H (41.0%, 99.95%) in the group 1 or the polarizing film J (42.0%, 99.9%) in the group 2, is used on either one of the backlight and viewing sides, in order to achieve the required performance, it is necessary to use, as a polarizing film to be used on the other side, a polarizing film having polarization performance better than those of the polarizing films in the group 3, such as the polarizing film I (43.2%, 99.95%) in the group 6 or the polarizing film K (42.0%, 99.998%) in the group 7, as is clear from the Formulas (1) and (2)

In order to achieve the required performance of a display device for a liquid-crystal television, the polarization performance of either one of the backlight-side and viewing-side polarizing films has to be better than those of the polarizing films in the group 3. The line 1 (T<42.3%) in FIG. 4 indicates the lower limit of the polarization performance. On the other hand, the line 2 (T>42.3%) indicates the lower limit of the polarization rate P. If a polarizing film having a polarization rate P of 99.9% or less is used on either one of the backlight and viewing sides, the required performance cannot be satisfied even if a polarizing film having the best possible polarization performance is used on the other side.

In conclusion, a desired condition for achieving polarization performance required for a display device of a liquid-crystal television using a large-sized display element is that either one of the backlight-side and viewing-side polarizing films has a polarization performance better than that of the polarizing film in a region beyond at least the threshold represented by the line 1 (T<42.3%) and the line 2 (T≥42.3%), more specifically, a polarization performance better than those of the polarizing films in the group 3, and a polarization rate of 99.9% or more.

A polarizing film for use in an organic EL display device is often utilized for blocking internally reflected light, in such a manner that it is combined mainly with a ¼ wavelength phase difference film to form circularly-polarized light. In this case, a single polarizing film is used. Thus, as mentioned above, optical characteristics required for the polarizing film to be used in the organic EL display device becomes different from that of the transmissive liquid-crystal display device using two polarizing films. Specifically, it is required to meet the conditions of single layer transmittance of T≥42.5, and polarization rate of P≥99.5. The required performance of the polarizing film for use in the organic EL display device is indicated by the one-dot chain line in FIG. 4.

EXAMPLES ON PRODUCTION OF POLARIZING FILM

Examples 1 to 18 will be described as specific examples of a polarizing film for use in an optical film laminate, according to the present invention. FIGS. 27 and 28 illustrate conditions for producing polarizing films in the Examples. Further, for the purpose of comparison, reference samples and comparative examples have also been prepared. FIG. 29 illustrates a value of orientation function of a PET resin substrate of a stretched laminate in each of the Examples 1 to 18 and of reference samples 1 to 3, after completion of first-stage elevated temperature in-air stretching.

Example 1

A continuous web of substrate was prepared as a non-crystallizable ester type thermoplastic resin substrate comprising isophthalic acid-copolymerized polyethylene terephthalate copolymerized with 6 mol % of isophthalic acid (hereinafter referred to as "non-crystallizable PET"). The non-crystallizable PET has a glass transition temperature of 75° C. A laminate comprising the continuous web of non-crystallizable PET substrate and a polyvinyl alcohol (hereinafter referred to as "PVA") layer was prepared in the following manner. By the way, PVA has a glass transition temperature of 80° C.

A non-crystallizable PET substrate having a thickness of 200 μm was prepared, and a PVA aqueous solution having a PVA concentration of 4 to 5 wt % was also prepared by dissolving a PVA powder having a polymerization degree of 1000 or more and a saponification degree of 99% or more in water. Then, the PVA aqueous solution was applied to the 200 μm-thick non-crystallizable PET substrate, and dried at a temperature of 50 to 60° C., to form a PVA layer having a thickness of 7 μm on the non-crystallizable PET substrate. This product will hereinafter be referred to as a "laminate comprising the non-crystallizable PET substrate and the 7 μm-thick PVA layer formed on the non-crystallizable PET substrate", or as a "laminate including the 7 μm-thick PVA layer", or simply as a "laminate".

The laminate including the 7 μm-thick PVA layer was subjected to the following steps including a 2-stage stretching step consisting of preliminary in-air stretching and in-boric-acid-solution stretching, to produce a polarizing film having a thickness of 3 μm. Through the first-stage preliminary in-air stretching, the laminate including the 7 μm-thick PVA layer was stretched together with the non-crystallizable PET substrate to form a stretched laminate including a 5 μm-thick PVA layer. This product will hereinafter be referred to as a "stretched laminate". Specifically, the stretched laminate was obtained by placing the laminate including the 7 μm-thick PVA layer into a stretching apparatus arranged in an oven set to a stretching temperature environment of 130° C., to stretch the laminate in an end-free uniaxial manner to attain a stretching ratio of 1.8. Through this stretching step, the PVA layer in the stretched laminate was converted into a 5 μm-thick PVA layer in which PVA molecules are oriented.

Subsequently, the stretched laminate was subjected to a dyeing step to form a dyed laminate in which iodine is absorbed (impregnated) in the 5 μm-thick PVA layer having the oriented PVA molecules. This product will hereinafter be referred to as a "dyed laminate". Specifically, the dyed laminate was obtained by immersing the stretched laminate in a dyeing solution having a temperature of 30° C. and containing iodine and potassium iodide, for an arbitrary time, to cause iodine to be absorbed in the PVA layer included in the stretched laminate, so as to allow the PVA layer for making up a target polarizing film (to a polarizing film to be finally formed) to have a single layer transmittance of 40 to 44%. In this step, the dyeing solution was prepared by adjusting a concentration of iodine and a concentration of potassium iodide to fall within the range of 0.12 to 0.30 wt % and the range of 0.7 to 2.1 wt %, respectively, using water as a solvent. A ratio of the concentration of iodine to the concentration of potassium iodide is 1:7.

By the way, it is necessary to use potassium iodide to allow iodine to be dissolved in water. More specifically, the stretched laminate was immersed in a dyeing solution having an iodine concentration of 0.30 wt % and a potassium iodide concentration of 2.1 wt %, for 60 seconds, to form a dyed laminate in which iodine is absorbed in the 5 μm-thick PVA layer having the oriented PVA molecules. In the Example 1, various dyed laminates different in single layer transmittance and polarization rate were formed by changing an immersion time of the stretched laminate in the dyeing solution having an iodine concentration of 0.30 wt % and a potassium iodide concentration of 2.1 wt %, to adjust an amount of iodine to be absorbed, so as to allow a target polarizing film to have a single layer transmittance of 40 to 44%.

Further, through the second-stage in-boric-acid-solution stretching, the dyed laminate was further stretched together with the non-crystallizable PET substrate to form an optical film laminate including a PVA layer making up a 3 μm-thick polarizing film. This product will hereinafter be referred to as an "optical film laminate". Specifically, the optical film laminate was obtained by feeding the dyed laminate through a stretching apparatus arranged in treatment equipment having a boric acid aqueous solution containing boric acid and potassium iodide and having a temperature of 60 to 85° C., to subject the dyed laminate to an end-free uniaxial stretching to attain a stretching ratio of 3.3. More specifically, the temperature of the boric acid aqueous solution was 65° C. Further, the boric acid aqueous solution was set to contain 4 weight parts of boric acid with respect to 100 weight parts of water, and 5 weight parts of potassium iodide with respect to 100 weight parts of water.

In this step, the dyed laminate shaving iodine impregnated therein in an adjusted amount was first immersed in the boric acid aqueous solution for 5 to 10 seconds. Then, the dyed laminate was fed to directly pass between each of a plurality of set of rolls having different circumferential speeds and serving as the stretching apparatus arranged in the treatment equipment, and subjected to an end-free uniaxial stretching to attain a stretching ratio of 3.3 by taking a time of 30 to 90 seconds. Through this stretching, the PVA layer included in the dyed laminate is changed into a 3 μm-thick PVA layer in which absorbed iodine is highly oriented in one direction in the form of a polyiodide ion complex. This PVA layer makes up a polarizing film of an optical film laminate.

As above, in the Example 1, a laminate comprising a non-crystallizable PET substrate and a 7 μm-thick PVA layer formed on the substrate is first subjected to preliminarily in-air stretching at a stretching temperature of 130° C. to form a stretched laminate. Then, the stretched laminate is subjected to dyeing to form a dyed laminate. Then, the dyed laminate is subjected to in-boric-acid-solution stretching at a stretching temperature of 65° C., to form an optical film laminate including a 3 μm-thick PVA layer stretched together with the non-crystallizable PET substrate to attain a total stretching ratio of 5.94. Through the 2-stage stretching, it becomes possible to form an optical film laminate including a 3 μm-thick PVA layer in which PVA molecules in the PVA layer formed on the non-crystallizable PET substrate are highly oriented, and iodine absorbed through the dyeing is highly oriented in one direction in the form of a polyiodide ion complex.

Then, in a cleaning step although it is not essential in a production process of an optical film laminate, the optical film laminate was taken out of the boric acid aqueous solution, and boric acid deposited on a surface of the 3 μm-thick PVA layer formed on the non-crystallizable PET substrate was cleaned by a potassium iodide aqueous solution. Subsequently, in a drying step, the cleaned optical film laminate was dried by warm air at a temperature of 60° C. The cleaning step is designed to solve defective appearance due to deposition of boric acid.

Subsequently, in a lamination and/or transfer step, an 80 μm-thick triacetylcellulose (TAC) film was laminated to a surface of the 3 μm-thick PVA layer formed on the non-crystallizable PET substrate, while applying a bonding agent onto the surface of the 3 μm-thick PVA layer. Then, the non-crystallizable PET substrate was peeled to allow the 3 μm-thick PVA layer to be transferred to the 80 μm-thick triacetylcellulose (TAC) film.

Example 2

In the Example 2, as with the Example 1, a 7 μm-thick PVA layer was formed on a non-crystallizable PET substrate to form a laminate, and then the laminate including the 7 μm-thick PVA layer was subjected to preliminary in-air stretching and stretched at a stretching ratio of 1.8 to form a stretched laminate, whereafter the stretched laminate was immersed in a dyeing solution containing iodine and potassium iodide and having a temperature of 30° C. to form a dyed laminate including an iodine-absorbed PVA layer. Differently from the Example 1, a process in the Example 2 additionally comprises a cross-linking step. The cross-linking step is designed to immerse the dyed laminate in a cross-linking boric acid aqueous solution at a temperature of 40° C., for 60 seconds, so as to allow PVA molecules of the iodine-absorbed PVA layer to be subjected to cross-linking. The cross-linking boric acid aqueous solution in this step was set to contain 3 weight parts of boric acid with respect to 100 weight parts of water, and 3 weight parts of potassium iodide with respect to 100 weight parts of water.

The cross-linking step in the Example 2 is intended to expect at least three technical effects. The first is an insolubilization effect of preventing a thinned PVA layer included in the dyed laminate from being dissolved during subsequent in-boric-acid-solution stretching. The second is a dyeing stabilization effect of preventing elution of iodine absorbed in the PVA layer. The third is a node formation effect of forming nodes by cross-linking molecules of the PVA layer together.

In the Example 2, the cross-linked dyed laminate was immersed in an in-boric-acid-solution stretching bath at 75° C. which is higher than a stretching temperature of 65° C. in the Example 1, and stretched at a stretching ratio of 3.3 to form an optical film laminate, as with the Example 1. The process in the Example 2 further comprises a cleaning step, a drying step and a lamination and/or transfer step each of which is the same as that in the Example 1.

In order to further clarify the technical effects expected of the cross-linking step in advance of the in-boric-acid-solution stretching, a non-cross-linked dyed laminate in the Example 1 was immersed in the in-boric-acid-solution stretching bath at a stretching temperature of 70 to 75° C. In this case, the PVA layer included in the dyed laminate was dissolved in the in-boric-acid-solution stretching bath to preclude the stretching.

Example 3

In the Example 3, as with the Example 1, a 7 μm-thick PVA layer was formed on a non-crystallizable PET substrate to form a laminate, and then the laminate including the 7 μm-thick PVA layer was subjected to preliminary in-air stretching and stretched at a stretching ratio of 1.8 to form a stretched laminate. Differently from the Example 1, a process in the Example 3 additionally comprises an insolubilization step. The insolubilization step is designed to immerse the stretched laminate in a boric acid insolubilizing aqueous solution at a solution temperature of 30° C., for 30 seconds, so as to insolubilize a PVA layer included in the stretched laminate and having oriented PVA molecules. The boric acid insolubilizing aqueous solution in this step was set to contain 3 weight parts of boric acid with respect to 100 weight parts of water. A technical effect expected of the insolubilization step in the Example 3 is to prevent the PVA layer included in the stretched laminate from being dissolved at least during a subsequent dyeing step.

In the Example 3, as with the Example 1, the insolubilized stretched laminate was immersed in a dyeing solution containing iodine and potassium iodide and having a temperature of 30° C. to form a dyed laminate including an iodine-absorbed PVA layer. Subsequently, the dyed laminate was immersed in the in-boric-acid-solution stretching bath at 65° C. which is equal to the stretching temperature in the Example 1, and stretched at a stretching ratio of 3.3 in the same manner as that in the Example 1 to form an optical film laminate. The process in the Example 3 further comprises a cleaning step, a drying step and a lamination and/or transfer step each of which is the same as that in the Example 1.

In order to further clarify the technical requirements and effects expected of the insolubilization step in advance of the dyeing step, a non-insolubilized stretched laminate in the Example 1 was subjected to dyeing to form a dyed laminate, and the formed dyed laminate was immersed in the in-boric-acid-solution stretching bath at a stretching temperature of 70 to 75° C. In this case, the PVA layer included in the dyed laminate was dissolved in the in-boric-acid-solution stretching bath to preclude the stretching, as with the Example 2.

In another test, in place of the dyeing solution in the Example 1 where a concentration of iodine is set to 0.30 wt % using water as a solvent, a dyeing solution was prepared to set an iodine concentration in the range of 0.12 to 0.25 wt %, while keeping the remaining conditions unchanged. Then, the non-insolubilized stretched laminate in the Example 1 was immersed in the prepared dyeing solution. In this case, the PVA layer included in the stretched laminate was dissolved in the dyeing bath to preclude the dyeing. In contrast, when the insolubilized stretched laminate in the Example 3 was used, the dyeing to the PVA layer could be performed without dissolution of the PVA layer, even if the iodine concentration of the dyeing solution was in the range of 0.12 to 0.25 wt %.

In the Example 3 where the dyeing to the PVA layer can be performed even if the iodine concentration of the dyeing solution is in the range of 0.12 to 0.25 wt %, various dyed laminates different in single layer transmittance and polarization rate were formed by changing the iodine concentration and the potassium iodide concentration of the dyeing solution in the certain range in the Example 1, while keeping an immersion time of the stretched laminate in the dyeing solution constant, to adjust an amount of iodine to be absorbed, so as to allow a target polarizing film to have a single layer transmittance of 40 to 44%.

Example 4

In the Example 4, an optical film laminate was formed by a production process in which the insolubilization step in the Example 3 and the cross-linking step in the Example 2 are added to the production process in the Example 1. Firstly, a 7 μm-thick PVA layer was formed on a non-crystallizable PET substrate to form a laminate, and then the laminate including the 7 μm-thick PVA layer was subjected to preliminary in-air stretching based on an end-free uniaxial stretching process to attain a stretching ratio of 1.8 to thereby form a stretched laminate. In the Example 4, as with the Example 3, through the insolubilization step of immersing the formed stretched laminate in a boric acid insolubilizing solution at a temperature of 30° C. for 30 seconds, the PVA layer included in the stretched laminate and having oriented PVA molecules was insolubilized. Then, in the Example 4, as with the Example 3, the stretched laminate including the insolubilized PVA layer was immersed in a dyeing solution containing iodine and potassium iodide and having a temperature of 30° C. to form a dyed laminate including an iodine-absorbed PVA layer.

In the Example 4, as with the Example 2, through the cross-linking step of immersing the formed dyed laminate in a boric acid cross-linking solution at 40° C. for 60 seconds, PVA molecules of the iodine-absorbed PVA layer are cross-linked together. Then, in the Example 4, the cross-linked dyed laminate was immersed in an in-boric-acid-solution stretching bath at 75° C. which is higher than a stretching temperature of 65° C. in the Example 1, for 5 to 10 seconds, and subjected to an end-free uniaxial stretching to attain a stretching ratio of 3.3, in the same manner as that in the Example 2, to thereby form an optical film laminate. The process in the Example 4 further comprises a cleaning step, a drying step and a lamination and/or transfer step each of which is the same as that in each of the Examples 1 to 3.

As with the Example 3, the PVA layer in the Example 4 is never dissolved even if the iodine concentration of the dyeing solution is in the range of 0.12 to 0.25 wt %. In the Example 4, various dyed laminates different in single layer transmittance and polarization rate were formed by changing the iodine concentration and the potassium iodide concentration of the dyeing solution in the certain range in the Example 1, while keeping an immersion time of the stretched laminate in the dyeing solution constant, to adjust an amount of iodine to be absorbed, so as to allow a target polarizing film to have a single layer transmittance of 40 to 44%.

As above, in the Example 4, a 7 μm-thick PVA layer is formed on a non-crystallizable PET substrate to form a laminate, and then the laminate including the 7 μm-thick PVA layer is subjected to preliminarily in-air stretching based on an end-free uniaxial stretching process to attain a stretching ratio of 1.8 to thereby form a stretched laminate. The formed stretched laminate is immersed in a boric acid insolubilizing solution at a solution temperature of 30° C. for 30 seconds to insolubilize the PVA layer included in the stretched laminate. The stretched laminate including the insolubilized PVA layer is immersed in a dyeing solution containing iodine and potassium iodide and having a temperature of 30° C. to form a dyed laminate in which iodine is absorbed in the insolubilized PVA layer. The dyed laminate including the iodine-absorbed PVA layer is immersed in a boric acid cross-linking solution at 40° C. for 60 seconds to cross-link PVA molecules of the iodine-absorbed PVA layer together. The dyed laminate including the cross-linked PVA layer is immersed in an in-boric-acid-solution stretching bath containing iodine and potassium iodide and having a temperature of 75° C., for 5 to 10 seconds, and then subjected to in-boric-acid-solution stretching based on an end-free uniaxial stretching process to attain a stretching ratio of 3.3 to thereby form an optical film laminate.

In the Example 4, based on the 2-stage stretching consisting of the elevated temperature in-air stretching and the in-boric-acid-solution stretching, and pre-treatments consisting of the insolubilization in advance of the immersion into a dyeing bath and the cross-linking in advance of the in-boric-acid-solution stretching, it becomes possible to stably form an optical film laminate including a 3 μm-thick PVA layer making up a polarizing film, in which PVA molecules of the PVA layer formed on the non-crystallizable PET substrate are highly oriented, and iodine reliably absorbed in the PVA molecules through the dyeing is highly oriented in one direction in the form of a polyiodide ion complex.

Example 5

In the Example 5, an optical film laminate was produced under the same conditions as those in the Example 4, except the following difference. The difference is a thickness of the PVA layer formed on the non-crystallizable PET substrate. In the Example 4, the PVA layer initially had a thickness of 7 μm, and the PVA layer finally included in the optical film laminate had a thickness of 3 μm, whereas, in the Example 5, the PVA layer initially had a thickness of 12 μm, and the PVA layer finally included in the optical film laminate had a thickness of 5 μm.

Example 6

In the Example 6, an optical film laminate was produced under the same conditions as those in the Example 4, except the following difference. The difference is a polymerizing monomer used in the non-crystallizable PET substrate. In the Example 4, the non-crystallizable PET substrate was prepared by copolymerizing PET and isophthalic acid, whereas, in the Example 6, the non-crystallizable PET substrate was prepared by copolymerizing PET and 1,4-cyclohexanedimethanol serving as a modifier group.

Example 7

In the Example 7, an optical film laminate was produced under the same conditions as those in the Example 4, except the following difference. The difference is that a stretching ratio for each of the preliminary in-air stretching and the in-boric-acid-solution stretching was changed to allow a total stretching ratio to become equal to or close to 6.0. In the Example 4, the stretching ratios for the preliminary in-air stretching and the in-boric-acid-solution stretching were set, respectively, to 1.8 and 3.3, whereas, in the Example 7, the two stretching ratios were set, respectively, to 1.2 and 4.9. Meanwhile, the total stretching ratio in the Example 4 was 5.94, whereas the total stretching ratio in the Example 7 was 5.88. The reason is that, in the in-boric-acid-solution stretching, it was unable to perform the stretching at a stretching ratio of 4.9 or more.

Example 8

In the Example 8, an optical film laminate was produced under the same conditions as those in the Example 4, except the following difference. The difference is that a stretching ratio for each of the preliminary in-air stretching and the in-boric-acid-solution stretching was changed to allow a total stretching ratio to become equal to 6.0. In the Example 8, the stretching ratios for the preliminary in-air stretching and the in-boric-acid-solution stretching were set to 1.5 and 4.0, respectively.

Example 9

In the Example 9, an optical film laminate was produced under the same conditions as those in the Example 4, except the following difference. The difference is that a stretching ratio for each of the preliminary in-air stretching and the in-boric-acid-solution stretching was changed to allow a total stretching ratio to become equal to 6.0. In the Example 9, the stretching ratios for the preliminary in-air stretching and the in-boric-acid-solution stretching were set to 2.5 and 2.4, respectively.

Example 10

In the Example 10, an optical film laminate was produced under the same conditions as those in the Example 4, except the following difference. In the Example 4, a stretching temperature for the preliminary in-air stretching was set to 130° C., whereas, in the Example 10, the stretching temperature for the preliminary in-air stretching was set to 95° C.

Example 11

In the Example 11, an optical film laminate was produced under the same conditions as those in the Example 4, except the following difference. In the Example 4, the stretching temperature for the preliminary in-air stretching was set to 130° C., whereas, in the Example 11, the stretching temperature for the preliminary in-air stretching was set to 110° C.

Example 12

In the Example 12, an optical film laminate was produced under the same conditions as those in the Example 4, except the following difference. In the Example 4, the stretching temperature for the preliminary in-air stretching was set to 130° C., whereas, in the Example 12, the stretching temperature for the preliminary in-air stretching was set to 150° C.

Example 13

In the Example 13, an optical film laminate was produced under the same conditions as those in the Example 4, except the following difference. The difference is that the stretching ratio for the preliminary in-air stretching was set to 1.8, and the stretching ratio for the in-boric-acid-solution stretching was changed to 2.8. As a result, in the Example 13, the total stretching ratio was about 5.0 (accurately, 5.04), whereas, in the Example 4, the total stretching ratio was about 6.0 (accurately, 5.94).

Example 14

In the Example 14, an optical film laminate was produced under the same conditions as those in the Example 4, except the following difference. The difference is that the stretching ratio for the preliminary in-air stretching was set to 1.8, and the stretching ratio for the in-boric-acid-solution stretching was changed to 3.1. As a result, in the Example 14, the total stretching ratio was about 5.5 (accurately, 5.58), whereas, in the Example 4, the total stretching ratio was about 6.0 (accurately, 5.94).

Example 15

In the Example 15, an optical film laminate was produced under the same conditions as those in the Example 4, except the following difference. The difference is that the stretching ratio for the preliminary in-air stretching was set to 1.8, and the stretching ratio for the in-boric-acid-solution stretching was changed to 3.6. As a result, in the Example 15, the total stretching ratio was about 6.5 (accurately, 6.48), whereas, in the Example 4, the total stretching ratio was about 6.0 (accurately, 5.94).

Example 16

In the Example 16, an optical film laminate was produced under the same conditions as those in the Example 4, except the following difference. The difference is a stretching scheme in the preliminary in-air stretching. In the Example 4, the preliminary in-air stretching was performed based on an end-free uniaxial stretching process to attain a stretching ratio of 1.8, whereas, in the Example 16, the preliminary in-air stretching was performed based on an end-fixed uniaxial stretching process to attain a stretching ratio of 1.8.

Example 17

In the Example 17, an optical film laminate was produced under the same conditions as those in the Example 16, except the following difference. The difference is that the stretching ratio for the preliminary in-air stretching was set to 1.8, and the stretching ratio for the in-boric-acid-solution stretching was changed to 3.9. As a result, in the Example 17, the total stretching ratio was about 7 (accurately, 7.02), whereas, in the Example 16, the total stretching ratio was about 6.0 (accurately, 5.94).

Example 18

In the Example 18, an optical film laminate was produced under the same conditions as those in the Example 16, except the following difference. The difference is that the stretching ratio for the preliminary in-air stretching was set to 1.8, and the stretching ratio for the in-boric-acid-solution stretching was changed to 4.4. As a result, in the Example 18, the total stretching ratio was about 8 (accurately, 7.92), whereas, in the Example 16, the total stretching ratio was about 6.0 (accurately, 5.94).

Comparative Example 1

The comparative example 1 has been prepared, under the same conditions as those in the Example 4, by applying a PVA solution to a 200 μm-thick non-crystallizable PET substrate, and drying to form a laminate comprising the non-crystallizable PET substrate and a 7 μm-thick PVA layer formed on the substrate. Then, the laminate including the 7 μm-thick PVA layer was subjected to elevated temperature in-air stretching at a stretching temperature of 130° C. based on an end-free uniaxial stretching process to attain a stretching ratio of 4.0 to thereby form a stretched laminate. Through the stretching, the PVA layer included in the stretched laminate was changed to a 3.5 μm-thick PVA layer having oriented PVA molecules.

Then, the stretched laminate was subjected to dyeing to form a dyed laminate in which iodine is absorbed in the 3.5 μm-thick PVA layer having the oriented PVA molecules. Specifically, the dyed laminate was obtained by immersing the stretched laminate in a dyeing solution having a temperature of 30° C. and containing iodine and potassium iodide, for an arbitrary time, to cause iodine to be absorbed in the PVA layer included in the stretched laminate, so as to allow the PVA layer for making up a target polarizing film to have a single layer transmittance of 40 to 44%. Various dyed laminates different in single layer transmittance and polarization rate were formed by adjusting an amount of iodine to be absorbed in the PVA layer having the oriented PVA molecules, in the above manner Further, the dyed laminated was subjected to cross-linking. Specifically, the dyed laminated was cross-linked in such a manner that it is immersed in a boric acid cross-linking solution containing 3 weight parts of boric acid with respect to 100 weight pars of water and 3 weight parts of potassium iodide with respect to 100 weight pars of water and having a temperature of 40° C., for 60 seconds. The cross-linked dyed laminate in the comparative example 1 corresponds to the optical film laminate in the Example 4. Thus, a cleaning step, a drying step and a lamination and/or transfer step in the comparative example 1 are the same as those in the Example 4.

Comparative Example 2

In the comparative example 2, the laminates in accordance with the comparative example 1 have been stretched to the stretching ratio of 4.5, 5.0 and 6.0, respectively. The following comparative table illustrates phenomena experienced in a 200 μm-thick non-crystallizable PET substrate and a PVA layer formed on the non-crystallizable PET substrate, including the comparative examples 1 and 2. Based on the data, it has been verified that the stretching ratio during the elevated temperature in-air stretching at a stretching temperature of 130° C. has an upper limit of 4.0.

[Technical Background Relating to Stretching]

Figure 18:
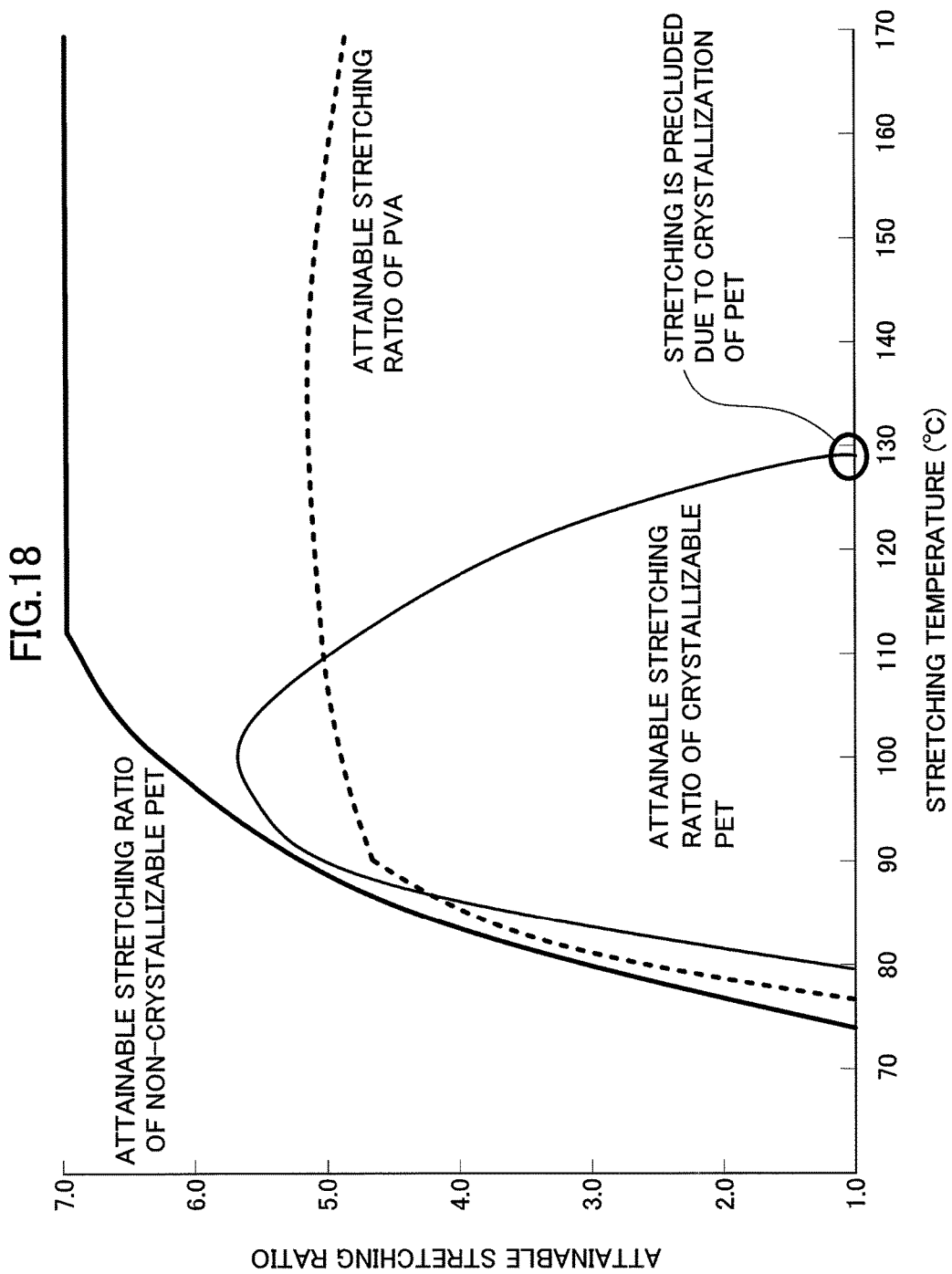
FIG. 18 is a graph illustrating a relative relationship between a stretching temperature and an attainable stretching ratio in each of crystallizable PET, non-crystallizable PET and PVA type resin.

FIGS. 18 to 22 show results derived from experimental tests. Referring first to FIG. 18, FIG. 18 is a graph illustrating a relative relationship between the stretching temperature and the attainable stretching ratio in each of a crystallizable PET, a non-crystallizable PET and a PVA type resin, based on experimental tests.

In FIG. 18, the thick solid line indicates a change in attainable stretching ratio in a non-crystallizable PET along with a change in stretching temperature. The non-crystallizable PET has a glass transition temperature Tg of about 75° C., and cannot be stretched at a temperature below this glass transition temperature Tg. As is evident from FIG. 18, an end-free uniaxial stretching process to be performed in air under an elevated temperature (elevated temperature in-air end-free uniaxial stretching) is capable of achieving a stretching ratio of 7.0 or more under a stretching temperature of about 110° C. or more. On the other hand, the thin solid line in FIG. 18 indicates a change in attainable stretching ratio in a crystallizable PET along with a change in stretching temperature. The crystallizable PET has a glass transition temperature Tg of about 80° C., and cannot be stretched under a temperature below this glass transition temperature Tg.

Figure 19:
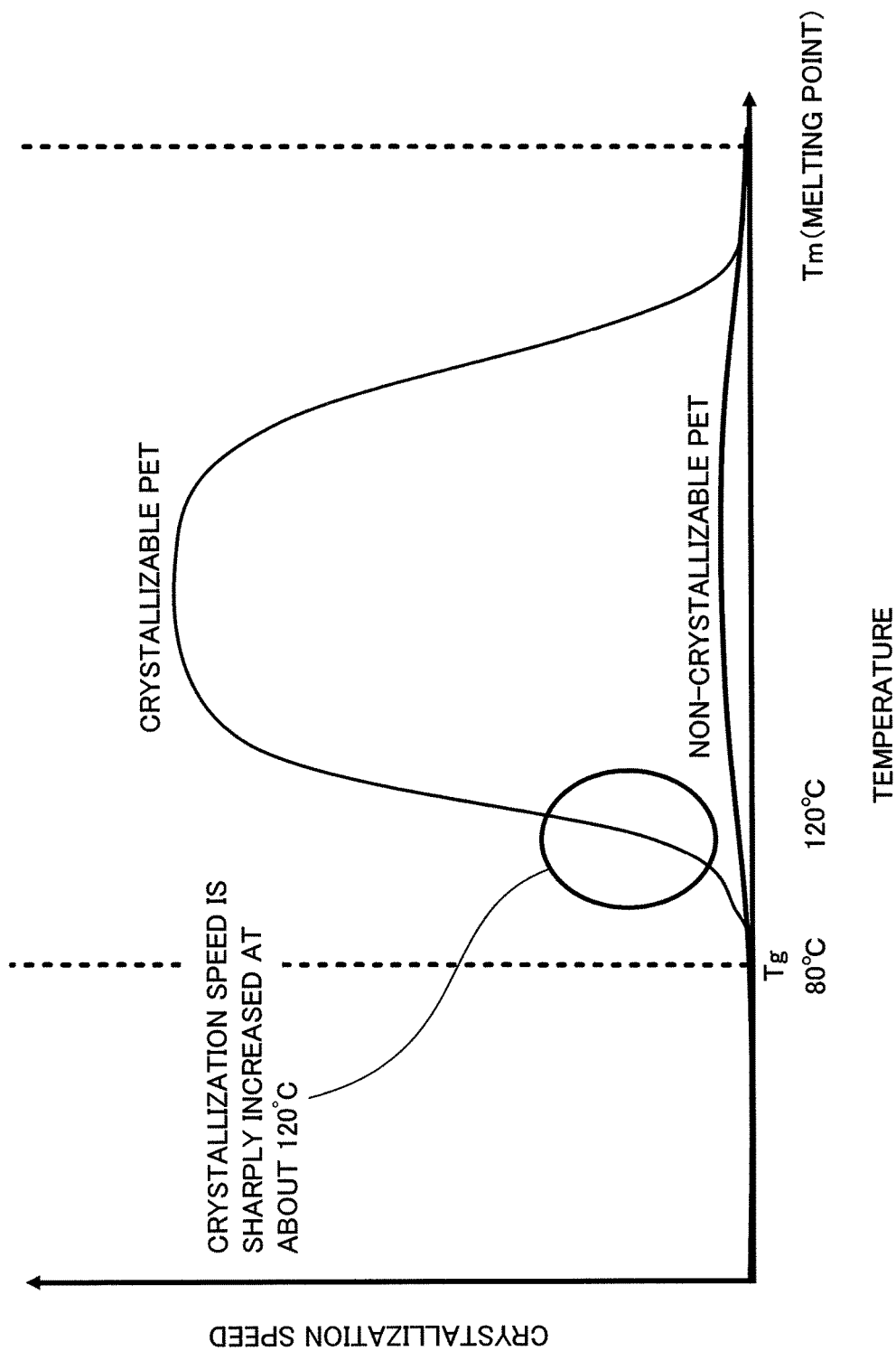
FIG. 19 is a graph illustrating a change in crystallization speed along with a change in temperature between a glass transition temperature Tg and a melting point Tm in each of the crystallizable PET and the non-crystallizable PET.

FIG. 19 illustrates a change in crystallization speed in each of the crystallizable PET and the non-crystallizable PET along with a change in temperature between a glass transition temperature Tg and a melting point Tm of polyethylene terephthalate (PET). FIG. 19 shows that the crystallizable PET in an amorphous state at a temperature of about 80 to 110° C. is rapidly crystallized at about 120° C.

As is clear from FIG. 18, in the crystallizable PET, an attainable stretching ratio during the elevated temperature in-air end-free uniaxial stretching has an upper limit of 4.5 to 5.5. In addition, an applicable stretching temperature is extremely limited, specifically, in the range of about 90° C. to about 110° C.

FIG. 29 illustrates an example where the elevated temperature in-air end-free uniaxial stretching is performed using a crystallizable PET, as the reference samples 1 to 3. In each of the reference samples, a 3.3 μm-thick polarizing film was produced by forming a 7 μm-thick PVA layer on a 200 μm-thick crystallizable PET substrate to form a laminate, and stretching the laminate in air under elevated temperature. There is a difference between stretching temperatures of the reference samples. Specifically, the stretching temperatures are 110° C. in the reference sample 1, 100° C. in the reference sample 2 and 90° C. in the reference sample 3. A noteworthy parameter is an attainable stretching ratio. An upper limit of the attainable stretching ratio in the reference sample 1 is 4.0, and an upper limit of the attainable stretching ratio in each of the reference samples 2 and 3 is 4.5. It was impossible to perform stretching beyond the attainable stretching ratios, because laminates themselves in the reference samples 1 to 3 were finally broken. However, a possibility cannot be denied that the attainable stretching ratio of the PVA type resin layer itself formed on the crystallizable PET has an impact on the above result.

Referring to FIG. 18, the dotted line therein indicates an attainable stretching ratio of PVA belonging to a PVA type resin. A glass transition temperature Tg of the PVA type resin is in the range of 75 to 80° C., and a single-layer made of the PVA type resin cannot be stretched at a temperature below the glass transition temperature Tg. As is clear from FIG. 18, the attainable stretching ratio of the single-layer of the PVA type resin during the elevated temperature in-air end-free uniaxial stretching is limited to up to 5.0. Thus, the inventors have been able to clarify that, from the relationship between the stretching temperature and the attainable stretching ratio of each of a crystallizable PET and a PVA type resin, an attainable stretching ratio of a laminate comprising a crystallizable PET substrate and a PVA type resin layer formed on the substrate, during the elevated temperature in-air end-free uniaxial stretching, is limited to the range of 4.0 to 5.0 at a stretching temperature ranging from 90 to 110° C.

An example in which a laminate prepared by coating a PVA type resin layer on a non-crystallizable PET substrate is subjected to an end-free uniaxial stretching in air under elevated temperature is shown as comparative examples 1 and 2 in the following Table 1. In the non-crystallizable PET substrate, there is no constraint of stretching temperature. In the comparative example 1, a polarizing film was produced by forming a 7 μm-thick PVA type resin layer on a 200 μm-thick non-crystallizable PET substrate to form a laminate, and subjecting the laminate to the elevated temperature in-air end-free uniaxial stretching at a stretching temperature of 130° C. The stretching ratio in the comparative example 1 was 4.0.

Referring to Table 1, in the comparative example 2, as with the comparative example 1, polarizing films were prepared by forming a 7 μm-thick PVA type resin layer on a 200 μm-thick non-crystallizable PET substrate to form laminates, and stretching the laminates to the stretching ratio of 4.5, 5.0 and 6.0, respectively. As illustrated in Table 1, there have been observed non-uniform stretching or breaking in the film surfaces of the non-crystalline PET substrates, and breaking of the PVA type resin layer at a stretching ratio of 4.5. Based on the data, it has been verified that the stretching ratio of the PVA type resin layer during the elevated temperature in-air end-free uniaxial stretching at a stretching temperature of 130° C. is limited to 4.0.

TABLE 1

(COMPARATIVE TABLE)

| | | Stretched film | |
|---|---|---|---|
| Stretching Temperature | Stretching Ratio | Non-crystallizable PET substrate (isophthalic acid-copolymerized PET) | Laminate of PVA type resin layer and non-crystallizable PET substrate |
| Comparative example 1 | 4.0 | ○ Uniformly stretched without breakage | ○ Uniformly stretched without breakage |
| Comparative example 2 | 4.5 | Δ No breakage but occurrence of non-uniform stretching | x Breakage of laminate of PVA type resin layer and non-crystallizable PET substrate |
| | 5.0 | Δ No breakage but occurrence of non-uniform stretching | Untested |
| | 6.0 | x Breakage | Untested |

In each of the reference samples 1 to 3, although there is a difference in stretching temperature, a dyed laminate was produced by steps of forming a PVA type resin layer on a crystallizable PET substrate to form a laminate, subjecting the laminate to stretching at a stretching ratio of 4.0 to 4.5 to allow PVA molecules to be oriented, and causing iodine to be absorbed in the thinned PVA type resin layer. Specifically, the stretched laminate was immersed in a dyeing solution containing iodine and potassium iodide under a temperature of 30° C., for an arbitrary time, to have iodine absorbed in the PVA type resin layer included in the stretched laminate, so that the PVA type resin layer constituting a target polarizing film has a single layer transmittance of 40 to 44%. In addition, the amounts of iodine to be absorbed in the thinned PVA type resin layers were adjusted to produce various polarizing films having different single layer transmittance T and polarization rate P.

Figure 26:
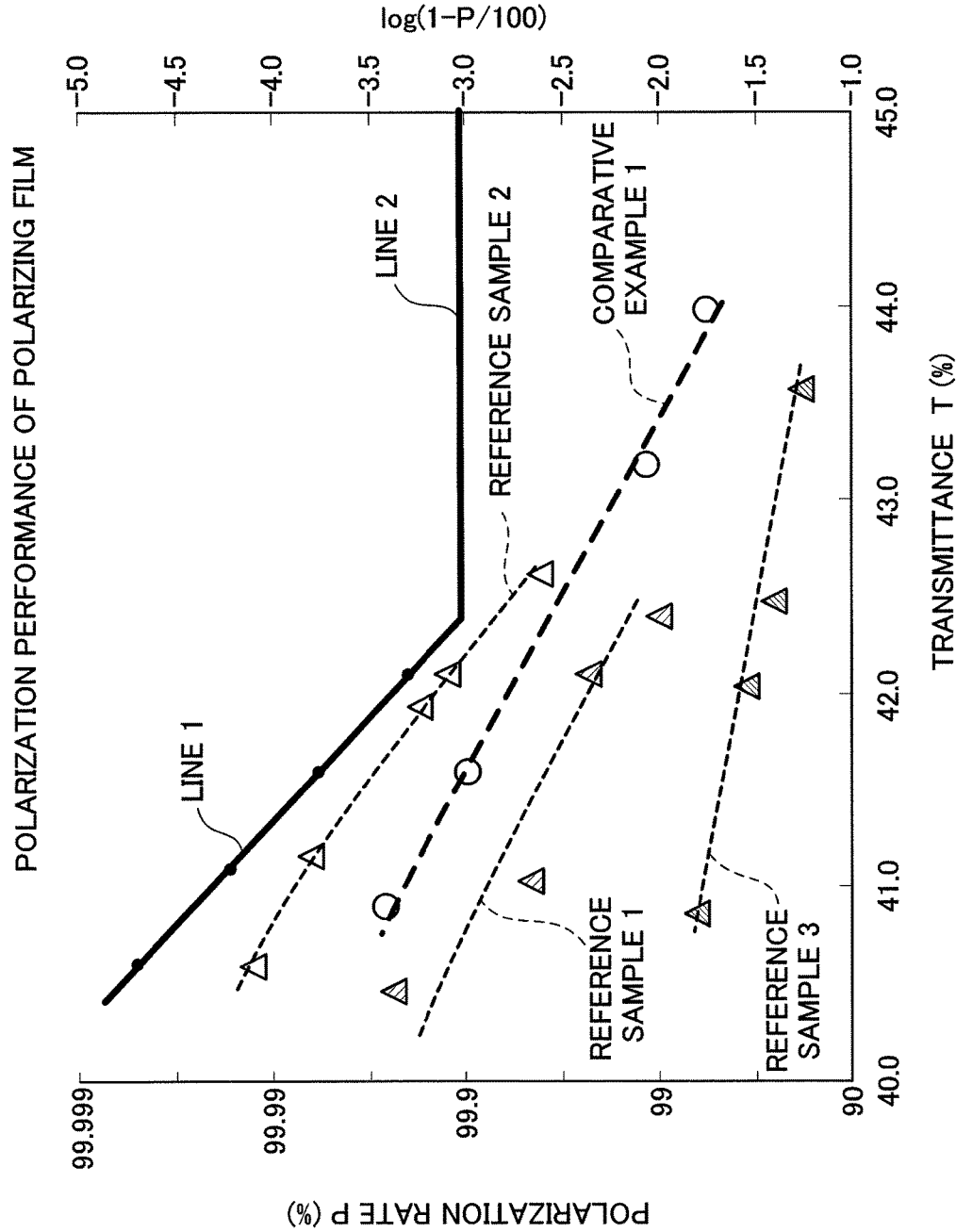
FIG. 26 is a graph illustrating polarization performance of a conventional example of a polarizing film produced without being subjected to the 2-stage stretching.

Referring to FIG. 26, the line 1 and the line 2 in FIG. 26 define optical characteristics required for a polarizing film for use in an optical display device, according to the present invention, wherein any polarizing film located above the line 1 or 2 in terms of the relationship between the polarization rate P and the transmittance T satisfies the required optical characteristics. In FIG. 26, respective optical characteristics of polarizing films in the reference samples 1 to 3 are illustrated in comparison with the lines 1 and 2. As seen in FIG. 26, none of the polarizing films in the reference samples 1 to 3 satisfies the required optical characteristics. The reason is because it is assumed that, although PVA molecules in the PVA type resin layer formed on the crystallizable PET substrate are oriented to a certain degree through the elevated temperature in-air stretching, the elevated temperature in-air stretching facilitates crystallization of the PVA molecules preventing non-crystalline portions of the molecules from being oriented.

Therefore, prior to the present invention, the inventors have developed a polarizing film and a production method therefor disclosed in the international application PCT/JP 2010/001460. This is based on findings with a focus on a plasticizing function of water in which a laminate comprising a PET substrate and a PVA type resin layer formed on the substrate can be stretched even at a stretching temperature below a glass transition temperature Tg thereof. An example of a polarizing film produced by the process is shown as a comparative example 3 herein. In accordance with this method, the laminate comprising the PET substrate and the PVA type resin layer formed on the substrate can be stretched at a stretching ratio of up to 5.0.

Through subsequent researches, the inventors have ascertained that the stretching ratio is limited to 5.0 because the PET substrate is made of crystallizable PET. Previously, the inventors have considered that the stretching function would not largely be affected by the crystallizing property of the substrate, since a laminate comprising a PET substrate and a PVA type resin layer formed on the substrate was stretched in a boric acid aqueous solution at a temperature below a glass transition temperature Tg. However, it was found that, in cases where the PET substrate is made of non-crystallizable PET, the laminate can be stretched at a stretching ratio of up to 5.5. It is assumed that, in a polarizing film production method equivalent to the comparative example 3, the stretching ratio is limited to 5.5, due to the non-crystallizable PET substrate which poses a limit on the stretching ratio.

In the comparative example 1, various polarizing films having different single layer transmittance T and polarization rate P were prepared. Respective optical characteristics of the polarizing films are illustrated in FIG. 26 together with those in the reference samples 1 to 3.

Figure 20:
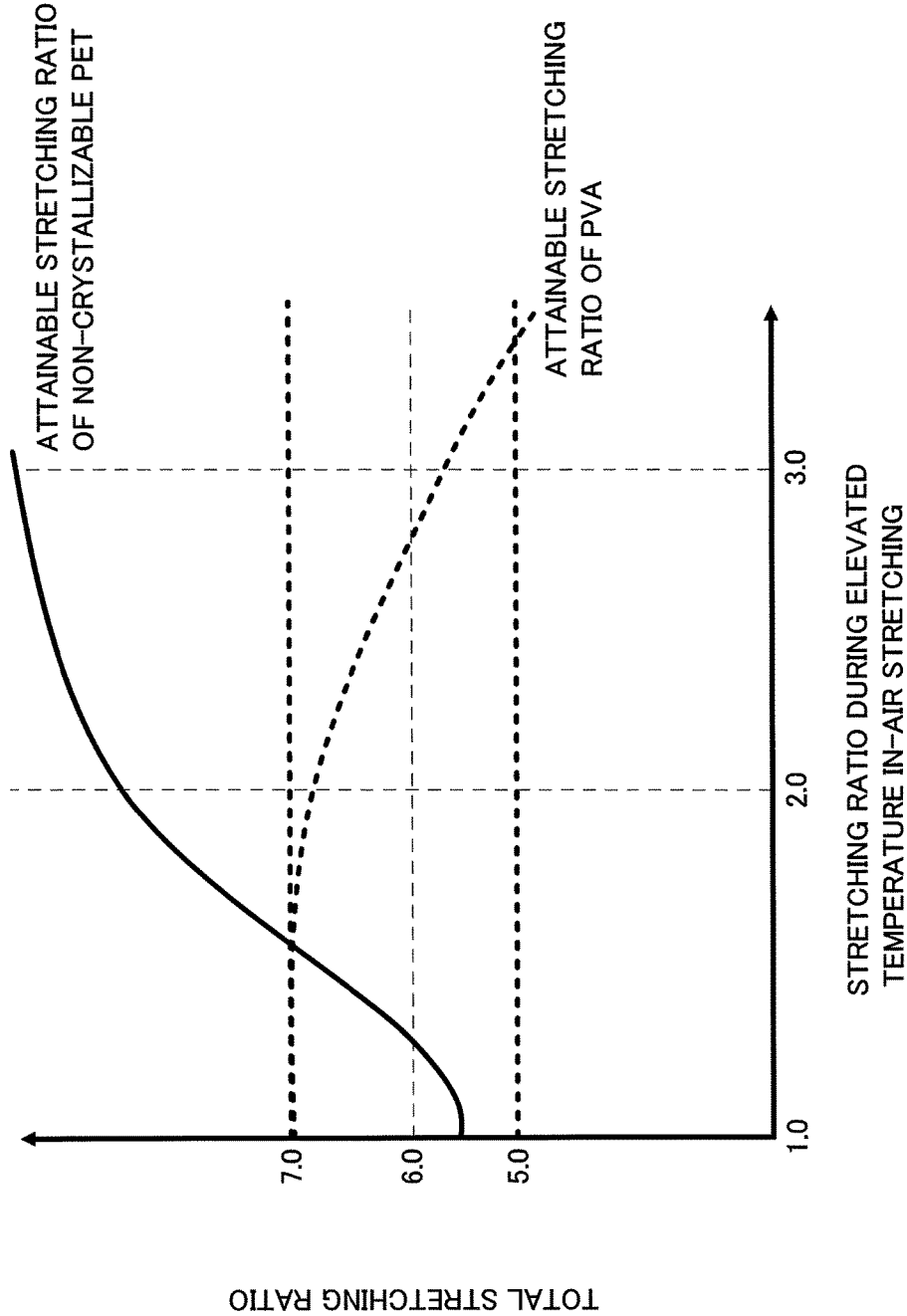
FIG. 20 is a graph illustrating a relationship between a stretching ratio during elevated temperature in-air stretching and a total stretching ratio, in the non-crystallizable PET and the PVA type resin.

FIG. 20 illustrates the relationship between the stretching ratio through the elevated temperature in-air stretching, and the overall or total stretching ratio (hereinafter referred to as "total stretching ratio") under the 2-stage stretching, which has been conceived based on the above inventors' research results, wherein the horizontal axis represents a stretching ratio under the elevated temperature in-air stretching at a stretching temperature of 130° C. carried out by an end-free uniaxial stretching process, and the vertical axis represents a total stretching ratio which indicates how many times an original length is finally stretched by the 2-stage stretching including the elevated temperature in-air stretching carried out by an end-free uniaxial stretching process on an assumption that the original length, i.e., a length before the elevated temperature in-air stretching, is 1. For example, in the cases where the stretching ratio under the elevated temperature in-air stretching at a stretching temperature of 130° C. is 2.0, and the stretching ratio under the second-stage stretching is 3.0, the total stretching ratio will be 6.0 (2.0×3.0=6). The second-stage stretching after the elevated temperature in-air stretching is an end-free uniaxial stretching process to be performed within a boric acid aqueous solution at a stretching temperature of 65° C. (the stretching through a boric acid aqueous solution immersion process will hereinafter be referred to as "in-boric-acid-solution stretching"). The result illustrated in FIG. 20 can be obtained by combining the two stretching processes.

The solid line in FIG. 20 indicates an attainable stretching ratio in a non-crystallizable PET. In the cases where the in-boric-acid-solution stretching is directly performed without performing the elevated temperature in-air stretching, i.e., the stretching ratio during the elevated temperature in-air stretching is 1, the total stretching ratio of the non-crystallizable PET is limited to up to 5.5. If stretching is performed beyond this value, the non-crystallizable PET will be broken. However, this value corresponds to the minimum stretching ratio of the non-crystallizable PET. The total stretching ratio of the non-crystallizable PET can be increased in accordance with an increase in the stretching ratio under the elevated temperature in-air stretching, and the attainable stretching ratio can be greater than 10.0.

On the other hand, the dotted line in FIG. 20 indicates an attainable stretching ratio of a PVA type resin layer formed on the non-crystallizable PET. In the cases where the in-boric-acid-solution stretching is directly performed without performing the elevated temperature in-air stretching, the total stretching ratio of the PVA type resin layer is 7, which is the maximum stretching ratio under the process. However, the total stretching ratio of the PVA type resin layer becomes smaller along with an increase in the stretching ratio under the elevated temperature in-air stretching. At a point where the elevated temperature in-air stretching ratio is 3.0, the total stretching ratio of the PVA type resin layer becomes less than 6.0. If it is attempted to increase the total stretching ratio of the PVA type resin layer up to 6.0, the PVA type resin layer will be broken. As is also clear from FIG. 20, depending on the level of the stretching ratio during the elevated temperature in-air stretching, a factor causing a laminate comprising a non-crystallizable PET substrate and a PVA type resin layer formed on the substrate to become unable to be stretched is changed from the non-crystallizable PET substrate to the PVA type resin layer. For reference, the stretching ratio of PVA under the elevated temperature in-air stretching is up to 4.0, and the PVA cannot be stretched beyond this value. It is assumed that this stretching ratio corresponds to the total stretching ratio of the PVA.

Figure 21:
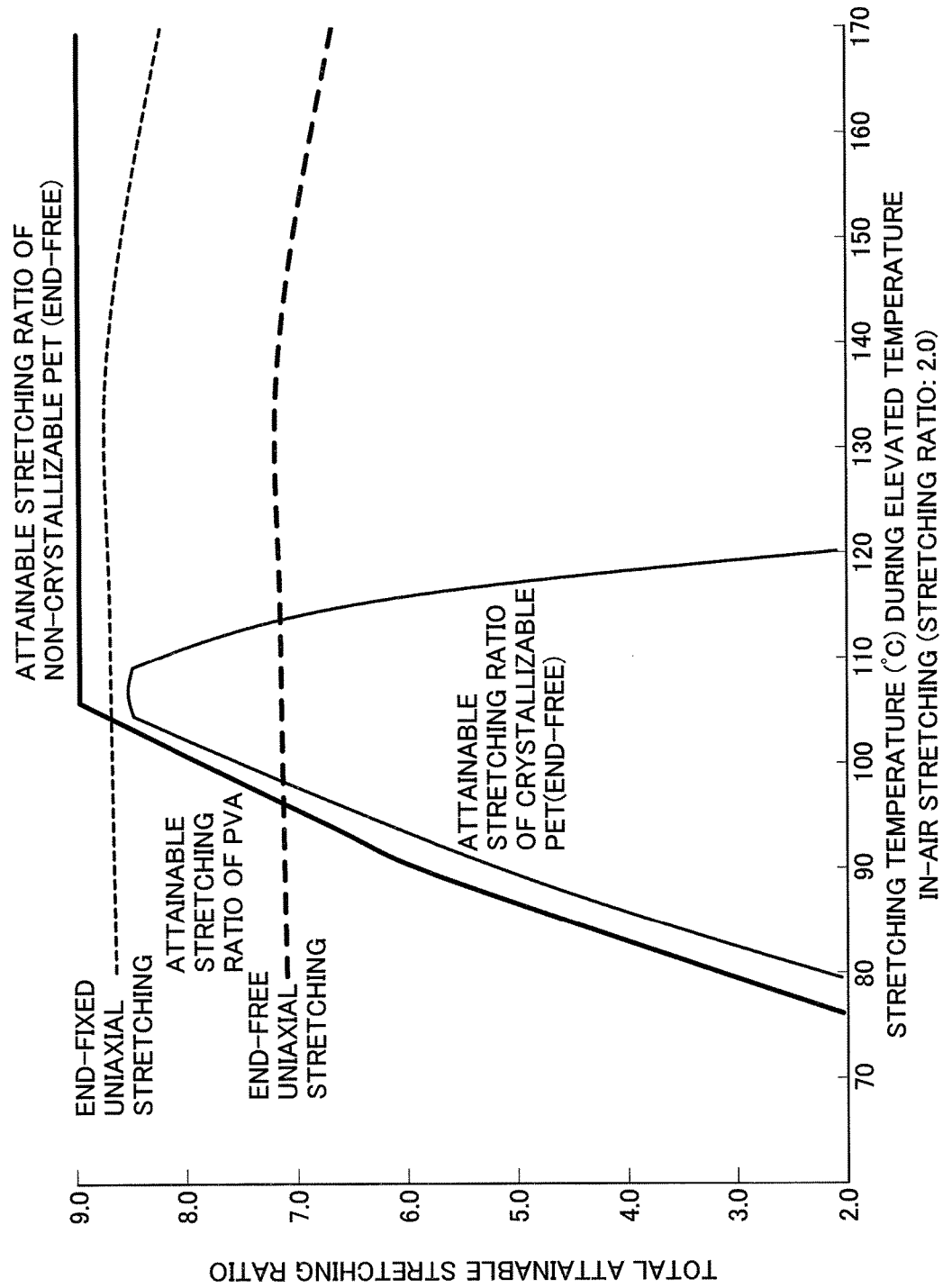
FIG. 21 is a graph illustrating a relative relationship between a stretching temperature during the elevated temperature in-air stretching and a total attainable stretching ratio, in each of the crystallizable PET, the non-crystallizable PET and the PVA type resin.

Referring now to FIG. 21, there is shown a graph indicating the relationship between the stretching temperature during the elevated temperature in-air stretching and the total attainable stretching ratio in the 2-stage stretching consisting of the elevated temperature in-air stretching and the in-boric-acid-solution stretching, in each of crystallizable PET, non-crystallizable PET and PVA type resin, wherein the graph is plotted based on experimental data. FIG. 18 illustrates characteristics of a crystallizable PET, a non-crystallizable PET and a PVA type resin, wherein the horizontal axis represents the stretching temperature under the elevated temperature in-air stretching, and the vertical axis represents an attainable stretching ratio under the elevated temperature in-air stretching. FIG. 21 is different from FIG. 18 in that the horizontal axis represents the stretching temperature when the stretching ratio under the elevated temperature in-air stretching ratio is 2.0, and the vertical axis represents the total attainable stretching ratio under the elevated temperature in-air stretching and the in-boric-acid-solution stretching.

The method of producing a polarizing film which can be used in to the present invention comprises a combination of 2-stage stretching steps consisting of elevated temperature in-air stretching and in-boric-acid-solution stretching, as will be described later. The combination of 2-stage stretching steps is not the one which is simply conceivable. Through various long-term researches, the inventors have finally reached a surprising conclusion that the following two technical problems can be simultaneously solved only by the combination. In an attempt to produce a polarizing film by forming a PVA type resin layer on a thermoplastic resin substrate to form a laminate, and subjecting the laminate to stretching and dyeing, there are two technical problems which have been considered to be impossible to overcome.

The first technical problem is that the stretching ratio and the stretching temperature each having an impact on improvement in molecular orientation of a PVA type resin are largely restricted by the thermoplastic resin substrate on which the PVA type resin layer is formed.

The second technical problem is that, for example, even if the problem on restrictions to the stretching ratio and the stretching temperature can be overcome, stretching of the PVA type resin is restricted due to its crystallization because crystallization and stretchability of a crystallizable resin such as the PVA type resin and PET used for the thermoplastic resin substrate are incompatible physical properties.

The first technical problem will further be discussed in the followings. One of the restrictions in producing a polarizing film using a thermoplastic resin substrate is caused by the property of the PVA type resin in that the stretching temperature is above the glass transition temperature Tg (about 75 to 80° C.) thereof and its attainable stretching ratio is in the range of 4.5 to 5.0. If a crystallizable PET is used as a material for the thermoplastic resin substrate, the stretching temperature is further restricted to 90 to 110° C. It has been considered that any polarizing film cannot be free from the above restriction as long as it is produced by a process of forming a PVA type rein layer on a thermoplastic resin substrate to form a laminate, and subjecting the laminate to the elevated temperature in-air stretching to have the PVA type rein layer included in the laminate decreased in thickness.

Therefore, with a focus on a plasticizing function of water, the inventors have proposed in-boric-acid-solution stretching capable of serving as an alternative to the elevated temperature in-air stretching. However, even in the in-boric-acid-solution stretching at a stretching temperature of 60 to 85° C., it has been difficult to overcome the restriction caused by the thermoplastic resin substrate, specifically, a restriction that the stretching ratio attainable in a crystallizable PET is limited to up to 5.0, and the stretching ratio in a non-crystallizable PET is limited to 5.5. These facts cause a restriction on improvement in orientation of PVA molecules, which leads to a restriction to optical characteristics of the polarizing film of a decreased thickness. This is the first technical problem.

Figure 22:
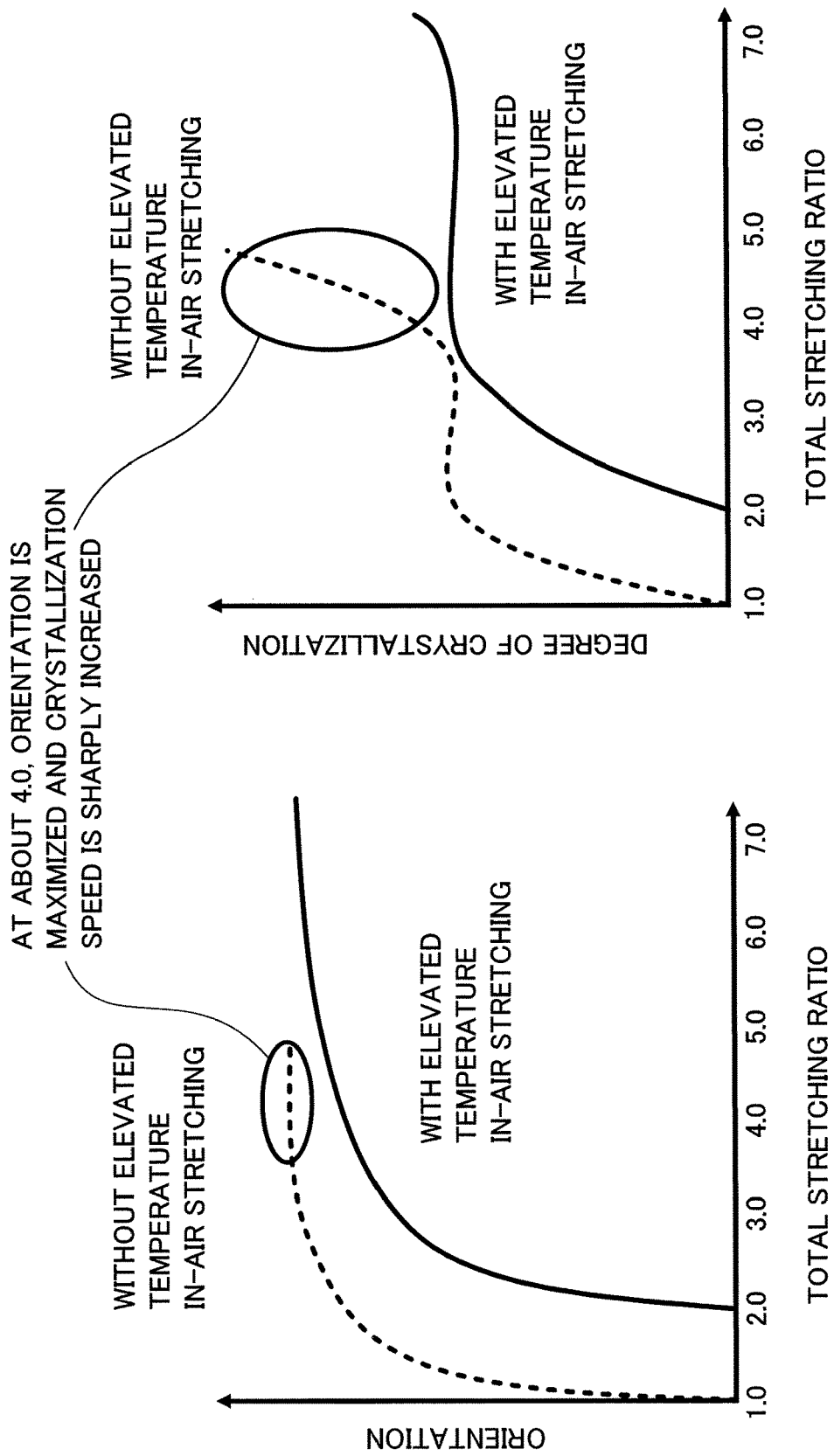
FIG. 22 is a graph illustrating a molecular orientation and a degree of crystallization with respect to a total stretching ratio, in PET to be used as a thermoplastic resin substrate.

A solution to the first technical problem can be explained based on FIG. 22. FIG. 22 includes two related graphs, one being a diagram illustrating a molecular orientation of a PET used as the thermoplastic resin substrate, and the other being a diagram illustrating the degree of crystallization of the PET, wherein the horizontal axis commonly represents the total stretching ratio obtained through the elevated temperature in-air stretching and the in-boric-acid-solution stretching. Each of the dotted lines in FIG. 22 indicates the total stretching ratio obtained through only the in-boric-acid-solution stretching. Regardless of whether crystallizable or non-crystallizable, the extent of crystallization of the PET is sharply increased at a total stretching ratio of 4.0 to 5.0. Thus, even in cases where the in-boric-acid-solution stretching is employed, the stretching ratio is limited to 5.0 or 5.5. At this stretching ratio, the molecular orientation is maximized, and there will be a sharp increase in the stretching tension. As the result, stretching becomes no longer possible.

On the other hand, the solid lines in FIG. 22 illustrate the result of 2-stage stretching in which the elevated temperature in-air end-free uniaxial stretching is performed at a stretching temperature of 110° C. to attain a stretching ratio of 2.0, and then the in-boric-acid-solution stretching is performed at a stretching temperature of 65° C. Regardless of whether crystallizable or non-crystallizable, the extent of crystallization of the PET is never sharply increased, differently from the cases where only the in-boric-acid-solution stretching is performed. This allows the total stretchable ratio to be increased up to 7.0. At this total stretchable ratio, the molecular orientation is maximized, and the stretching tension is sharply increased. As is clear from FIG. 21, this would result from employing the elevated temperature in-air end-free uniaxial stretching as the first-stage stretching. In contrast, if the elevated temperature in-air stretching is performed while constraining contraction in a direction perpendicular to the direction of the stretching, i.e., based on a so-called "end-fixed uniaxial stretching process", as described later, the total attainable stretching ratio can be increased up to 8.5.

Figure 23:
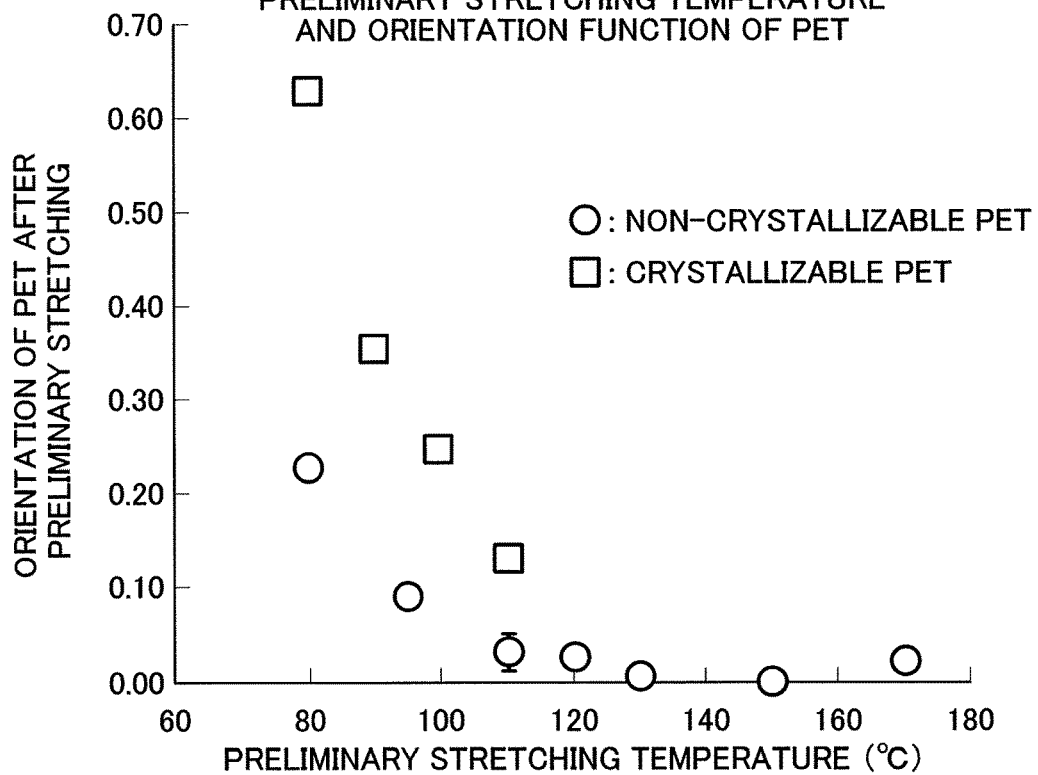
FIG. 23 is a graph illustrating a relationship between a preliminary stretching temperature during preliminary in-air stretching at a stretching ratio of 1.8, and an orientation function of PET after the preliminary in-air stretching.

The relationship between the molecular orientation and the extent of crystallization of the PET used as a material for the thermoplastic resin substrate, illustrated in FIG. 22, shows that crystallization of the PET can be suppressed, regardless of whether crystallizable or non-crystallizable, by performing a preliminary stretching based on the elevated temperature in-air stretching. However, referring to FIG. 23 which illustrates the relationship between the preliminary stretching temperature and the molecular orientation of the PET, it is noted that, in cases where a crystallizable PET is used as a material for the thermoplastic resin substrate, the molecular orientation of the crystallizable PET after the preliminary stretching is 0.30 or more at 90° C., 0.20 or more at 100° C., and 0.10 or more even at 110° C. If the molecular orientation of the PET becomes equal to or greater than 0.10, there will be an increase in the stretching tension in the second-stage stretching performed within a boric acid aqueous solution, and there will be a corresponding increase in the load imposed on the stretching apparatus, which is undesirable in terms of production conditions. FIG. 23 shows that it is preferable to use, as a material for the thermoplastic resin substrate, a non-crystallizable PET, more preferably a non-crystallizable PET having an orientation function of 0.10 or less, particularly preferably a non-crystallizable PET having an orientation function of 0.05 or less.

FIG. 23 illustrates experimental data indicating the relationship between the stretching temperature in the elevated temperature in-air stretching at a stretching ratio of 1.8 and the orientation function of the PET used as a material for the thermoplastic resin substrate. As is clear from FIG. 23, in the case where a non-crystallizable PET is used, it is possible to make the PET to have an orientation function of 0.10 or less allowing a stretched laminate to be stretched within a boric acid aqueous solution to a high stretching ratio. Particularly, in the cases where the orientation function is 0.05 or less, the non-crystallizable PET can be steadily stretched at a high stretching ratio without subjecting the stretching apparatus to a substantial load which may cause, for example, an increase in the stretching tension, during the second-stage in-boric-acid-solution stretching. This feature can also be easily understood from values of the orientation function in the Examples 1 to 18 and the reference samples 1 to 3 in FIG. 29.

By solving the first technical problem, it has become possible to eliminate restrictions to the stretching ratio which would otherwise be caused by the PET substrate, and increase the total stretching ratio to improve the molecular orientation of the PVA type resin. Thus, optical characteristics of the polarizing film can be significantly improved. However, an improvement in the optical characteristics achieved by the inventors is not limited thereto. Further improvement will be achieved by solving the second technical problem.

Figure 24:
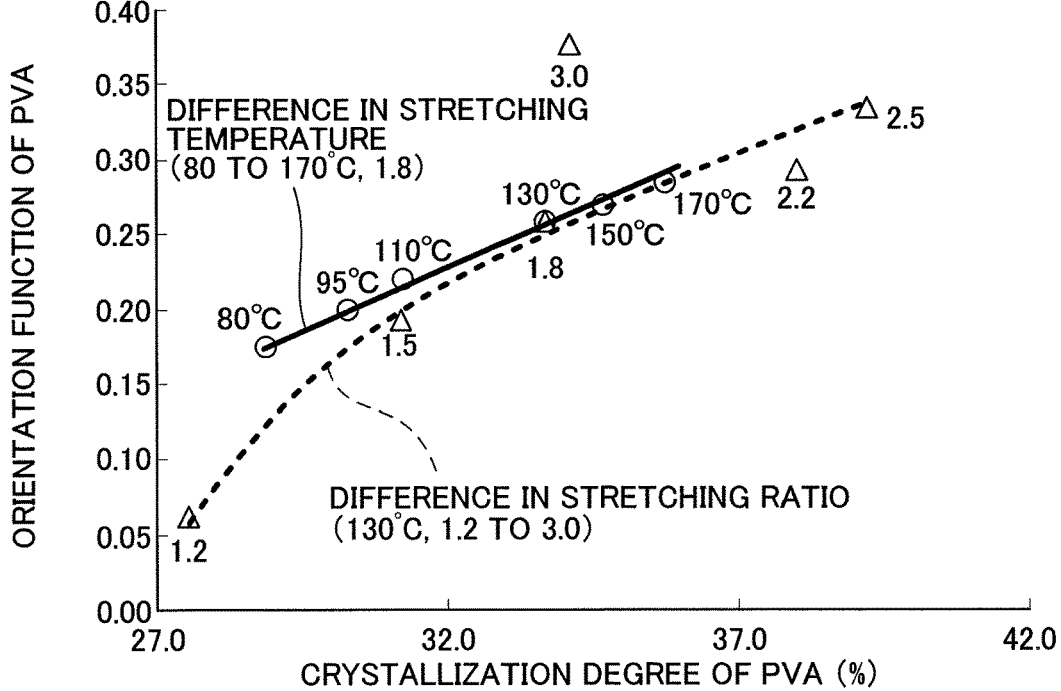
FIG. 24 is a graph illustrating a relationship between a degree of crystallization and a orientation function of PVA.
Figure 25:
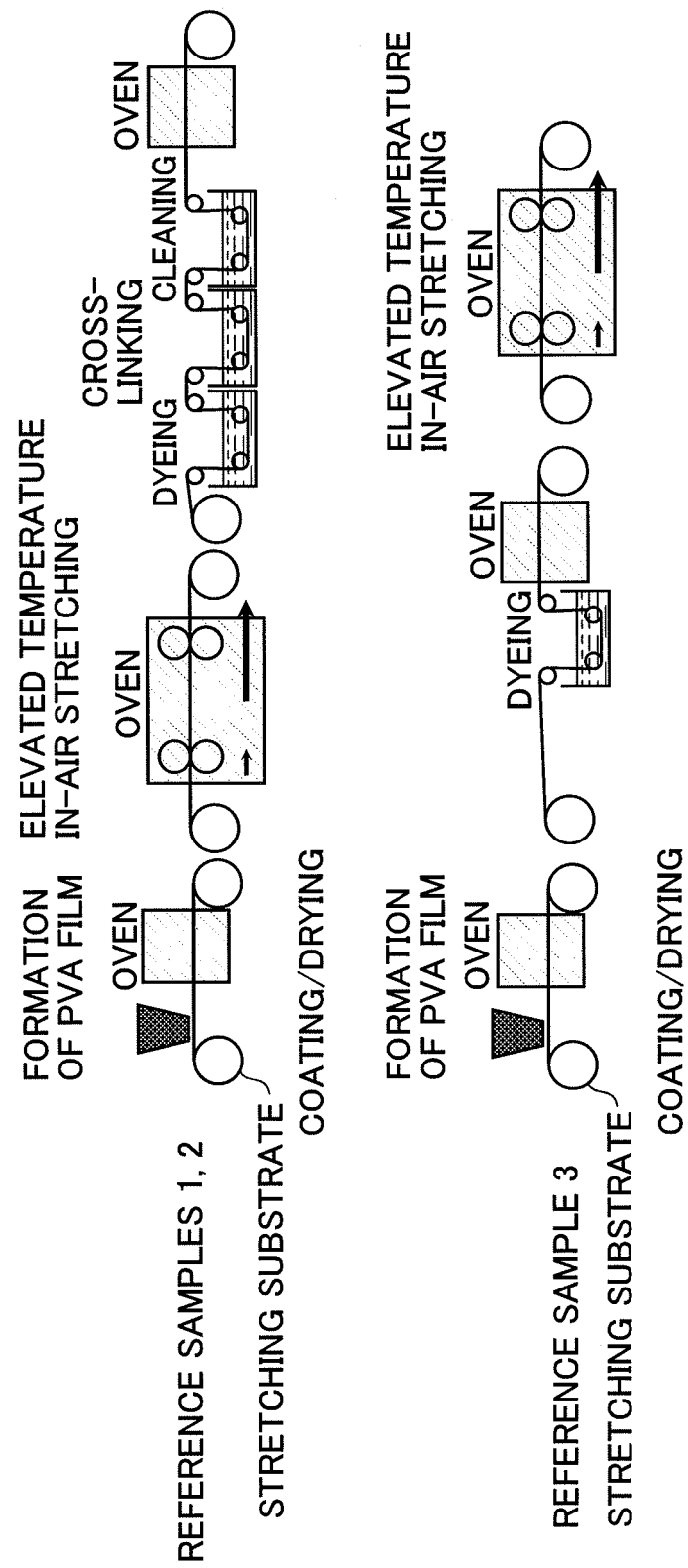
FIG. 25 is a schematic diagram illustrating a production process of producing a polarizing film using a thermoplastic resin substrate.

The second technical problem will further be discussed in the followings. One of the features inherent to a PVA type resin and a crystallizable resin such as PET as a material for the thermoplastic resin substrate is that, in general, polymer molecules are orderly arranged by heating and stretching/orienting and thereby crystallization is progressed. Stretching of the PVA type resin is restricted by crystallization of the PVA type resin which is a crystallizable resin. Crystallization and stretchability are mutually incompatible physical properties, and it has been commonly recognized that progress in crystallization of the PVA type resin hinders the molecular orientation of the PVA type resin. This is the second technical problem. Means for solving the second technical problem can be explained based on FIG. 24. In FIG. 24, each of the solid line and the dotted line indicates the relationship between the extent of crystallization and the orientation function of the PVA type resin, calculated based on two experimental results.

The solid line in FIG. 24 indicates the relationship between the extent of crystallization and the orientation function of a PVA type resin in each of six samples provided in the following manner. Firstly, six laminates each comprising a non-crystallizable PET substrate and a PVA type resin layer formed on the substrate were prepared under the same conditions. The prepared six laminates each including the PVA type resin layer were subjected to the elevated temperature in-air stretching, respectively, at different stretching temperatures of 80° C., 95° C., 110° C., 130° C., 150° C. and 170° C., to attain the same stretching ratio of 1.8, so as to obtain six stretched laminates each including a PVA type resin layer. Then, the extent of crystallization of the PVA type resin layer included in each of the stretched laminates and the orientation function of the PVA type resin were measured and analyzed. Details of methods of the measurement and analysis will be described later.

Similarly, the dotted line in FIG. 24 indicates the relationship between the extent of crystallization and the orientation function of a PVA type resin layer in each of six samples provided in the following manner. Firstly, six laminates each comprising a non-crystallizable PET substrate and a PVA type resin layer formed on the substrate were prepared under the same conditions. The prepared six laminates each including the PVA type resin layer were stretched by the elevated temperature in-air stretching at the same stretching temperature of 130° C. to attain different stretching ratios of 1.2, 1.5, 1.8, 2.2, 2.5 and 3.0, respectively, so as to obtain six stretched laminates each including a PVA type resin layer. Then, the extent of crystallization of the PVA type resin layer included in each of the stretched laminates and the orientation function of the PVA type resin were measured and analyzed by the methods described later.

The solid line in FIG. 24 shows that the molecular orientation of the PVA type resin included in the stretched laminate is improved as the stretching temperature during the elevated temperature in-air stretching is set to a higher value. Further, the dotted line in FIG. 24 shows that the molecular orientation of the PVA type resin included in the stretched laminate is improved as the stretching ratio during the elevated temperature in-air stretching is set to a higher value. In other words, in advance of the second-stage in-boric-acid-solution stretching, the molecular orientation of the PVA type resin is improved, i.e., the extent of crystallization of the PVA type resin is increased. This leads to improvement in molecular orientation of the PVA type resin after the in-boric-acid-solution stretching. In addition, the improvement in molecular orientation of the PVA type resin leads to an improvement in orientation of polyiodide ions. This can be ascertained from the T-P graphs of the Examples as described later.

As above, it has been possible to attain an unanticipated remarkable result in that the orientation of PVA molecules in the PVA type resin layer formed by the second-stage in-boric-acid-solution stretching can be further improved by setting the stretching temperature or the stretching ratio during the first-stage elevated temperature in-air stretching to a higher value.

Reference will now be made to the crystallization degree or extent of crystallization (horizontal axis) of the PVA type resin illustrated in FIG. 24. Preferably, the extent of crystallization or the crystallization degree of PVA type resin layer should be 27% or more so as to allow a dyed laminate to be formed without causing a problem such as dissolution of the PVA type resin layer, in a dyeing step of immersing the stretched laminate including the PVA type resin layer in a dyeing aqueous solution. This makes it possible to dye the PVA type resin layer without causing dissolution of the PVA type resin layer. The crystallization degree of the PVA type resin layer may be set to 30% or more. In this case, the stretching temperature during the in-boric-acid-solution stretching can be increased. This makes it possible to stably perform the stretching of the dyed laminate and stably produce a polarizing film.

On the other hand, if the crystallization degree of the PVA type resin layer is 37% or more, dyeability of the PVA type resin layer will be deteriorated, and thereby it is necessary to increase a concentration of the dyeing aqueous solution, so that an amount of material to be used, and a required time for the dyeing, will be increased, which is likely to cause deterioration in productivity. If the crystallization degree of the PVA type resin layer is set to 40% or more, another problem, such as breaking of the PVA type resin layer during the in-boric-acid-solution stretching, is likely to occur. Therefore, the extent of crystallization or the crystallization degree of the PVA type resin is preferably determined in the range of 27% to 40%, more preferably in the range of 30% to 37%.

Reference is now made to the orientation function (vertical axis) of the PVA type resin layer illustrated in FIG. 24. Preferably, the orientation function of the PVA resin layer is set to 0.05 or more so as to allow a highly functional polarizing film to be prepared using a non-crystallizable PET resin substrate. The orientation function of the PVA type resin layer may be set to 0.15 or more. In this case, the stretching ratio during the in-boric-acid-solution stretching for the dyed laminate including the PVA type resin layer can be reduced. This makes it possible to prepare a polarizing film having a larger width.

On the other hand, if the orientation function of the PVA type resin layer is set to 0.30 or more, the dyeability will be deteriorated, and thereby it is necessary to increase the concentration of the dyeing aqueous solution, so that an amount of material to be used, and a required time for the dyeing, will be increased, which is likely to cause deterioration in productivity. If the orientation function of the PVA type resin layer is set to 0.35 or more, another problem, such as breaking of the PVA type resin layer during the in-boric-acid-solution stretching, is likely to occur. Therefore, the orientation function of the PVA type resin is preferably set in the range of 0.05 to 0.35, more preferably in the range of 0.15 to 0.30.

Means for solving the first technical problem is to auxiliarily or preliminarily stretch a laminate comprising a non-crystallizable PET substrate and a PVA type resin layer formed on the substrate by the first-stage elevated temperature in-air stretching, whereby the PVA type resin layer can be stretched at a higher stretching ratio by the second-stage in-boric-acid-solution stretching without being restricted by the stretching ratio of the non-crystallizable PET substrate, so that the molecular orientation of the PVA is sufficiently improved.

Means for solving the second technical problem is to auxiliarily or preliminarily set the stretching temperature during the first-stage elevated temperature in-air stretching to a higher value, or auxiliarily or preliminarily set the stretching ratio during the first-stage elevated temperature in-air stretching to a higher value, whereby an unanticipated result has been provided that the orientation of PVA molecules in the PVA type resin layer formed by the second-stage in-boric-acid-solution stretching is further improved. In either case, the first-stage elevated temperature in-air stretching can be regarded as auxiliary or preliminary in-air stretching means for the second-stage in-boric-acid-solution stretching. The "first-stage elevated temperature in-air stretching" will hereinafter be referred to as "preliminary in-air stretching", in contrast to the second-stage in-boric-acid-solution stretching.

In particular, a mechanism for solving the second technical problem by performing the "preliminary in-air stretching" can be assumed as follows. As is ascertained in FIG. 24, the molecular orientation of the PVA type resin after the preliminary in-air stretching is improved as the preliminary in-air stretching is performed at a higher temperature or a higher ratio. It is assumed that this is because the stretching is performed in a more progressed state of crystallization of the PVA type resin as the stretching temperature or rate becomes higher. Consequently, the molecular orientation of the PVA type resin is improved. In this manner, the molecular orientation of the PVA type resin is improved by the preliminary in-air stretching in advance of the in-boric-acid-solution stretching. In this case, it is assumed that, when the PVA type resin is immersed in a boric acid aqueous solution, boric acid can be easily cross-linked with the PVA type resin, and the stretching is performed under a condition that nodes are being formed by the boric acid. Consequently, the molecular orientation of the PVA type resin is further improved after the in-boric-acid-solution stretching.

Considering all the above factors together, a polarizing film having a thickness of 10 μm or less and optical characteristics satisfying the following condition (1) or (2) can be obtained by performing stretching based on the 2-stage stretching consisting of a preliminary in-air stretching and in-boric-acid-solution stretching:

$P > (10^{0.929T-42.4} - 1) \times 100$ (where $T < 42.3$); and      Condition (1)

$P \geq 99.9$ (where $T \geq 42.3$), or $T \geq 42.5$; and $P \geq 99.5$      Condition (2)

wherein T is a single layer transmittance, and P is a polarization rate. The dichroic material may be iodine or a mixture of iodine and an organic dye.

A polarizing film having optical characteristics in which the single layer transmittance T and the polarization rate P fall within the ranges represented by the above conditions fundamentally has a performance required for use in a display device for a liquid-crystal television using a large-sized display element, or performance required for use in an organic EL display device. Specifically, for liquid-crystal televisions, it is possible to produce an optical display device having a contrast ratio of 1000:1 or more, and, a maximum luminance of 500 cd/m² or more. In this specification, this performance will be referred to as "required performance". This polarizing film can also be used in an optically functional film laminate to be laminated to a viewing side of an organic EL display panel.

When used with a liquid-crystal display panel, a polarizing film to be disposed on one of a backlight and viewing sides of the liquid-crystal display panel must have polarization performance satisfying at least the above optical characteristics. Further, in cases where a polarizing film having a polarization rate of 99.9% or less is disposed on one of the backlight and viewing sides, it will become difficult to achieve the required performance, even if a polarizing film having highest possible polarization performance is disposed on the other side.

Reference will now be made to FIG. 1. FIG. 1 illustrates the result of verification on whether the thickness of a non-crystallizable ester type thermoplastic resin substrate and the coating thickness of a PVA type resin layer (a thickness of a polarizing film) are likely to pose a certain problem. In FIG. 1, the horizontal axis represents the thickness of the thermoplastic resin substrate designated in units of μm, and the vertical axis represents the thickness of the PVA type resin layer coated on the substrate. On the vertical axis, the numeral in parentheses indicates the thickness of a polarizing film formed by subjecting the PVA type resin layer on the substrate to stretching and dyeing. As illustrated in FIG. 1, if the thickness of the substrate is 5 times or less the thickness of PVA type resin layer, a problem is likely to occur in terms of transportability or feedability. On the other hand, if the thickness of the polarizing film obtained through the stretching and dyeing becomes equal to or greater than 10 μm, a problem is likely to occur in terms of crack resistance of the polarizing film.

As a material for the thermoplastic resin substrate, it is preferable to use a non-crystallizable ester type resin. This type of thermoplastic resin may be a non-crystallizable polyethylene terephthalate comprising copolymerized polyethylene terephthalate which includes isophthalic acid-co-polymerized polyethylene terephthalate and cyclohexanedi-methanol-copolymerized polyethylene terephthalate. The substrate may be made of a transparent resin. Although the above description has been made based on an example in which a non-crystallizable resin material is used as the thermoplastic resin substrate, a crystallizable resin material may also be used.

Preferably, a dichroic material for dyeing a polyvinyl alcohol type resin is iodine, or a mixture of iodine and an organic dye.

In the present invention, an optically functional film may be bonded to a polarizing film made of the PVA type resin layer on the thermoplastic resin substrate. Further, after peeling the resin substrate from the polarizing film, a separator film may be releasably laminated to a surface of the polarizing film from which the resin substrate is peeled, through an adhesive layer. The separator film is treated to have the adhesion force thereof to the adhesive layer weaker than an adhesion force of the polarizing film to the adhesive layer, so that, when the separator film is peeled from the polarizing film, the adhesive layer is left on the side of the polarizing film. In cases where a roll of an optical film laminate to be produced according to the present invention is used for manufacturing display devices, the separator film may be used as a carrier film. Alternatively, the separator may be used only as a medium for giving an adhesive layer to the polarizing film.

In another embodiment of the present invention, an optically functional film laminate may be formed by attaching an optically functional film to a surface of the thermoplastic resin substrate, such as a non-crystallizable ester type thermoplastic resin substrate, on which the polarizing film is not formed, and releasably laminating a separator film onto the optically functional film through an adhesive layer. In this case, the optically functional film may be one of a plurality of conventional optically functional films incorporated in display devices so as to achieve various optical functions. The optically functional film may include the aforementioned ¼ wavelength phase difference film. There have also been known various optically functional film used for viewing angle compensation. In another embodiment, after attaching an optically functional film to a surface of the polarizing film on a side opposite to the thermoplastic resin substrate, a film, such as a protective film, may be attached onto the optically functional film through an adhesive layer. Then, after peeling the thermoplastic resin substrate, a separator film may be attached to a surface of the polarizing film from which the substrate is peeled, through an adhesive layer. A defect inspection may be performed after peeling the separator film. Then, after completion of the inspection, the peeled separator film or a newly prepared separator film may be bonded to the polarizing film through an adhesive layer.

As is evidenced from FIG. 1, the thickness of the thermoplastic resin substrate, such as the non-crystallizable ester type thermoplastic resin substrate is preferably 6 times or more, more preferably 7 times or more, the thickness of the PVA type resin layer formed on the substrate. In cases where the thickness of the non-crystallizable ester type thermoplastic resin substrate is 6 times or more with respect to the PVA type resin layer, it becomes possible to prevent the occurrence of problems in terms of transportability or feedability, e.g., breaking during transportation or feeding in a production process due to excessively low film strength, or problems in terms of curling and transferability of the polarizing film when it is disposed on one of backlight and viewing sides of a liquid-crystal display device.

Preferably, the non-crystallizable ester type thermoplastic resin substrate is made of a material selected from the group including non-crystallizable polyethylene terephthalate comprising copolymerized polyethylene terephthalate which includes isophthalic acid-copolymerized polyethylene terephthalate and cyclohexanedimethanol-copolymerized polyethylene terephthalate, wherein the copolymerized polyethylene terephthalate is set to have an orientation function of 0.10 or less and subjected to the elevated temperature in-air stretching. The substrate may be made of a transparent resin.

In implementation of the method of the present invention, wherein a polarizing film comprising a PVA type resin, using a thermoplastic resin substrate, an insolubilization process for insolubilizing the PVA type resin is regarded as a key technical problem as will be specifically described below.

In cases where the PVA type resin layer formed on the thermoplastic resin substrate is subjected to stretching, it is not easy to cause iodine to be impregnated in the PVA type resin layer, while preventing the PVA type resin layer included in a stretched intermediate product or a stretched laminate from being dissolved in a dyeing solution. In a production process of a polarizing film, a step of causing iodine to be absorbed in a thinned PVA type resin layer is essential. In a conventional dyeing step, an amount of iodine to be absorbed in the PVA type resin layer is adjusted by using a plurality of dyeing solutions having different iodine concentrations ranging from 0.12 to 0.25 wt %, and keeping an immersion time constant. In such a conventional dyeing step, dissolution of the PVA type resin layer will occur during production of a polarizing film to preclude dyeing. As used here, the term "concentration" means a mixing ratio with respect to a total amount of the solution. Further, the term "iodine concentration" means a mixing ratio of iodine to a total amount of the solution, wherein an amount of iodine added as an iodide such as potassium iodide is not included therein. In the following description, the terms "concentration" and "iodine concentration" will be used as the same meanings.

As is clear from the test result illustrated in FIG. 6, the above technical problem can be solved by setting a concentration of iodine as the dichroic material to 0.3 wt % or more. Specifically, a plurality of polarizing films having various polarization performances can be produced by subjecting the stretched laminate including a stretched intermediate product comprising a PVA type resin layer to dyeing process using dyeing solutions different in iodine concentration, while adjusting an immersion time for the dyeing to form various dyed laminates each including a dyed intermediate product, and then subjecting the dyed laminates to the in-boric-acid-solution stretching.

Reference will now made to FIG. 7, there is shown that there is no significant difference in polarization performance between the polarizing films formed by adjusting the iodine concentration to 0.2 wt %, 0.5 wt % and 1.0 wt %, respectively. Meanwhile, in order to realize dyeing excellent in uniformity during formation of a dyed laminate including a dyed intermediate product, it is preferable to reduce the iodine concentration so as to ensure a stable immersion time, rather than increasing the iodine concentration so as to perform the dyeing within a shorter immersion time.

Referring to FIG. 8, there is shown that two different insolubilizations during implementation of the present invention (hereinafter referred to as "first and second insolubilizations") also have influences on the optical characteristics of the target polarizing film. FIG. 8 can be considered as a result of analysis on functions of the first and second insolubilizations for the thinned PVA type resin layer. FIG. 8 illustrates respective optical characteristics of polarizing films produced based on the four Examples 1 to 4, each satisfying the required performance for a display device of a liquid-crystal television using a large-sized display element.

The Example 1 indicates optical characteristics of polarizing films produced without conducting the first and the second insolubilization steps. The Example 2 indicates optical characteristics of polarizing films produced by performing only the second insolubilization step without performing the first insolubilization step, and the Example 3 indicates optical characteristics of polarizing films produced by performed only the first insolubilization step without performing the second insolubilization step. The Example 4 indicates optical characteristics of polarizing films produced by performing both the first and second insolubilization steps.

In the present invention, a polarizing film satisfying the required performance can be produced without conducting the aftermentioned first and the second insolubilization steps which will be described later. However, as is clear from FIG. 8, the optical characteristics of the non-insolubilized polarizing films in the Example 1 are inferior to those of the polarizing films in the Examples 2 to 4. Comparing respective optical characteristics of the Examples 1 to 4, the level of the optical characteristics becomes higher in the following order: Example 1<Example 3<Example 2<Example 4. In each of the Examples 1 and 2, a dyeing solution having an iodine concentration of 0.3 wt % and a potassium iodide concentration of 2.1 wt % was used. Differently, in the Examples 3 and 4, a plurality of types of dyeing solutions having an iodine concentration ranging from 0.12 to 0.25 wt % and a potassium iodide concentration ranging from 0.84 to 1.75 wt % were used. A significant difference between the group of the Examples 1 and 3 and the group of the Examples 2 and 4 is that the dyed intermediate product in the former group is not subjected to the insolubilization, whereas the dyed intermediate product in the latter group is subjected to the insolubilization. In the Example 4, not only the dyed intermediate product but also the stretched intermediate product before the dyeing are subjected to the insolubilization. Through the first and second insolubilizations, optical characteristics of the polarizing film could be significantly improved.

As is clear from FIG. 7, the mechanism for improving optical characteristics of a polarizing film is not based on the iodine concentration of the dyeing solution, but based on functions of the first and second insolubilizations. This finding can be regarded as means for solving a third technical problem in the production method of the present invention.

In one embodiment of the present invention, the first insolubilization is designed to prevent dissolution of the thinned PVA type resin layer included in the stretched intermediate product (or stretched laminate). On the other hand, the second insolubilization included in the cross-linking step is designed to stabilize dyeing so as to prevent iodine absorbed in the PVA type resin layer included in the dyed intermediate product (or a dyed laminate) from being eluted during the in-boric-acid-solution stretching at a solution temperature of 75° C. in a subsequent step, and prevent dissolution of the thinned PVA type resin layer.

If the second insolubilization is omitted, elution of the iodine impregnated in the PVA type resin layer will be progressed during the in-boric-acid-solution stretching at a solution temperature of 75° C., so that the PVA resin layer will be acceleratedly dissolved. The elution of iodine and dissolution of the PVA type resin layer can be avoided by lowering a temperature of the boric acid aqueous solution. For example, it is necessary to stretch a dyed intermediate product (or dyed laminate) while immersing it in the boric acid aqueous solution at a solution temperature of less than 65° C. However, this reduces the effect of the plasticizing function of water, so that softening of the PVA type resin layer included in the dyed intermediate product (or dyed laminate) is not sufficiently obtained. This results in deterioration in the stretching performance, so that the dyed intermediate product (or dyed laminate) is likely to break during the course of the in-boric-acid-solution stretching. It should be understood that an intended total stretching ratio of the PVA type resin layer cannot be attained.

[Outline of Production Process]

With reference to the drawings, one example of a process of producing a polarizing film for use in the present invention will be described below.

Figure 9:
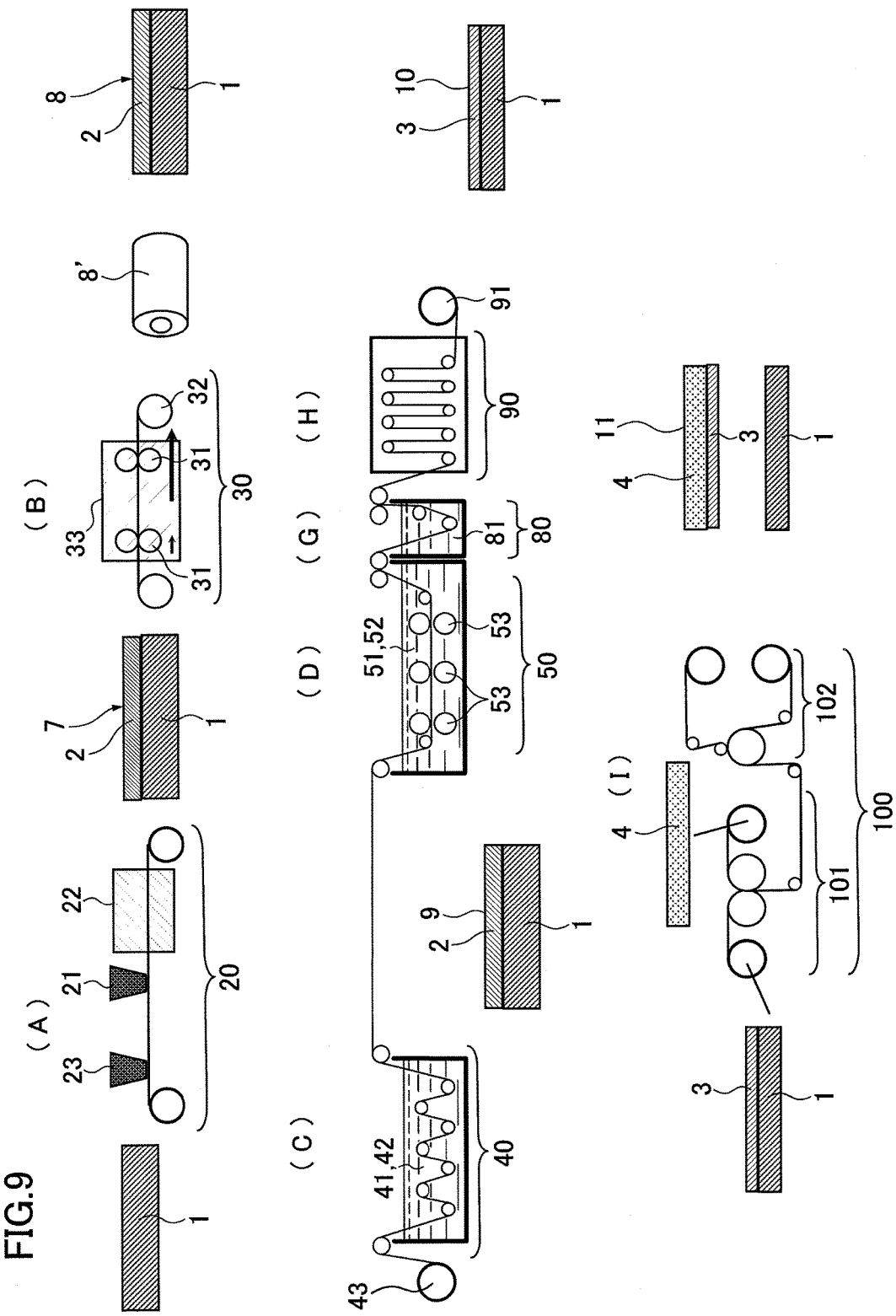
FIG. 9 is a schematic diagram illustrating a production process for producing an optical film laminate, wherein the process does not include any insolubilization treatment.

Referring to FIG. 9, there is shown a schematic diagram illustrating a production process for an optical film laminate 10 comprising a polarizing film 3, without an insolubilization step. In the following, descriptions will be made on a process of producing an optical film laminate 10 comprising a polarizing film 3 in accordance with the Example 1.

As a thermoplastic resin substrate, there has been prepared a continuous web of substrate made of isophthalic acid-copolymerized polyethylene terephthalate copolymerized with isophthalic acid in an amount of 6 mol % (hereinafter referred to as "non-crystallizable PET"). A laminate 7 comprising a continuous web of non-crystallizable PET substrate 1 having a glass transition temperature Tg of 75° C., and a PVA layer 2 having a glass transition temperature Tg of 80° C. was prepared in the following manner.

(Laminate Preparation Step (A))

Firstly, a non-crystallizable PET substrate 1 having a thickness of 200 µm, and a PVA solution prepared by dissolving a PVA powder having a polymerization degree of 1000 or more and a saponification degree of 99% or more, in water to have a concentration of 4 to 5 wt % were prepared. Then, in a laminate forming apparatus 20 equipped with a coating unit 21, a drying unit 22 and a surface modifying unit 23, the PVA solution was applied to the non-crystallizable PET substrate 1 having a thickness of 200 µm, and dried at a temperature of 50 to 60° C., to form a 7 µm-thick PVA layer 2 on the non-crystallizable PET substrate 1. The thickness of the PVA layer can be appropriately changed, as described later. The laminate obtained in the above manner will hereinafter be referred to as a "laminate 7 comprising a non-crystallizable PET substrate and a PVA layer formed on the substrate", or as a "PVA layer-including laminate 7", or simply as a "laminate 7".

A laminate 7 including a PVA layer will be produced in the form of a polarizing film 3 having a thickness of 3 µm through the following processes including a 2-stage stretching step consisting of preliminary in-air stretching and in-boric-acid-solution stretching. While the present invention is intended to use a polarizing film having a thickness of 10 µm or less, any polarizing film having an arbitrary thickness of 10 µm or less can be formed by appropriately changing the thickness of a PVA type resin layer to be formed on the PET substrate 1.

(Preliminary In-Air Stretching Step (B))

In a first-stage preliminary in-air stretching step (B), the laminate 7 including the 7 µm-thick PVA layer 2 was stretched together with the non-crystallizable PET substrate 1 to form a "stretched laminate 8" including a 5 µm-thick PVA layer 2. Specifically, in a preliminary in-air stretching apparatus 30 having stretching means 31 provided within an oven 33, the laminate 7 including the 7 µm-thick PVA layer 2 was fed to pass through the stretching means 31 within the oven 33 set to a temperature environment of 130° C., so that it was subjected to an end-free uniaxial stretching to attain a stretching ratio of 1.8 to thereby form a stretched laminate 8. At this stage, the stretched laminate 8 may be wound on a take-up unit 32 provided in side-by-side relation to the oven 33, to produce a roll 8' of the stretched laminate 8.

Now, "end-free stretching" and "end-fixed stretching" will be generally described. When a film of a substantial length is stretched in a transportation or feeding direction, the film is reduced in size in a direction perpendicular to the direction of the stretching, i.e. in a widthwise direction of the film. The end-free stretching means a technique of performing stretching without suppressing such reduction in width. "Longitudinal uniaxial stretching" is a technique of performing stretching only in a longitudinal direction of the film. The end-free uniaxial stretching is generally used in contrast with the end-fixed uniaxial stretching which is a technique of performing stretching while suppressing the shrinkage or contraction which would otherwise occur in a direction perpendicular to the stretching direction. Through the end-free uniaxial stretching, the 7 μm-thick PVA layer 2 included in the laminate 7 is converted into a 5 μm-thick PVA layer 2 in which PVA molecules are oriented in the stretching direction.

(Dyeing Step (C))

Then, in a dyeing step (C), a dyed laminate 9 was formed in which iodine as a dichroic material is absorbed in the 5 μm-thick PVA layer 2 having the oriented PVA molecules. Specifically, in a dyeing apparatus 40 equipped with a dyeing bath 42 of a dyeing solution 41 containing iodine and potassium iodide, the stretched laminate 8 unrolled from a feeding unit 43 provided in side-by-side relation to the dyeing apparatus 40 and loaded with the roll 8' was immersed in the dyeing solution 41 at a solution temperature of 30° C., for an appropriate time, to allow a PVA layer making up a target polarizing film 3 (to be finally formed) to have a single layer transmittance of 40 to 44%. In this manner, a dyed laminate 9 was formed in which iodine is absorbed in the molecularly oriented PVA layer 2 of the stretched laminate 8.

In the above step, in order to prevent dissolution of the PVA layer 2 included in the stretched laminate 8, the dyeing solution 41 was formed as an aqueous solvent having an iodine concentration of 0.30 wt %. Further, the dyeing solution 41 was adjusted to allow a concentration of potassium iodide for allowing iodine to be dissolved in water to become 2.1 wt %. The ratio of the iodine concentration to the potassium iodide concentration was 1:7. More specifically, the laminate 8 was immersed in the dyeing solution 41 having an iodine concentration of 0.30 wt % and a potassium iodide concentration of 2.1 wt %, for 60 seconds, to form a dyed laminate 9 having iodine absorbed in the 5 μm-thick PVA layer 2 having the oriented PVA molecules. In the Example 1, the immersion time of the stretched laminate 8 in the dyeing solution 41 having an iodine concentration of 0.30 wt % and a potassium iodide concentration of 2.1 wt % was changed to adjust an amount of iodine to be absorbed, so as to allow a target polarizing film 3 to have a single layer transmittance of 40 to 44%, to form various dyed laminates 9 different in single layer transmittance and polarization rate.

(In-Boric-Acid-Solution Stretching Step (D))

In a second-stage in-boric-acid-solution stretching step (D), the dyed laminate 9 including the PVA layer 2 which was already dyed with molecularly oriented iodine was further stretched to form an optical film laminate 10 which includes the PVA layer having molecularly oriented iodine and making up a 3 μm-thick polarizing film 3. Specifically, in an in-boric-acid-solution stretching apparatus 50 equipped with stretching means 53 and a bath 52 of a boric acid aqueous solution 51 containing boric acid and potassium iodide, the dyed laminate 9 continuously fed from the dyeing apparatus 40 was immersed in the boric acid aqueous solution 51 set to a solution temperature environment of 65° C., and then fed to pass through the stretching means 53 provided in the in-boric-acid-solution stretching apparatus 50, so that it was subjected to an end-free uniaxial stretching to attain a stretching ratio of 3.3 to thereby form the optical film laminate 10.

More specifically, the boric acid aqueous solution 51 was adjusted to contain 4 weight parts of boric acid with respect to 100 weight parts of water, and 5 weight parts of potassium iodide with respect to 100 weight parts of water. In this step, the dyed laminate 9 having the absorbed iodine in an adjusted amount was first immersed in the boric acid aqueous solution 51 for 5 to 10 seconds. Then, the dyed laminate 9 was fed to directly pass through between a plurality of sets of rolls different in circumferential speed, as the stretching means 53 of the in-boric-acid-solution stretching apparatus 50, so that it was subjected to an end-free uniaxial stretching to attain a stretching ratio of 3.3 while taking a time of 30 to 90 seconds. Through this stretching, the PVA layer included in the dyed laminate 9 was changed into a 3 μm-thick PVA layer in which the absorbed iodine is highly oriented in one direction in the form of a polyiodide ion complex. This PVA layer makes up a polarizing film 3 of the optical film laminate 10.

As described above, in the Example 1, the laminate 7 comprising a non-crystallizable PET substrate 1 and a 7 μm-thick PVA layer 2 formed on the substrate 1 is subjected to preliminarily in-air stretching at a stretching temperature of 130° C. to form a stretched laminate 8, and then the stretched laminate 8 is subjected to dyeing to form a dyed laminate 9. Further, the dyed laminate 9 is subjected to in-boric-acid-solution stretching at a stretching temperature of 65° C. to form an optical film laminate 10 including a 3 μm-thick PVA layer stretched integrally with the non-crystallizable PET substrate to attain a total stretching ratio of 5.94. Through the above 2-stage stretching, it becomes possible to form an optical film laminate 10 including a 3 μm-thick PVA layer making up a polarizing film 3 in which iodine absorbed therein through dyeing is highly oriented in the form of a polyiodide ion complex. Preferably, the optical film laminate 10 will be completed through subsequent cleaning, drying and transfer steps. Details of the cleaning step (G), the drying step (H) and the transfer step (I) will be described in connection with a production process based on the Example 4 incorporating an insolubilization step.

[Outline of Other Production Process]

Figure 10:
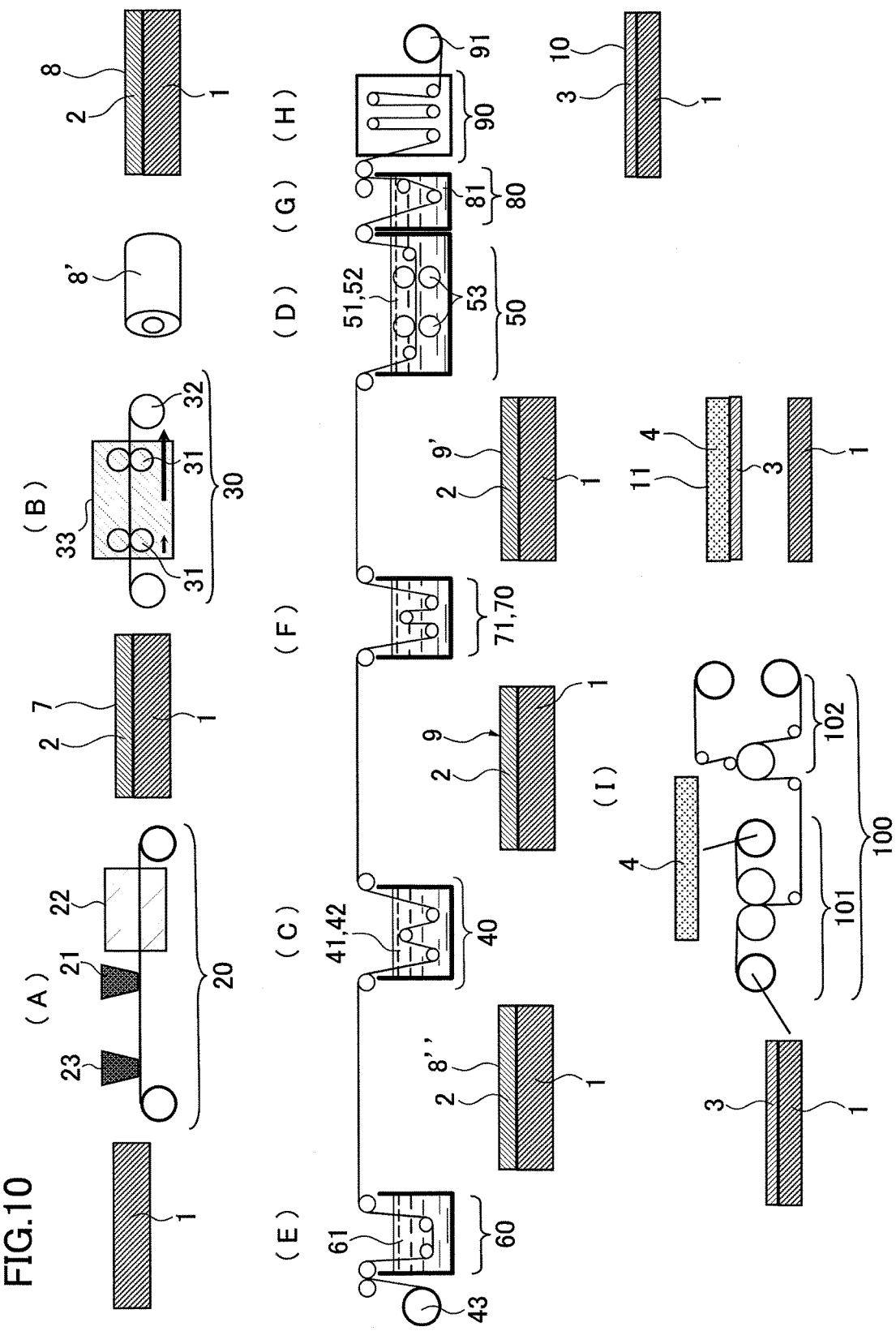
FIG. 10 is a schematic diagram illustrating a production process for producing an optical film laminate, wherein the process includes an insolubilization treatment.

Referring to FIG. 10, there is shown a schematic diagram illustrating a production process of an optical film laminate 10 including a polarizing film 3, which has an insolubilization step. The following description will be made about a production process of an optical film laminate 10 including a polarizing film 3 based on the Example 4. As is clear from FIG. 10, the production process based on the Example 4 may be assumed as a production process in which the first insolubilization step before the dyeing step and the cross-linking step including the second insolubilization before the in-boric-acid-solution stretching are incorporated into the production process based on the Example 1. A laminate preparation step (A), a preliminary in-air stretching step (B), a dyeing step (C) and an in-boric-acid-solution stretching step (D) incorporated in this process are the same as those in the production process based on the Example 1, except a difference in temperature of the boric acid aqueous solution for the in-boric-acid-solution stretching step. Thus, descriptions of this process will be simplified, and the first insolubilization step before the dyeing step and the cross-linking step including the second insolubilization before the in-boric-acid-solution stretching step will be primarily described.

(First Insolubilization Step (E))

The first insolubilization step is an insolubilization step (E) prior to the dyeing step (C). As with the production process based on the Example 1, in the laminate preparation step (A), a laminate 7 comprising a non-crystallizable PET substrate and a 7 μm-thick PVA layer 2 formed on the substrate is produced. Then, in the preliminary in-air stretching step (B), the laminate 7 including the 7 μm-thick PVA layer 2 is subjected to preliminary in-air stretching to form a stretched laminate 8 including a 5 μm-thick PVA layer 2. Subsequently, in the first insolubilization step (E), the stretched laminate 8 unrolled from the feeding unit 43 loaded with the roll 8' is subjected to insolubilization to form the insolubilized stretched laminate 8". It should be understood that the stretched laminate 8" insolubilized in this step includes an insolubilized PVA layer 2. This laminate 8" will hereinafter be referred to as an "insolubilized stretched laminate 8"'".

Specifically, in an insolubilization apparatus 60 containing an insolubilizing boric acid aqueous solution 61, the stretched laminate 8 is immersed in the insolubilizing boric acid aqueous solution 61 at a solution temperature of 30° C., for 30 seconds. The insolubilizing boric acid solution 61 used in this step contains 3 weight parts of boric acid with respect to 100 weight parts of water (hereinafter referred to as "insolubilizing boric acid aqueous solution"). This step is intended to subject the stretched laminate 8 to insolubilization so as to prevent the 5 μm-thick PVA layer included in the stretched laminate 8 from being dissolved at least during the subsequent dyeing step (C).

After the insolubilization, the insolubilized stretched laminate 8 is transported to the dyeing step (C). Differently from the Example 1, in this dyeing step (C), a plurality of dyeing solutions are prepared by changing the iodine concentration in the range of 0.12 to 0.25 wt %. Then, various dyed laminates 9 different in single layer transmittance and polarization rate are formed by using the dyeing solutions while keeping the immersion time of the insolubilized stretched laminate 8" in each of the dyeing solutions constant, to adjust an amount of iodine to be absorbed, so as to allow a target polarizing film to have a single layer transmittance of 40 to 44%. Even after the immersion in the dyeing solutions having an iodine concentration of 0.12 to 0.25 wt %, the PVA layer in the insolubilized stretched laminate 8" is never dissolved.

(Cross-Linking Step Including Second Insolubilization (F))

The following cross-linking step may be considered as including the second insolubilization step, in view of the following purpose. The cross-linking step is intended to achieve firstly insolubilization for preventing dissolution of the PVA layer included in the dyed laminate 9 during the subsequent in-boric-acid-solution stretching step (D), secondly stabilization in dyeing for preventing elution of iodine absorbed in the PVA layer; and thirdly formation of nodes by cross-linking of molecules in the PVA layer. The second insolubilization is intended to accomplish the results of the aforementioned first and second aims.

The cross-linking step (F) is performed as a pretreatment for the in-boric-acid-solution stretching step (D). The dyed laminate 9 formed in the dyeing step (C) is subjected to cross-linking to form a cross-linked dyed laminate 9'. The cross-linked dyed laminate 9' includes a cross-linked PVA layer 2. Specifically, in a cross-linking apparatus 70 containing an aqueous solution 71 comprising iodine and potassium iodide (hereinafter referred to as "cross-linking boric acid aqueous solution"), the dyed laminate 9 is immersed in the cross-linking boric acid solution 71 at 40° C., for 60 seconds, so as to cross-link the PVA molecules of the PVA layer having the absorbed iodine, to form a cross-linked dyed laminate 9'. The cross-linking boric acid aqueous solution 71 used in this step contains 3 weight parts of boric acid with respect to 100 weight parts of water, and 3 weight parts of potassium iodide with respect to 100 weight parts of water.

In the in-boric-acid-solution stretching step (D), the cross-linked dyed laminate 9' is immersed in the boric acid aqueous solution at 75° C., and subjected to an end-free uniaxial stretching to attain a stretching ratio of 3.3 to thereby form an optical film laminate 10. Through this stretching, the PVA layer 2 included in the dyed laminate 9' and having absorbed iodine is changed into a 3 μm-thick PVA layer 2 in which the absorbed iodine is highly oriented in one direction in the form of a polyiodide ion complex. This PVA layer makes up a polarizing film 3 of the optical film laminate 10.

In the Example 4, a 7 μm-thick PVA layer 2 is first formed on a non-crystallizable PET substrate 1 to form a laminate 7, and then the laminate 7 is subjected to preliminary in-air stretching at a stretching temperature of 130° C. based on an end-free uniaxial stretching process to attain a stretching ratio of 1.8 to thereby form a stretched laminate 8. Then, the formed stretched laminate 8 is immersed in the insolubilizing boric acid aqueous solution 61 at a solution temperature of 30° C. to insolubilize the PVA layer included in the stretched laminate. The resulting product is an insolubilized stretched laminate 8". The insolubilized stretched laminate 8" is immersed in a dyeing solution containing iodine and potassium iodide and having a temperature of 30° C. to form a dyed laminate 9 in which iodine is absorbed in the insolubilized PVA layer. Then, the dyed laminate 9 including the PVA layer with the absorbed iodine is immersed in the cross-linking boric acid aqueous solution 71 under a solution temperature of 40° C., for 60 seconds, to cross-link PVA molecules of the PVA layer with the absorbed iodine. The resulting product is a cross-linked dyed laminate 9'. The cross-linked dyed laminate 9' is immersed in an in-boric-acid-solution stretching bath 51 containing boric acid and potassium iodide and having a temperature of 75° C., for 5 to 10 seconds, and then subjected to in-boric-acid-solution stretching based on an end-free uniaxial stretching process to attain a stretching ratio of 3.3 to thereby form an optical film laminate 10.

As described above, based on the 2-stage stretching consisting of the elevated temperature in-air stretching and the in-boric-acid-solution stretching, and the pre-treatments consisting of the insolubilization before immersion in the dyeing bath and the cross-linking before the in-boric-acid-solution stretching, the process in the Example 4 makes it possible to stably form an optical film laminate 10 including a 3 μm-thick PVA layer making up a polarizing film in which PVA molecules in a PVA layer 2 formed on a non-crystallizable PET substrate 1 are highly oriented, and iodine reliably absorbed in the PVA molecules through dyeing is highly oriented in one direction in the form of an polyiodide ion complex.

(Cleaning Step (G))

The dyed laminate 9 or the cross-linked dyed laminate 9' in the Example 1 or 4 is subjected to stretching in the in-boric-acid-solution stretching step (D), and then taken out of the boric acid aqueous solution 51. Preferably, the takenout optical film 10 including the polarizing film 3 is directly fed to a cleaning step (G). The cleaning step (G) is intended to wash out unnecessary residuals adhered on a surface of the polarizing film 3. Alternatively, the cleaning step (G) may be omitted, and the optical film 10 including the polarizing film 3 may be directly fed to a drying step (H). However, if the cleaning is in sufficient, boric acid is likely to precipitate from the polarizing film 3 after drying of the optical film laminate 10. Specifically, the optical film laminate 10 is fed to a cleaning apparatus 80 and immersed in a cleaning solution 81 containing potassium iodide having a temperature of 30° C., for 1 to 10 seconds, so as to prevent dissolution of PVA of the polarizing film 3. A potassium iodide concentration of the cleaning solution 81 may be in the range of about 0.5 to 10 weight %.

(Drying Step (H))

The cleaned optical film laminate 10 is fed to a drying step (H) and dried therein. Then, the dried optical film laminate 10 is wound on a take-up unit 91 provided in side-by-side relation to the drying apparatus 90, as a continuous web of optical film laminate 10, to form a roll of the optical film laminate 10 including the polarizing film 3. Any appropriate process, such as natural drying, blow drying and thermal drying, may be employed as the drying step (H). In each of the Examples 1 and 4, the drying was performed by warm air at 60° C., for 240 seconds in an oven type drying apparatus 90.

[Lamination and Transfer Step (I))

As mentioned above, the present invention provides a method of producing a roll of an optical film laminate using a polarizing film which comprises a polyvinyl alcohol type resin having a molecularly oriented dichroic material, wherein the polarizing film is formed to have optical characteristics satisfying the aforementioned required conditions, through 2-stage stretching consisting of preliminary in-air stretching and in-boric-acid-solution stretching.

In order to form this optical film laminate, an optical film laminate 10 including a polarizing film having a thickness of 10 μm or less (e.g., the above 3 μm-thick polarizing film 3) and formed on a non-crystallizable PET substrate such as a non-crystallizable PET substrate, is subjected to a defect inspection, and then wound into a roll to form a roll of the optical film laminate 10. For example, a roll of an optical film laminate to be formed by the method of the present invention is used in a lamination/transfer step (I) illustrated in FIG. 10. In the lamination/transfer step (I), the optical film laminate 10 is unrolled from the roll, and may be simultaneously subjected to a lamination operation and a transfer operation, in the following manner.

The polarizing film 3 to be produced has a thickness of 10 μm, typically only about 2 to 5 μm through the stretching which reduces the thickness. Thus, it is difficult to handle such a thin polarizing film 3 in the form of a single-layer. For this reason, the polarizing film 3 is handled, for example, in the form of an optical film laminate 10, i.e., under a condition that it is left on the non-crystallizable PET substrate, or, in the form of an optically functional film laminate 11 obtained by laminating or transferring the polarizing film to another optically functional film 4.

In the lamination/transfer step (I) illustrated in FIGS. 9 and 10, the polarizing film 3 included in the continuous web of optical film laminate 10, and a separately prepared optically functional film 4 are laminated together and taken up into a roll. In this take-up step, the optically functional film laminate 11 is formed by transferring the polarizing film 3 to the optically functional film 4 while peeling the non-crystallizable PET substrate from the polarizing film 3. Specifically, the optical film laminate 10 is unrolled from the roll by an unrolling/laminating unit 101 included in a laminating/transferring apparatus 100, and the polarizing film 3 of the unrolled optical film laminate 10 is transferred to the optically functional film 4 by a taking-up/transferring unit 102. In the course of this operation, the polarizing film unit 102 is peeled from the substrate 1, and formed as the optically functional film laminate 11.

The optical film laminate 10 taken up into a roll by the take-up unit 91 in the drying step (H) or the optically functional film laminate 11 formed in the lamination/transfer step (I) may take various other structures or mechanisms.

[Optical Characteristics of Polarizing Films Produced Under Various Conditions]

(1) Improvement in Optical Characteristics of Polarizing Film by Insolubilization (Examples 1 to 4)

As already described with reference to FIG. 8, each of the polarizing films produced based on the Examples 1 to 4 can overcome the aforementioned technical problems. The optical characteristics thereof can satisfy the required performance for an optical display device of a liquid-crystal television using a large-sized display element. Further, as is clear from FIG. 8, the optical characteristics of the non-insolubilized polarizing films in the Example 1 are inferior to the optical characteristics of any polarizing film in the Examples 2 to 4 subjected to the first and/or second insolubilizations. Comparing respective optical characteristics of the Examples, a level of the optical characteristics becomes higher in the following order: (Example 1)<(Example 3 including only the first insolubilization)<(Example 2 including only the second insolubilization)<(Example 4 including the first and second insolubilizations). A polarizing film produced by a production process comprising the first and/or second insolubilization steps, in addition to the production process for the optical film laminate 10 including the polarizing film 3, can be significantly improved in optical characteristic.

(2) Impact of Thickness of PVA Type Resin Layer on Optical Characteristics of Polarizing Film (Example 5)

In the Example 4, the 3 μm-thick polarizing film was formed by stretching the 7 μm-thick PVA layer. On the other hand, in the Example 5, the 12 μm-thick PVA layer was first formed, and the 5 μm-thick polarizing film was formed by stretching this PVA layer. The remaining conditions for producing these polarizing films was the same.

(3) Impact of Difference in Material of Non-Crystallizable PET Substrate on Optical Characteristics of Polarizing Film (Example 6)

In the Example 4, a non-crystallizable PET substrate copolymerized with isophthalic acid was used, whereas, in the Example 6, a non-crystallizable PET substrate copolymerized with 1,4-cyclohexanedimethanol as a modifier group was used. In the Example 6, a polarizing film was produced under the same conditions as those in the Example 4, except the above difference.

Figure 13:
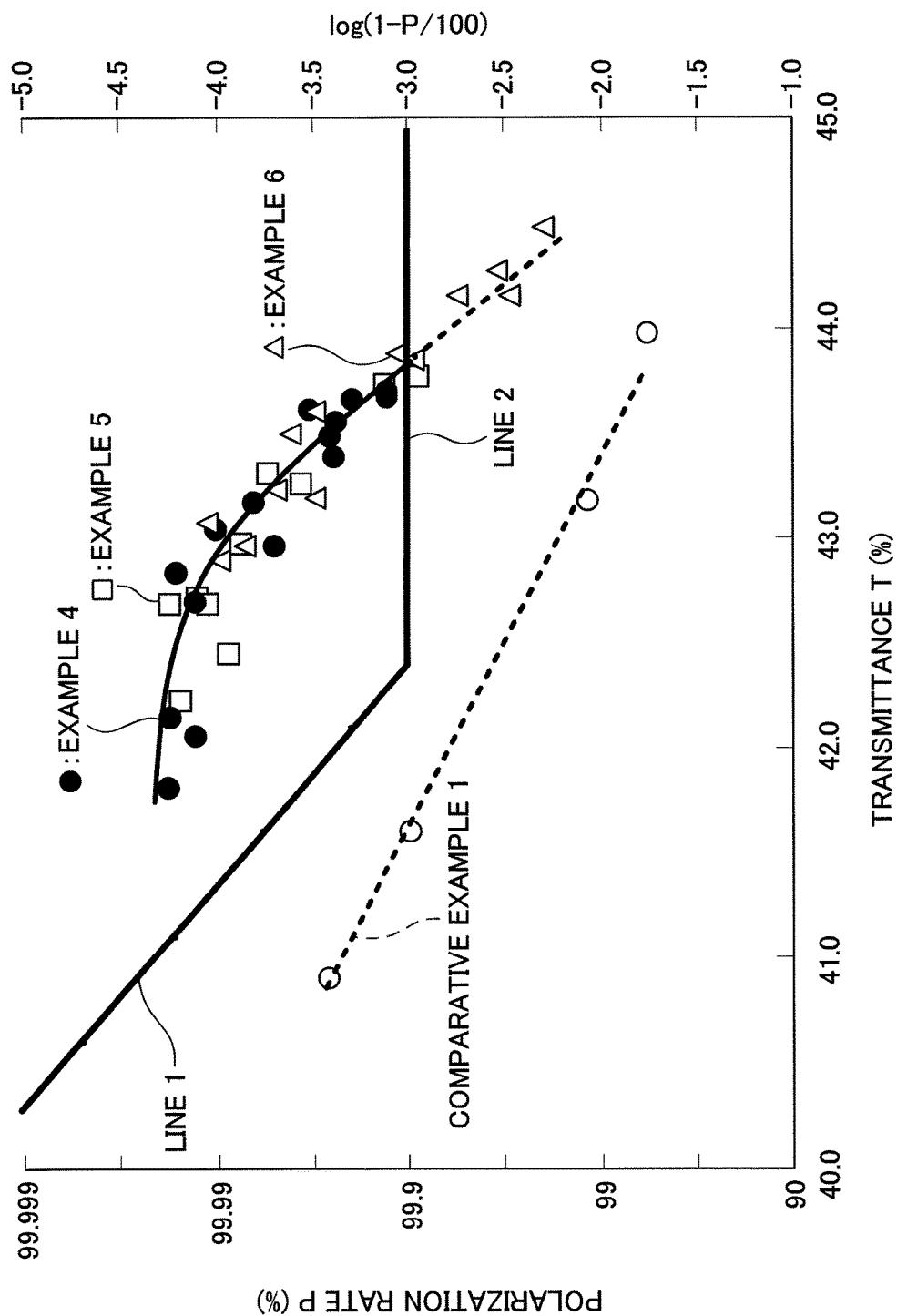
FIG. 13 is a graph comparatively illustrating polarization performances of polarizing films in a group of inventive examples.

Referring to FIG. 13, it shows that there is no significant difference in optical characteristics between respective ones of the polarizing films produced based on the Examples 4 to 6. This would be considered that the thickness of the PVA type resin layer and the type of the non-crystallizable ester type thermoplastic resin do not have any recognizable impact on the optical characteristics.

(4) Improvement in Optical Characteristics of Polarizing Film by Stretching Ratio during Preliminary In-Air (Examples 7 to 9)

In the Example 4, the stretching ratio during the first-stage preliminary in-air stretching and the stretching ratio during the second-stage in-boric-acid-solution stretching were set to 1.8 and 3.3, respectively, whereas, in the Examples 7 to 9, the two stretching ratios were set to 1.2 and 4.9 for the Example 7, 1.5 and 4.0 for the Example 8, and 2.5 and 2.4 for the Example 9. In the Example 7 to 9, the polarizing film was produced under the same conditions as those in the Example 4, except the above difference. For example, the stretching temperature during the preliminary in-air stretching was 130° C., and the in-boric-acid-solution stretching was performed using a boric acid aqueous solution at a solution temperature of 75° C. The total stretching ratio in each of the Examples 8 and 9 was 6.0 which is similar to 5.94 as a total stretching ratio obtained when the stretching ratio during the preliminary in-air stretching in the Example 4 is set to 1.8. Differently, the total stretching ratio of the Example 7 was limited to up to 5.88. This is because the stretching ratio during the in-boric-acid-solution stretching could be set to 4.9 or more, which would be caused by the attainable stretching ratio of non-crystallizable PET having an impact on the relationship between the stretching ratio during the first-stage preliminary in-air stretching and the total stretching ratio, as described based on FIG. 20.

Figure 14:
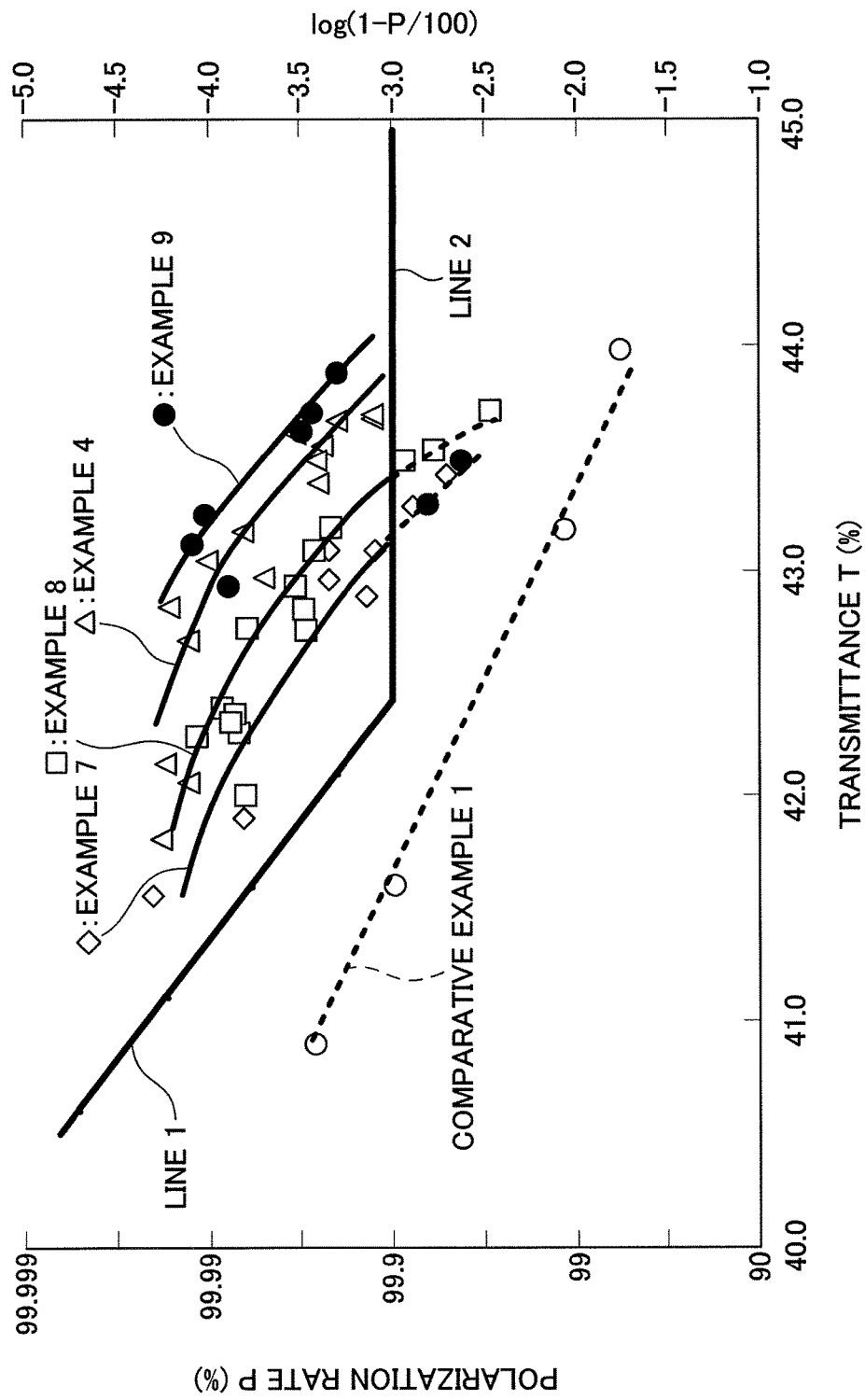
FIG. 14 is a graph comparatively illustrating polarization performances of polarizing films in another group of inventive examples.

Referring to FIG. 14, each of the polarizing films based on the Examples 7 to 9 can overcome the technical problems concerning production of a polarizing film having a thickness of 10 μm or less and has optical characteristics satisfying the required performance for optical display devices, as with the Example 4. Comparing respective optical properties of these Examples, a level of the optical properties becomes higher in the following order: Example 7<Example 8<Example 4<Example 9. This shows that, in cases where the stretching ratio during the first-stage preliminary in-air stretching is set in the range of 1.2 to 2.5, even if a final total stretching ratio after the second-stage in-boric-acid-solution stretching is set to a similar value, the optical characteristics of the polarizing film become better as the stretching ratio during the first-stage preliminary in-air stretching is set to a higher value. Thus, in a production process of an optical film laminate 10 including a polarizing film 3, optical characteristics of the optical film or the optical film laminate 10 including the polarizing film can be further improved by setting the stretching ratio during the first-stage preliminary in-air stretching to a higher value.

(5) Improvement in Optical Characteristics of Polarizing Film by Stretching Temperature during Preliminary In-Air Stretching (Examples 10 to 12)

In the Example 4, the stretching temperature during the preliminary in-air stretching was set to 130° C., whereas in the Examples 10 to 12, the stretching temperature during the preliminary in-air stretching was set, respectively, to 95° C., 110° C., and 150° C., which are higher than the glass transition temperature Tg of PVA. In these Examples, the polarizing film was produced under the same conditions as those in the Example 4, except the above difference. For example, the stretching ratio during the preliminary in-air stretching was set to 1.8, and the stretching ratio during the in-boric-acid-solution stretching was set to 3.3. The stretching temperature during the preliminary in-air stretching in the Example 4 is 130° C. In these Examples including the Example 4, the production conditions are the same except that the stretching temperature is set to 95° C. for the Example 10, 110° C. for the Example 11, 130° C. for the Example 4 and 150° C. for the Example 12.

Figure 15:
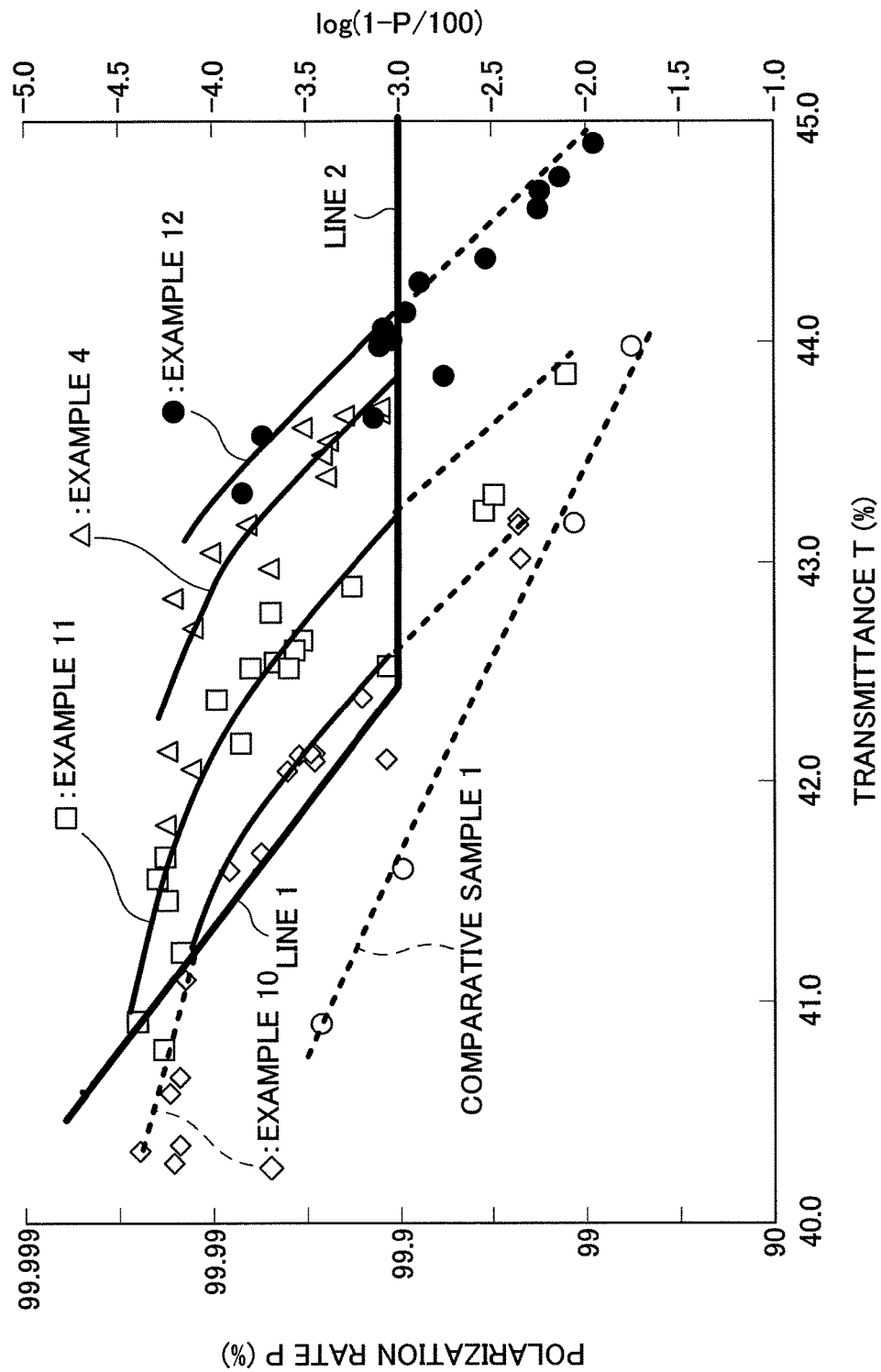
FIG. 15 is a graph illustrating polarization performances of polarizing films in yet another group of inventive examples.

Referring to FIG. 15, each of the polarizing films based on the Examples 4 and 10 to 12 can overcome the technical problems concerning production of a polarizing film having a thickness of 10 μm or less, and has optical characteristics satisfying the required performance for optical display devices. Comparing respective optical properties of these Examples, a level of the optical properties becomes higher in the following order: Example 10<Example 11<Example 4<Example 12. This shows that, in cases where the stretching temperature during the first-stage preliminary in-air stretching is set to a higher value than the glass transition temperature, and gradually increased from 95° C. to 150° C., even if a final total stretching ratio after the second-stage in-boric-acid-solution stretching is set to a similar value, the optical characteristics of the polarizing film become better as the stretching temperature during the first-stage preliminary in-air stretching is set to a higher value. Thus, in a production process of an optical film laminate 10 including a polarizing film 3, optical characteristics of the optical film or the optical film laminate 10 including the polarizing film can be further improved by setting the stretching temperature during the first-stage preliminary in-air stretching to a higher value.

(6) Improvement of Optical Characteristics of Polarizing Film by Total Stretching Ratio (Examples 13 to 15)

In the Example 4, the stretching ratio during the first-stage preliminary in-air stretching was 1.8, and the stretching ratio during the second-stage in-boric acid solution stretching was 3.3. On the other hand, in the Examples 13 to 15, only the stretching ratio in the second-stage in-boric acid solution stretching was changed to 2.1, 3.1 and 3.6, respectively. This means that the total stretching ratios in the Examples 13 to 15 are 5.04 (about 5.0), 5.58 (about 5.5) and 6.48 (about 6.5), respectively. The total stretching ratio in the Example 4 is 5.94 (about 6). In these Examples including the Example 4, the production conditions are the same except that the total stretching ratio is set to 5 for the Example 13, 5.5 for the Example 14, 6.0 for the Example 4 and 6.5 for the Example 15.

Figure 16:
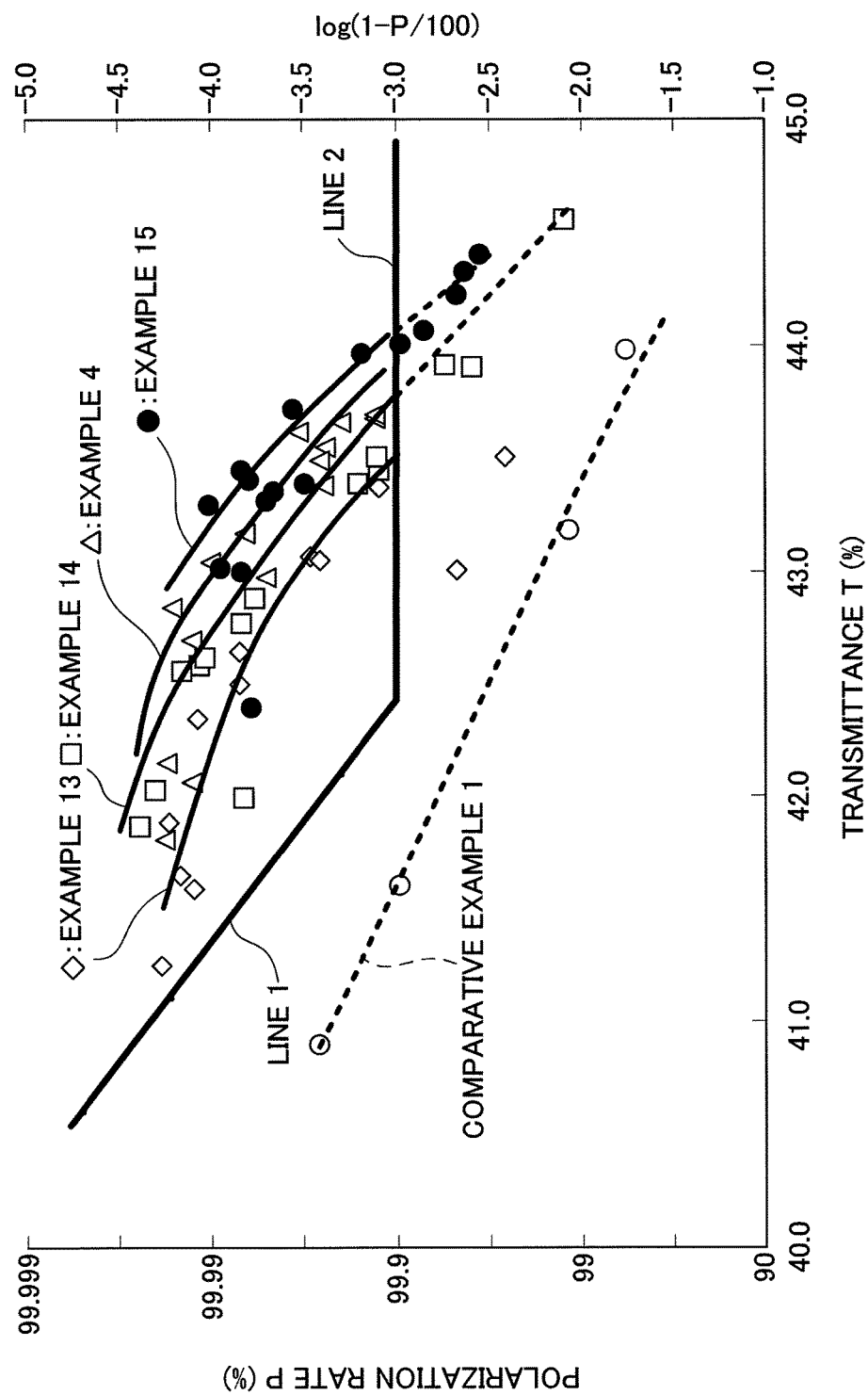
FIG. 16 is a graph illustrating polarization performances of polarizing films in still another group of inventive examples.

Referring to FIG. 16, each of the polarizing films based on the Examples 4 and 13 to 15 can overcome the technical problems concerning production of a polarizing film having a thickness of 10 μm or less and has optical characteristics satisfying the required performance for liquid-crystal display devices. Comparing respective optical properties of these Examples, a level of the optical properties becomes higher in the following order: Example 13<Example 14<Example 4<Example 15. This shows that, in cases where the stretching ratio during the first-stage preliminary in-air stretching is fixedly set to 1.8, and only the stretching ratio during the second-stage in-boric-acid-solution stretching is variably set to allow the total stretching ratio to be gradually increased to 5, 5.5, 6.0 and 6.5, the optical characteristics of the polarizing film being better with the final total stretching ratio having a higher value. Thus, in the production process of an optical film laminate 10 including a polarizing film 3, optical characteristics of the optical film or the optical film laminate 10 including the polarizing film can be further improved by setting the total stretching ratio during the first-stage preliminary in-air stretching and the second-stage in-boric-acid-solution stretching to a higher value.

(7) Improvement of Optical Characteristics of Polarizing Film by Total Stretching Ratio in End-Fixed Uniaxial Stretching (Examples 16 to 18)

In the Examples 16 to 18, optical film laminates were produced under the same conditions as those in the Example 4, except the following difference. The difference is a stretching scheme in the preliminary in-air stretching. In the example 4, an end-free uniaxial stretching process is employed, whereas in each of the Examples 16 to 18, an end-fixed uniaxial stretching process is employed. In each of these Examples, the stretching ratio during the first-stage preliminary in-air stretching was fixedly 1.8, and only the stretching ratio during the second-stage in-boric-acid-solution stretching was changed to 3.3, 3.9, 4.4, respectively. This means that the total stretching ratio was 5.94 (about 6) for the Example 16, 7.02 (about 7) for the Example 17 and 7.92 (about 8) for the Example 18, respectively. In the Examples 16 to 18, the production conditions are the same except the above difference.

Figure 17:
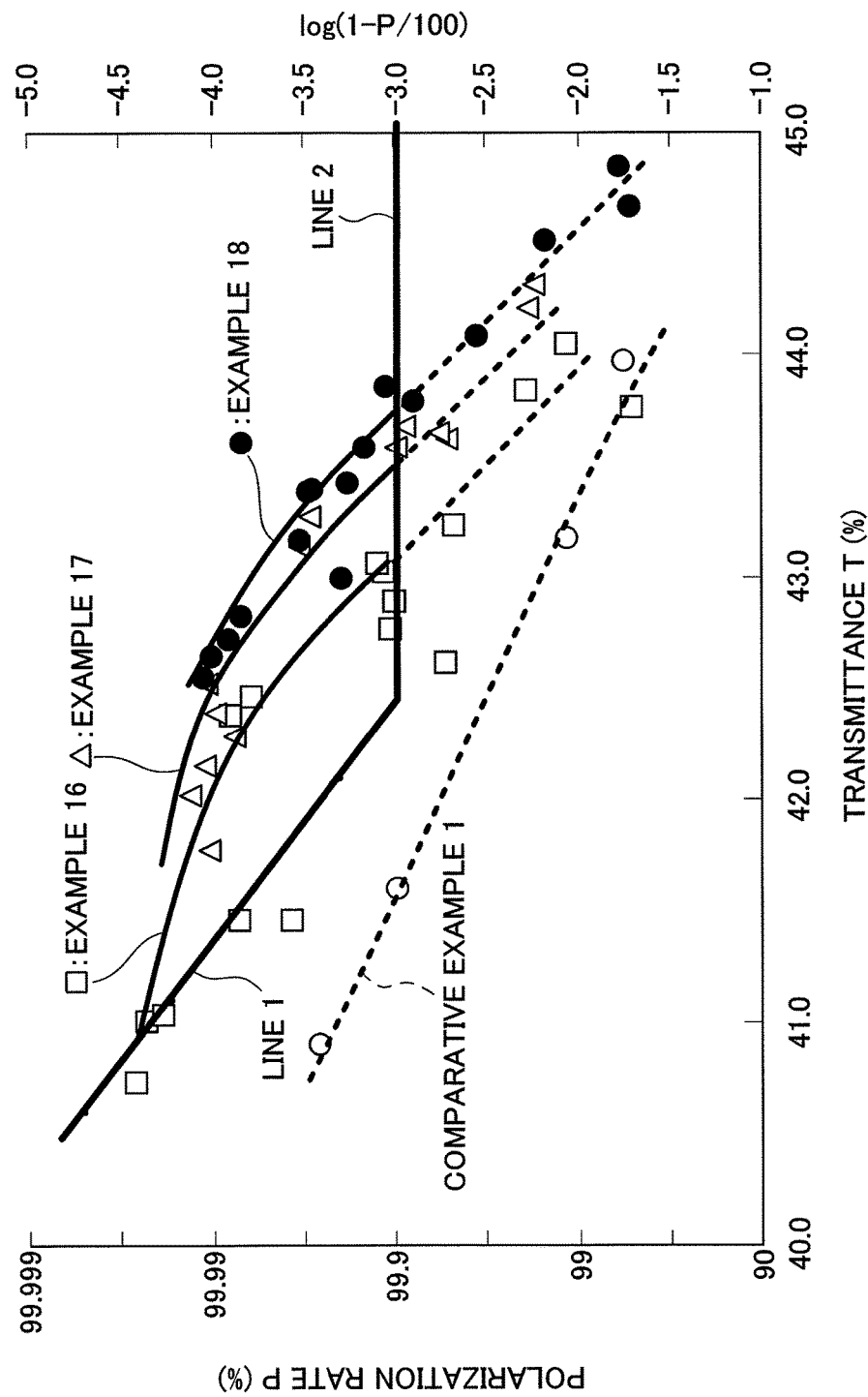
FIG. 17 is a graph illustrating polarization performances of polarizing films in yet still another group of inventive examples.

Referring to FIG. 17, each of the polarizing films in accordance with the Examples 16 to 18 can overcome the technical problems concerning production of a polarizing film having a thickness of 10 μm or less and has optical characteristics satisfying the required performance for optical display devices. Comparing respective optical properties of these Examples, a level of the optical properties becomes higher in the following order: Example 16<Example 17<Example 18. This shows that, in cases where the stretching ratio during the first-stage preliminary in-air stretching is fixedly set to 1.8, and only the stretching ratio during the second-stage in-boric-acid-solution stretching is variably set to allow the total stretching ratio to be gradually increased to 6, 7 and 8, the optical characteristics of the polarizing film being better with the final total stretching ratio having a higher value. Thus, in a production process of the optical film laminate 10 including the polarizing film 3, optical characteristics of the optical film or the optical film laminate 10 including the polarizing film can be further improved by setting the total stretching ratio during the first-stage preliminary in-air stretching based on an end-fixed uniaxial stretching process and the second-stage in-boric-acid-solution stretching to a higher value. It was also ascertained that, in cases where an end-fixed uniaxial stretching process is used in the first-stage preliminary in-air stretching, the final total stretching ratio can be increased as compared to cases where an end-free uniaxial stretching process is used in the first-stage preliminary in-air stretching.

Comparative Example 3

In the comparative example 3, under the same conditions as those in the comparative example 1, a PVA aqueous solution was applied on a 200 μm-thick PET substrate and dried to form a laminate including a 7 μm-thick PVA layer formed on the PET substrate.

Then, the laminate was immersed in a dyeing solution containing iodine and potassium iodide and having a temperature of 30° C. to form a dyed laminate including a PVA layer having iodine absorbed therein. Specifically, the dyed laminate is formed by immersing the laminate in a dyeing solution containing 0.30 wt % of iodine and 2.1 wt % of potassium iodide at a solution temperature of 30° C., for an arbitrary time, to allow the PVA layer making up a target polarizing film (to be finally obtained) to have a single layer transmittance of 40 to 44%. Then, the dyed laminate including the PVA layer having the absorbed iodine was subjected to in-boric-acid-solution stretching at a stretching temperature of 60° C. based on an end-free uniaxial stretching process to attain a stretching ratio of 5.0. In this manner, various optical film laminates each including a 3 μm-thick PVA layer integrally stretched with the PET resin substrate were formed.

(Reference Sample 1)

In the reference sample 1, a continuous web of crystallizable polyethylene terephthalate (hereinafter referred to as "crystallizable PET") was used as a resin substrate, and a PVA aqueous solution was applied on a 200 μm-thick crystallizable PET substrate and dried to form a laminate including a 7 μm-thick PVA layer formed on the crystallizable PET substrate. A glass transition temperature of the crystallizable PET is 80° C. Then, the formed laminate was subjected to an elevated temperature in-air stretching at a stretching temperature of 110° C. based on an end-free uniaxial stretching process to attain a stretching ratio of 4.0 to thereby form a stretched laminate. Through the stretching, the PVA layer included in the stretched laminate was changed into a 3.3 μm-thick PVA layer having oriented PVA molecules. In the reference sample 1, the laminate could not be stretched at a stretching ratio of 4.0 or more in the elevated temperature in-air stretching at a stretching temperature of 110° C.

In a subsequent dyeing step, the stretched laminate was formed as a dyed laminate in which iodine is absorbed in the 3.3 μm-thick PVA layer having oriented PVA molecules. Specifically, the dyed laminate was formed by immersing the stretched laminate in a dyeing solution containing iodine and potassium iodide and having a temperature of 30° C., for an arbitrary time to cause iodine to be absorbed in the PVA layer included in the stretched laminate, so as to allow the PVA layer making up a target polarizing film to have a single layer transmittance of 40 to 44%. An amount of iodine to be absorbed in the PVA layer having oriented PVA molecules was adjusted to produce various dyed laminates different in single layer transmittance and polarization rate. Then, the formed dyed laminate was subjected to cross-linking. Specifically, the dyed laminate was cross-linked by immersing it in a cross-linking boric acid aqueous solution containing 3 weight parts of boric acid with respect to 100 weight parts of water and 3 weight parts of potassium iodide with respect to 100 weight parts of water, at a solution temperature of 40° C. for 60 seconds. The cross-linked dyed laminate in the comparative example 1 corresponds to the optical film laminate in the Example 4. Thus, cleaning, drying and lamination and/or transfer steps in the comparative example 1 are the same as those in the Example 4.

(Reference Sample 2)

In the reference sample 2, a crystallizable PET was used as a resin substrate, and a laminate including a 7 μm-thick PVA layer formed on the crystallizable PET substrate was formed in the same manner as that in the reference sample 1. Then, the formed laminate was subjected to elevated temperature in-air stretching at a stretching temperature of 100° C. based on an end-free uniaxial stretching process to attain a stretching ratio of 4.5 to thereby form a stretched laminate. Through the stretching, the PVA layer included in the stretched laminate was changed into a 3.3 μm-thick PVA layer having oriented PVA molecules. In the reference sample 2, the laminate could not be stretched at a stretching ratio of 4.5 or more in the elevated temperature in-air stretching at a stretching temperature of 100° C.

Then, a dyed laminate was formed from the stretched laminate. The dyed laminate was formed by immersing the stretched laminate in a dyeing solution containing iodine and potassium iodide and having a temperature of 30° C., for an arbitrary time to cause iodine to be absorbed in the PVA layer included in the stretched laminate, so as to allow the PVA layer making up a target polarizing film to have a single layer transmittance of 40 to 44%. In the reference sample 2, an amount of iodine to be absorbed in the PVA layer having oriented PVA molecules was adjusted to produce various dyed laminates different in single layer transmittance and polarization rate, as with the reference sample 1.

(Reference Sample 3)

In the reference sample 3, a crystallizable PET was used as a resin substrate, and a laminate including a 7 µm-thick PVA layer formed on the crystallizable PET substrate was formed in the same manner as that in the reference sample 1 or 2. Then, the formed laminate was immersed in a dyeing solution containing iodine and potassium iodide and having a temperature of 30° C., for an arbitrary time to cause iodine to be absorbed in the PVA layer included in the laminate, so as to allow the PVA layer making up a target polarizing film to have a single layer transmittance of 40 to 44%, to form various dyed laminates each including the PVA layer having iodine absorbed therein. Subsequently, the formed dyed laminate was subjected to elevated temperature in-air stretching at a stretching temperature of 90° C. based on an end-free uniaxial stretching process to attain a stretching ratio of 4.5 to thereby form a stretched laminate. Through the stretching, the PVA layer included in the stretched laminate was changed into a 3.3 µm-thick PVA layer having oriented PVA molecules. In the reference sample 3, the laminate could not be stretched at a stretching ratio of 4.5 or more in the elevated temperature in-air stretching at a stretching temperature of 90° C.

[Measurement Method]

(Thickness Measurement)

A thickness of each of the non-crystallizable PET substrate, the crystallizable PET substrate and the PVA layer was measured using a digital micrometer (KC-351C from Anritsu Electric Co., Ltd.).

(Measurement of Transmittance and Polarization Rate)

Each of the single layer transmittance T, the parallel transmittance Tp and the cross transmittance Tc of the polarizing film was measured using a UV-visible spectrophotometer (V7100 from JASCO Corporation). Each value of T, Tp and Tc is presented by a Y value measured according to JIS Z8701 (visual field of 2 degrees, C light source) and corrected for spectral luminous efficacy. The polarization rate P was calculated in accordance with the following formula using the above transmittance.

Polarization rate $P=\{(Tp-Tc)/(Tp+Tc)\}^{1/2} \times 100$ (Evaluation of Orientation Function of PET)

A Fourier Transform Infrared Spectrometer (FT-IR) (SPECTRUM 2000 from PerkinElmer, Inc.) was used as the measurement device. Attenuated total reflection (ATR) of polarizing light was measured to evaluate the surface of a PET resin layer. The orientation function was calculated in the following manner. Measurements were made on the polarizing light in the directions of 0° and 90° with respect to the stretching direction. Absorption intensity of the obtained spectral at 1340 cm$^{-1}$ was used to calculate the orientation function according to the Formula 4 (Non-Patent Document 1) described below. The condition of f=1 indicates a complete or perfect orientation, whereas the condition f=0 indicates a random orientation. The peak observed at 1340 cm$^{-1}$ is considered as indicating the absorption induced by a methylene in an ethylene glycol unit of PET.

$$f = (3\langle\cos^2\theta\rangle - 1)/2 \quad \text{(Formula 4)}$$
$$= [(R-1)(R_0+2)]/[(R+2)(R_0-1)]$$
$$= (1-D)/[c(2D+1)]$$
$$= -2 \times (1-D)/(2D+1)$$

where: $c=(3\cos^2\beta - 1)/2$;

β=90°, an angle of transition dipole moment with respect to an axis of molecular chain;

θ: an angle of molecular chain with respect to the stretching direction;

$R_0 = 2\cot^2\beta$;

$1/R = D = (I\perp)/(I//)$ (A value of D becomes larger as PET is more highly molecularly oriented);

I⊥=absorption intensity measured when polarizing light is entered in a direction perpendicular to the stretching direction; and I//=absorption intensity measured when polarizing light is entered in a direction parallel to the stretching direction.

(Evaluation of Orientation Function of PVA)

A Fourier Transform Infrared Spectrometer (FT-IR) (SPECTRUM 2000 from PerkinElmer, Inc.) was used as the measurement device. Attenuated total reflection (ATR) of polarizing light was measured to evaluate the surface of the PVA resin layer. The orientation function was calculated in the following manner. Measurements were made on the polarizing light in the directions of 0° and 90° with respect to the stretching direction. Absorption Intensity of the obtained spectral at 2941 cm$^{-1}$ was used to calculate the orientation function according to the above Formula 4. Intensity at 3330 cm$^{-1}$ was used as a reference peak, intensity at 2941 cm$^{-1}$/intensity at 3330 cm$^{-1}$ was calculated as the intensity I. The condition of f=1 indicates the complete or perfect orientation, whereas the condition f=0 indicates a random orientation. The peak observed at 2941 cm$^{-1}$ is considered to be absorption induced by vibration of the main chain of PVA (—CH$_2$—).

(Evaluation of Crystallization Degree of PVA)

A Fourier Transform Infrared Spectrometer (FT-IR) (SPECTRUM 2000 from PerkinElmer, Inc.) was used as the measurement device. Attenuated total reflection (ATR) of polarizing light was measured to evaluate the surface of the PVA resin layer. The crystallization degree was calculated in the following manner. Measurements were made on the polarizing light in the directions of 0° and 90° with respect to the stretching direction. Intensities of the obtained spectral at 1141 cm$^{-1}$ and at 1440 cm$^{-1}$ were used to calculate the crystallization degree. It was preliminarily ascertained that a level of the intensity at 1141 cm$^{-1}$ is correlated with an amount of crystal, and calculations were made using the intensity at 1440 cm$^{-1}$ as a reference peak to determine a crystallization index with the following equation (Formula 6). Further, a sample of PVA having a known crystallization degree was used to create a crystallization index and a calibration curve in advance, and the calibration curve was used to calculate the crystallization decree from the crystallization index (Formula 5).

Crystallization degree=63.8×(crystallization index)− 44.8    (Formula 5)

Crystallization index=$((I(1141\text{ cm}^{-1})0°+2\times I(1141\text{ cm}^{-1})90°)/3)/((I(1440\text{ cm}^{-1})0°+2\times I(1440\text{ cm}^{-1}))90°)/3)$    (Formula 6)

where: I (1141 cm$^{-1}$)0°=intensity at 1141 cm$^{-1}$ when polarizing light is entered in a direction parallel to the stretching direction;

I (1141 cm$^{-1}$)90°=intensity at 1141 cm$^{-1}$ when polarizing light is entered in a direction perpendicular to the stretching direction;

I (1440 cm$^{-1}$)0°=intensity at 1440 cm$^{-1}$ when polarizing light is entered in a direction parallel to the stretching direction; and I (1440 cm$^{-1}$)90°=intensity at 1440 cm$^{-1}$ when polarizing light is entered in a direction perpendicular to the stretching direction.

[Examples of Use of Polarizing Film]

Figure 11A:
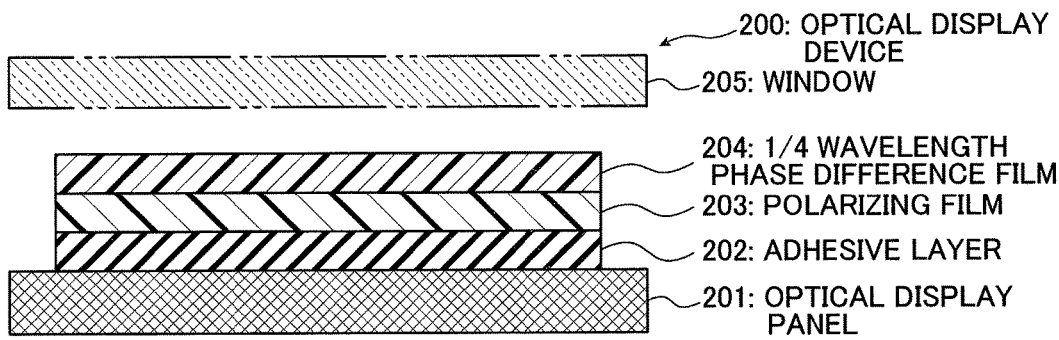
FIG. 11a is a sectional view illustrating an example of an organic EL display device using an optical film laminate according to the present invention.
Figure 11B:
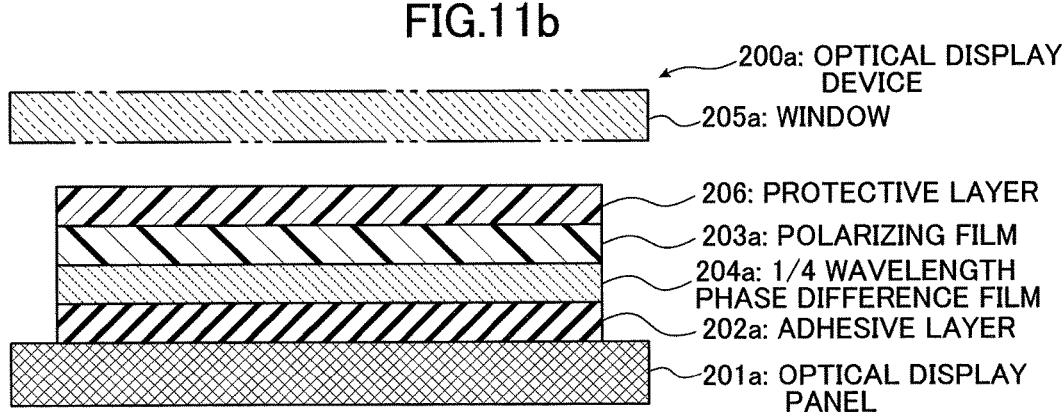
FIG. 11b is a sectional view illustrating another example of the organic EL display device using the optical film laminate according to the present invention.
Figure 12:
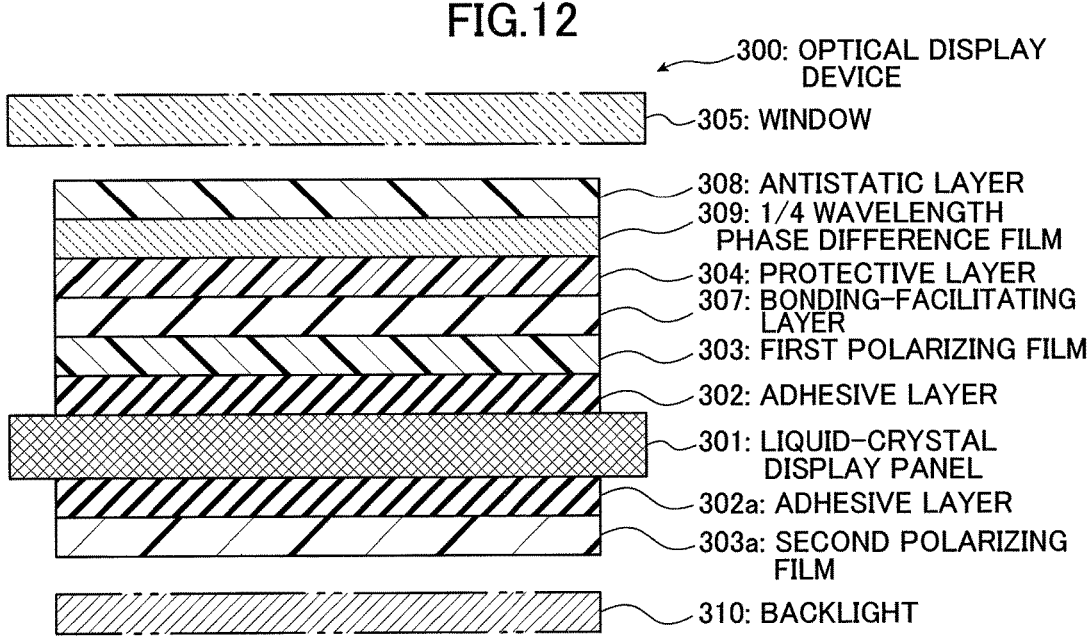
FIG. 12 is a sectional view illustrating an example of a liquid-crystal display device using an optical film laminate according to the present invention.

FIGS. 11a, 11b and 12 illustrate examples of optical display devices each using the above polarizing film.

FIG. 11a is a sectional view illustrating one example of a fundamental structure of an organic EL display device. This display device 200 comprises an optical display panel 201 in the form of an organic EL display panel, and a polarizing film 203 joined to one surface of the display panel 201 through an optically transparent adhesive layer 202. A ¼ wavelength phase difference film 204 is bonded to an outer surface of the polarizing film 203. Optionally, a transparent window 205 as indicated by the dotted line may be disposed on an outer side of the ¼ wavelength phase difference film 204. This structure is useful when a polarized sunglass is used.

FIG. 11b is a sectional view illustrating another example of the structure of the organic EL display device. This display device 200a comprises an optical display panel 201a in the form of an organic EL display panel, and a ¼ wavelength phase difference film 204a joined to one surface of the display panel 201a through an optically transparent adhesive layer 202a. A polarizing film 203a is bonded to an outer surface of the ¼ wavelength phase difference film 204a. Further, a protective layer 206 is bonded to an outer surface of the polarizing film 203a. Optionally, a transparent window 205a as indicated by the dotted line may be disposed on an outer side of the protective layer 206, i.e., on a viewing side of the optical display device 200a. In this example, outside light is converted to linearly-polarized light through the polarizing film 203a and further converted to circularly-polarized light through the ¼ wavelength phase difference film 204a. This structure is capable of blocking outside light from returning to the viewing side of the optical display device due to reflection by front surface and back surface electrodes, other internal reflection surface of the optical display panel 201a, etc., and effective to prevent internal reflection of outside light.

As a material for joining or bonding together layers, or films, it is possible to use, as a base polymer, at least one appropriately selected from the group consisting of acrylic-based polymer, silicone-based polymer, polyester, polyurethane, polyamide, polyether, fluorine or rubber-based polymer, isocyanate-based polymer, polyvinyl alcohol-based polymer, gelatin-based polymer, vinyl or latex-based polymer, and waterborne polyester.

As mentioned above, the polarizing film 203 is formed to have a thickness of 10 μm or less, and satisfy the aforementioned optical characteristics. This polarizing film 203 is extremely thin as compared to polarizing films used in this type of conventional optical display device, so that stress arising from expansion/contraction occurring depending on conditions of temperature or humidity becomes significantly smaller. Thus, it becomes possible to considerably reduce a risk that stress arising from expansion/contraction of the polarizing film causes deformation, such as warp, in the display panel 201 adjacent thereto, and drastically suppress deterioration in quality of display due to the deformation. In this structure, as the adhesive layer 202, a material having a diffusing function may be used, or a two-layer structure of an adhesive layer and a diffusion layer may be employed.

As a material for improving adhesion force of the adhesive layer 202, an anchor layer as disclosed, for example, in JP 2002-258269A (Patent Document 6), JP 2004-078143A (Patent Document 7) and JP 2007-171892A (Patent Document 8), may be provided. A binder resin is not limited to a particular type, as long as it is capable of improving anchoring force of the adhesive layer. Specifically, it is possible to use resin (polymer) having an organic reactive group, such as epoxy-based resins, polyurethane-based resins, polyester-based resins, polymers including an amino group in molecules, ester urethane-based resins, or acrylic-based resins including an oxazoline group.

Further, an antistatic agent as disclosed, for example, in JP 2004-338379A (Patent Document 9) may be added to the anchor layer to provide an antistatic capability thereto. The antistatic agent for providing an antistatic capability may includes an ionic surfactant-based material, a conductive polymer-based material such as polyaniline, polythiophene, polypyrrole or polyquinoxaline, and a metal oxide-based material such as tin oxide, antimony oxide or indium oxide. Particularly in view of optical characteristics, appearance, antistatic effect and stability of antistatic effects during heating or humidification, it is preferable to use the conductive polymer-based material. Among the conductive polymer-based materials, it is particularly preferable to use a water-soluble conductive polymer such as polyaniline or polythiophene, or a water-dispersible conductive polymer. When the water-soluble conductive polymer or the water-dispersible conductive polymer is used as a material for forming an antistatic layer, it becomes possible to suppress transformation of an optical film substrate due to an organic solvent during coating.

FIG. 12 illustrates an example of an optical display device 300 having a transmissive type liquid-crystal display panel 301 as an optical display panel. In the optical display device 300, a first polarizing film 303 is joined to a viewing-side surface of the liquid-crystal display panel 301 through a first adhesive layer 302, and a protective layer 304 is joined to the first polarizing film 303 through a bonding-facilitating layer 307. A ¼ wavelength phase difference film 309 is joined to the protective layer 304. Optionally, an antistatic layer 308 may be formed on the ¼ wavelength phase difference film 309. Optionally, a window 305 may also be disposed on an outer side of the ¼ wavelength phase difference film 309. A second polarizing film 303a is placed on the other surface of the liquid-crystal display panel 301 through a second adhesive layer 302a. As is commonly known in the field of transmissive liquid-crystal display devices, a backlight 310 is disposed on a back side of the second polarizing film 303a.

Embodiments

The present invention will be specifically described in accordance with a first embodiment taking reference to FIG. 30. As already described in connection with FIG. 9, through the PVA layer forming step 20, the preliminary in-air stretching step 30 and the in-boric-acid-solution stretching step 50, it is possible to produce an optical film laminate 10 in which a polarizing film 3 consisting of an uniaxially-stretched PVA layer is formed on a thermoplastic resin substrate 1 made, for example, of non-crystallizable PET. The optical film laminate 10 may be sent to a next step (station) in the form as it has been produced, or in the form of an optical film laminate 11 prepared by laminating another optical functional film 4 onto the polarizing film 3 and peeling the substrate 1 in the peeling/lamination step (I) illustrated in FIGS. 9 and 10. The first embodiment will be described based on an example in which the optical film laminate 10 comprising the substrate 1 and the polarizing film 3 is sent to a next step.

The optical film laminate 10 is unrolled from a roll 91 (not illustrated in FIG. 30) of the optical film laminate 10, and fed in a lengthwise direction thereof to pass through a reference-point printing section 110. The reference-point printing section 110 is operable to print a reference point on the substrate 1 according to a drive signal from a control section 200a of a first control unit 200. First reference-point reading means 111 and first defect detection means 112 are disposed downstream of the reference-point printing section 110. The first defect detection means 112 comprises a light source 112a, and a light-receiving device 112b for detecting light emitted from the light source 112a and transmitted through the optical film laminate 10. The first defect detection means 112 is operable to detect any defect existing in the optical film laminate 10, and, when the defect is detected, send information about a feed amount of the optical film laminate 10 in a time period between a time when the reference point is read by the first reference-point reading means 111 (i.e., a time when the reference point passes through the first reference-point reading means 111) and a time when the defect is subsequently detected, to the control section 200a of the first control unit 200. Simultaneously, the first defect detection means 112 is operable to send information about a position of the defect in a width direction of the optical film laminate 10, to the control section 200a of the first control unit 200. The control section 200a is operable to calculate a length of the optical film laminate 10 between the reference point and the detected defect, based on the information about the feed amount of the optical film laminate 10, and store information about the calculated length in a storage section 200b of the first control unit 200 as information about a feed-directional defect position, together with information about a laminate widthwise defect position. The feed-directional defect position information and the laminate widthwise defect position information will hereinafter be referred to collectively as "1st-stage inspection defect position information".

The optical film laminate 10 is further fed to a separator-film attaching station 230. In the separator-film attaching station 230, a separator film 231 unrolled from a roll 231a is fed to a nip between a pair of attaching rollers 233, 234 via a guide roller 232, in a posture where it is superimposed on a lower surface of the optical film laminate 10. Just before the separator film 231 is entered into the nip between the rollers 233, 234, an adhesive 235 is supplied between the separator film 231 and the optical film laminate 10 to form a layer, so that the separator film 231 is attached to the optical film laminate 10 through the adhesive layer 235 while passing through between the attaching rollers 233, 234, to form a separator film-attached optical film laminate 240. The separator film-attached optical film laminate 240 is fed in the length direction via second defect detection means 250, and wound into a roll 260. The second defect detection means 250 comprises second reference-point reading means 251, a light source 252 and a light-receiving device 253. The light-receiving device 253 is adapted to receive light emitted from the light source 252 and reflected by the separator film 231 of the separator film-attached optical film laminate 240 and detect a defect. The second defect detection means 250 is operable to detect any defect existing in the separator film 231 and the adhesive layer 235 of the separator film-attached optical film laminate 240, and, when the defect is detected, send information about a feed amount of the separator film-attached optical film laminate 240 in a time period between a time when the reference point is read by the second reference-point reading means 251 (i.e., a time when the reference point passes through the second reference-point reading means 251) and a time when the defect is subsequently detected, to a control section 300a of a second control unit 300. Simultaneously, the second defect detection means 250 is operable to send information about the position of the detected defect in a widthwise direction of the optical film laminate 240 having the separator attached thereto to the control section 300a of the second control unit 300 as information about a widthwise defect position. The control section 300a is operable to calculate the length of the optical film laminate 240 having the separator film attached thereto between the reference point and the detected defect, based on the information on the feed amount of the laminate 240, and store information about the calculated length in a storage section 300b of the second control unit 300 as information about a feed-directional defect position, together with the widthwise defect position information.

The control section 300a is operable to activate a roll-identification-mark printing means 270 to print identification information for identifying each roll, at an appropriate position on the laminate 240. The 1st-stage inspection defect position information and the 2nd-stage inspection defect position information are stored, respectively, in the storage section 200b of the first control unit 200 and the storage section 300b of the second control unit 300, in association with the identification information for identifying the roll 260.

FIG. 31 illustrates a second embodiment of the present invention. In the second embodiment, the optical film laminate 10 is directly fed to the separator-film attaching station 230 without passing through the first defect detection means. Then, in a peeling station 236 equipped with a pair of peeling rollers 237, 238, the separator film 231 is peeled from the separator film-attached optical film laminate 240. In the separator film-attached optical film laminate 240, an adhesion force between the separator film 231 and the adhesive layer 235 is weaker than an adhesion force between the adhesive layer 235 and the polarizing film. Thus, when the separator film 231 is peeled from the polarizing film 3, the adhesive layer 235 is left on the side of the polarizing film 3 to form an adhesive layer-including optical film laminate 10a.

The adhesive layer-including optical film laminate 10a is further fed to pass through a reference-point printing section 311. The reference-point printing section 311 is operable to print a reference point on the substrate 1 according to a drive signal from a control section 200a of a control unit 200. Then, the adhesive layer-including optical film laminate 10a is fed to pass through a defect detection section 310. The defect detection section 310 comprises reference-point reading means 312 disposed downstream of the reference-point printing section 311, a light source 313, and a light-receiving device 314 for detecting light emitted from the light source 313 and transmitted through the adhesive layer-including optical film laminate 10a. The defect detection section 310 is operable to detect any defect existing in the adhesive layer-including optical film laminate 10a, and, when the defect is detected, send information about a feed amount of the adhesive layer-including optical film laminate 10a in a time period between a time when the reference point is read by the reference-point reading means 311 (i.e., a time when the reference point passes through the reference-point reading means 311) and a time when the defect is subsequently detected, to the control section 200a of the control unit 200. Simultaneously, the defect detection section 310 is operable to send information about a position of the detected defect in a width direction of the optical film laminate 10a to the control section 200a of the control unit 200 as information about a widthwise defect position. The control section 200a is operable to calculate a length of the adhesive layer-including optical film laminate 10a between the reference point and the detected defect, based on the information about the feed amount of the laminate 10a, and store information about the calculated length in a storage section 200b of the control unit 200 as information about a feed-directional defect position, together with the widthwise defect position information.

As with the first embodiment illustrated in FIG. 30, the control section 200a is operable to instruct identification-information printing means 270 to print roll identification information for identifying a roll 260, at an appropriate position on the aforementioned laminate 240. In this case, the defect position information is stored in the storage section 200b of the control unit 200 in association with the identification information of the roll 260, in the same manner as described above.

Then, a separator film 231 is re-attached to the laminate 10a. This separator film 231 may be the separator film previously peeled from the separator film-attached optical film laminate 240, or may be a separator film unrolled from an additional roll. The same element or component of the attaching station In FIG. 31 as that in the separator film attaching station 230 in the first embodiment is defined by a common reference numeral or code, and its description will be omitted. A separator film-attached optical film laminate 240 formed by re-attaching the separator film 231 to the adhesive layer-including optical film laminate 10a is wound into the roll 260.

Figure 32:
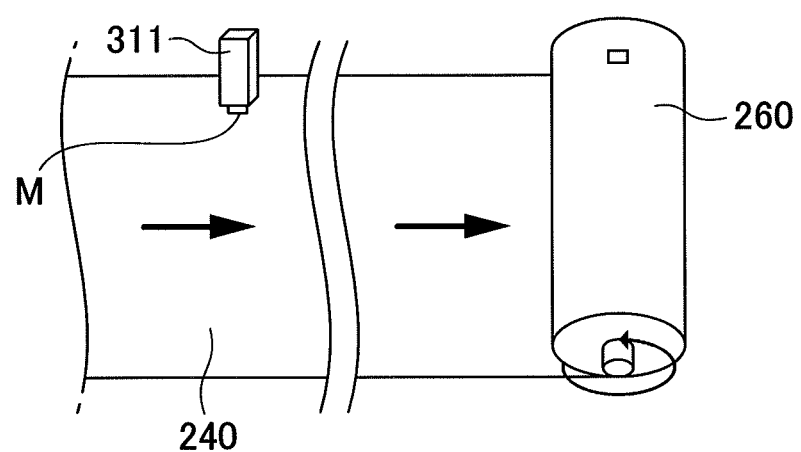
FIG. 32 is a schematic perspective view illustrating a reference-point printing step.

FIG. 32 is a perspective view illustrating one example of a method for printing a reference point M on a lateral edge region of an optical film laminate 240 to be formed into the roll 260. During feeding of the optical film laminate 240, when a portion of the optical film laminate 240 adjacent to a trailing end in a feed direction thereof reaches a position under a reference-point printing device 311, the reference-point printing device 311 is activated, for example, by an instruction signal from the control section 200a of the control unit 200 illustrated in FIG. 31, to print the reference point M on a lateral edge region of the optical film laminate 240 passing thereunder. When the optical film laminate 240 is unrolled from the roll 260, the trailing end portion of the optical film laminate 240 printed with the reference point M becomes a leading end portion of the laminate 240 in a feed direction thereof.

Figure 33:
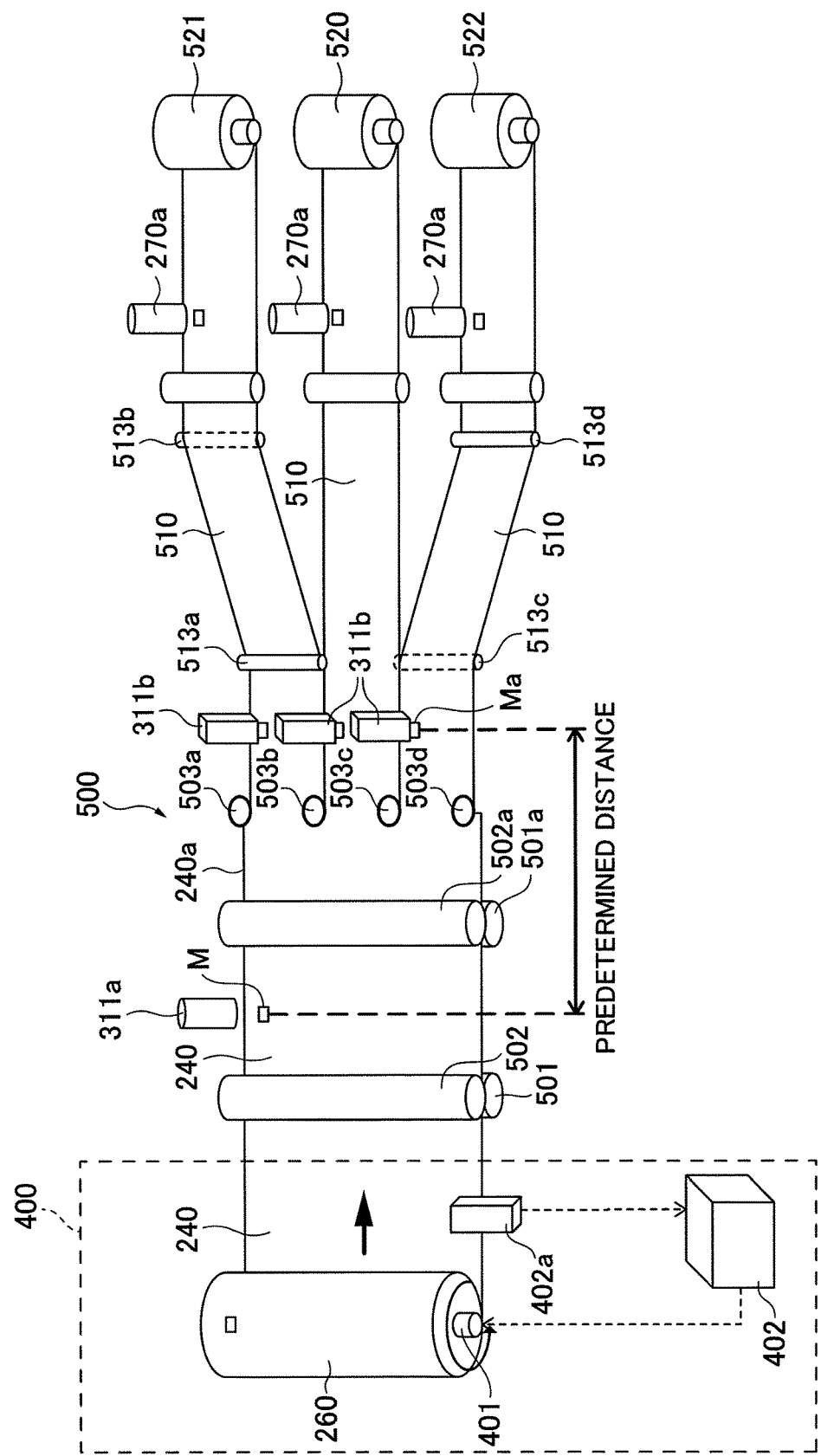
FIG. 33 is a schematic diagram illustrating a step of printing a reference point mark on a cut laminate strip and a step of printing identification information for identifying the laminate strip.

FIG. 33 is a perspective view illustrating one example of a cutting station in a production process according to one embodiment of the present invention. For example, the roll 260 of the separator film-attached optical film laminate 240 formed through the process illustrated in FIG. 30 or 31 and printed with the reference mark M through the process with reference to FIG. 32 is installed in a laminate unrolling unit 400. This unit 400 comprises a support shaft 401 for rotatably supporting the roll 260, and internally has a meandering control device 402 for allowing the laminate 240 unrolled from the roll 260 to be kept from meandering in a feed path. The meandering control device 402 is provided with an edge sensor 402a adapted to come into contact with a lateral edge of the laminate 240 to detect a position of the lateral edge, and adapted to generate a signal for adjusting an axial position of the support shaft 401 depending on a position of the lateral edge detected by the sensor 402a.

In the illustrated example, a cutting unit 500 is provided as a means to cut the polarizing film 3 of the laminate 240 into an appropriate size, in connection with a production process for an optical display device, wherein the polarizing film 3 of the laminate 240 is laminated to a rectangular-shaped liquid-crystal display panel having a long side and a short side. Specifically, the cutting unit 500 is designed to cut a wide separator film-attached optical film laminate 240 into an optical film laminate strip having a width corresponding to one of the long and short sides of the liquid-crystal display panel. In this example, the separator film-attached optical film laminate 240 unrolled from the roll 260 of the laminate 240 is fed in a lengthwise direction thereof by first and second feed roller pairs 501, 502; 501a, 502a disposed with an appropriate distance therebetween, while preventing the laminate 240 from meandering by the meandering control device 402. First to fourth disc-shaped rotary cutting blades 503a, 503b, 503c, 503d are arranged downstream of the second feed roller pair 501a, 502a in spaced-apart relation to each other in a widthwise or cross direction. The first cutting blade 503a is disposed at a position capable of cutting off a marginal edge portion 240a of the laminate 240 by a given width. The distance between adjacent two of the first to fourth cutting blades 503a to 503d is set to a value corresponding to a dimension of the short or long side of the liquid-crystal display panel on which the polarizing film 3 of the laminate 240 is to be laminated. The fourth cutting blade 503d also functions to cut off a marginal edge portion of the laminate 240 on a side opposite to the edge portion 240a. Through the operation of the adjacent ones of the first to fourth cutting blades 503a to 503d, three laminate strips 510 each having a width corresponding to the short or long side of the liquid-crystal display panel are formed.

The first feed roller pair 501, 502 additionally function as laminate-feed-amount measuring means. A reference-point reading device 311a is disposed between the first and second feed roller pairs 501, 502; 501a, 502a to read the reference point printed on the laminate 240 by the reference-point printing device 311. The reference-point reading device 311a is operable to detect the printed reference mark, and send a signal indicative of a clock time when the printed reference mark is detected, to a control unit, for example, the control unit 200 illustrated in FIG. 31. Three strip-reference-point printing devices 311b are disposed downstream of the second feed roller pair 501a, 502a at respective positions corresponding to the three laminate strips 510. The control unit, for example, the control unit 200 illustrated in FIG. 31, is operable to receive the signal indicative of the clock time of detection of the printed reference mark from the reference-point reading device 311a, and a signal indicative of a measured feed amount from the first feed roller pair 501, 502 as the laminate-feed-amount measuring means, and calculate a feed amount of the laminate strip 510 based on the received signals. Then, when each of the laminate strips 510 cut by the cutting blades 503a to 503d is fed by a distance equal to a distance A between the reference-point reading device 311a and the strip-reference-point printing device 311b, the control unit is operable to instruct each of the strip-reference-point printing devices 311b to print a referent mark Ma on a respective one of the laminate strips 510.

A central one of the three separator film-attached optical film laminate strips 510 cut by the cutting blades 503a to 503d is fed in the feed direction, while maintaining a height position thereof constant, and wound into a roll 520. One of the remaining strips 510 on a left side of the central strip 510 in the feed direction is led upwardly by two guide rollers 513a, 513b, and wound into a roll 521. Similarly, the other strip 510 on a right side of the central strip 510 in the feed direction is led downwardly by two guide rollers 513c, 513d, and wound into a roll 522. Three identification-information printing devices 270a are disposed just before the respective winding positions, and operable to print roll identification information for identifying the rolls 520, 521, 522 individually, on corresponding ones of the laminate strips 510. The control unit, for example, the control unit 200 illustrated in FIG. 31, stores information about a laminate widthwise defect position detected in the defect inspection step, as described in connection with FIG. 31. Thus, the control unit is operable, based on this information, to determine in which of the rolls 520, 521, 522 of the laminate strips the defect is included, and store identification information for identifying a defect-including one of the rolls 520, 521, 522 in a storage section, for example, the storage section 200b of the control unit 200, in combination with positional information about the defect.

Figure 34:
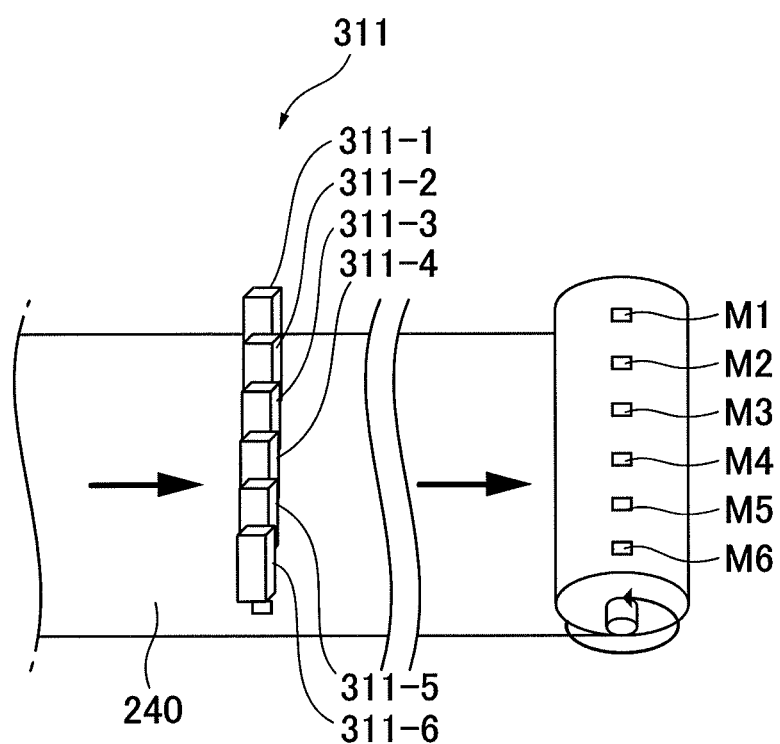
FIG. 34 is a schematic perspective view illustrating another technique of printing a reference point.

FIG. 34 illustrates one example of a method for creating a reference mark to extend across the separator film-attached optical film laminate 240 in the width direction, in a dot pattern consisting of a plurality of dots arranged in a straight line. In this example, a reference-point printing device 311 comprises a plurality of printing means 311-1 to 311-6 arranged in a line extending across the separator film-attached optical film laminate 240 in the width direction, wherein a plurality of reference point marks M1 to M6 are formed in a line extending across the separator film-attached optical film laminate 240 in the width direction. In place of the plurality of reference point marks M1 to M6 arranged in a line, a reference mark consisting of a single line may be formed. In these cases, when the separator film-attached optical film laminate 240 is cut into a plurality of laminate strips 510 as illustrated in FIG. 33, the reference point marks are left on respective ones of the laminate strips 510. Thus, it becomes possible to eliminate the need of printing a reference point on each of the laminate strips 510 after the cutting, as in the example illustrated in FIG. 33.

Figure 35:
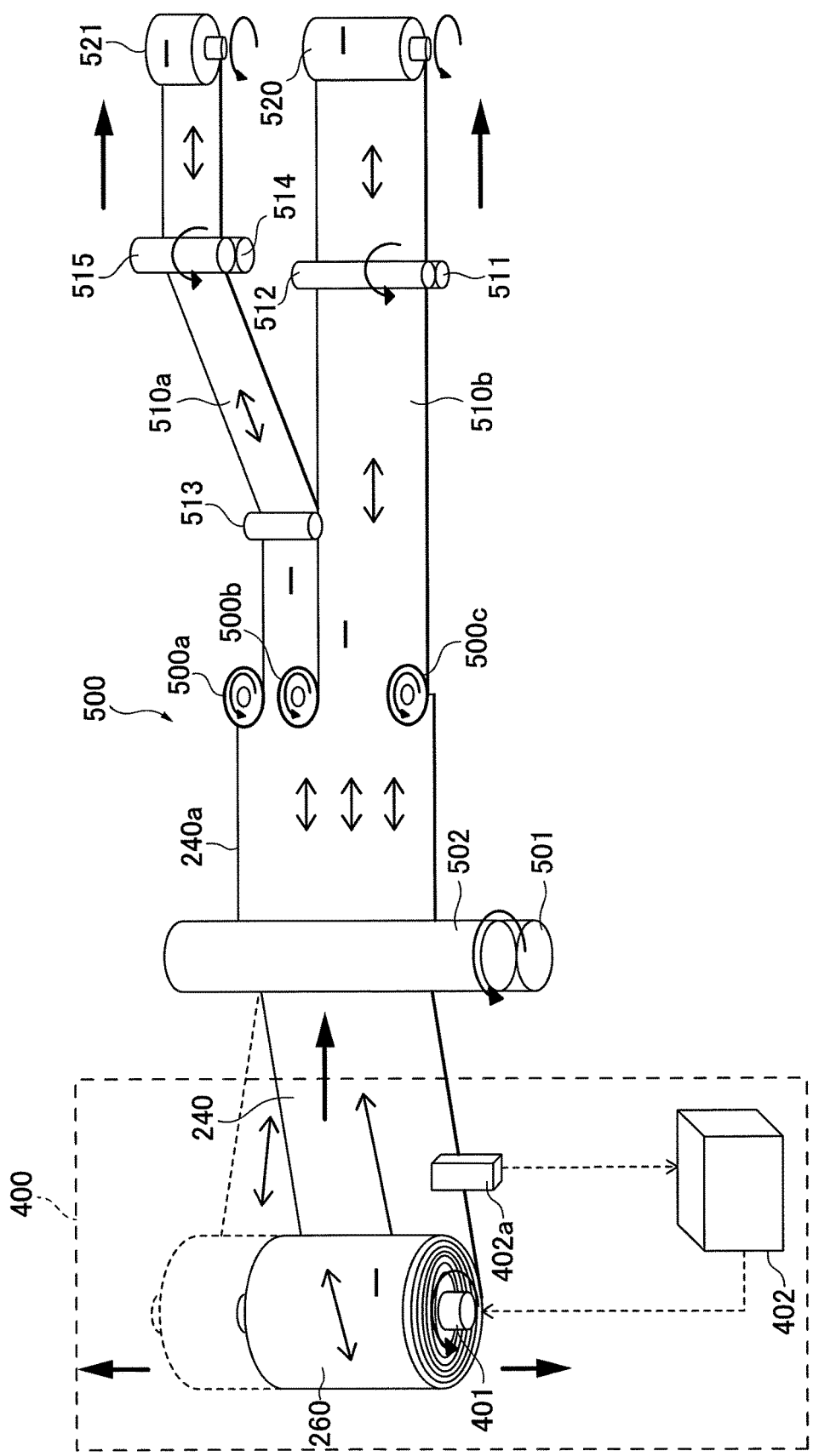
FIG. 35 is a schematic diagram illustrating another example of a method of cutting a separator-attached optical film laminate into a plurality of strips.

FIG. 35 is a perspective view illustrating a cutting station in a production process according to another embodiment of the present invention. For example, the roll 260 of the separator film-attached optical film laminate 240 formed through the process illustrated in FIG. 30 or 31 is installed in the same laminate unrolling unit 400 as that described in connection with FIG. 33.

In the illustrated embodiment, a cutting unit 500 is provided as a means to cut the polarizing film 3 of the laminate 240 into an appropriate size, in connection with a production process for an optical display device, wherein a polarizing film is laminated to a rectangular-shaped liquid-crystal display panel having a long side and a short side. Specifically, the cutting unit 500 is designed to cut a wide separator film-attached optical film laminate 240 into two optical film laminate strips having widths corresponding to respective ones of the long side and the short side of the liquid-crystal display panel.

In FIG. 35, the separator film-attached optical film laminate 240 unrolled from the roll 260 of the laminate 240 is fed in a length direction thereof by a pair of feed rollers 501, 502, while being kept from meandering by the meandering control device 402. First to third disc-shaped rotary cutting blades 500a, 500b, 500c are arranged downstream of the feed rollers 501, 502 in spaced-apart relation to each other in a width or cross direction. The first cutting blade 500a is disposed at a position capable of cutting off an edge portion 240a of the laminate 240 by a given width. A distance between the first cutting blade 500a and the second cutting blade 500b is set to a value corresponding to a dimension of the short side of the liquid-crystal display panel on which the polarizing film 3 of the laminate 240 is to be laminated.

Further, a distance between the second cutting blade 503b and the third cutting blade 503c is set to a value corresponding to a dimension of the long side of the liquid-crystal display panel on which the polarizing film 3 of the laminate 240 is to be laminated. The third cutting blade 500c also functions to cut off an edge portion of the laminate 240 on a side opposite to the edge portion 240a.

Thus, a first laminate strip 510a having a width corresponding to the short side of the liquid-crystal display panel is formed by the first cutting blade 500a and the second cutting blade 500b, and a second laminate strip 510b having a width corresponding to the long side of the liquid-crystal display panel is formed by the second cutting blade 500b and the third cutting blade 500c. The second laminate strip 510b having a width corresponding to the long side is fed by a pair of feed rollers 511, 512, and directly wound into a roll 520. The first laminate strip 510a having a width corresponding to the short side is guided to a position higher than the second laminate strip 510b by a guide roller 513. Then, the first laminate strip 510a is fed by a pair of feed rollers 514, 515, and wound into a roll 521.

In the present invention, as can be understood from the above embodiments, a continuous web of optical film laminate, i.e., the separator film-attached optical film laminate, is cut along a direction parallel to the length direction as the stretching direction of the polarizing film 3, to form a continuous web of laminate strip having a given width, so that a direction of the absorption axis of the polarizing film 3 conforms to a length direction of the laminate strip with a high degree of accuracy. Heretofore, a wide optical film laminate has been cut to a given width in a state after being wound into a roll. However, this technique is incapable of allowing the absorption axis of the polarizing plate to conform to the length direction of the laminate strip with a high degree of accuracy. As compared to the conventional technique of cutting the laminate in the form of a roll, the technique of the present invention described based on the above embodiments provides remarkably high accuracy. In the above embodiments, two cutting blades may be used to form a single laminate strip. Further, although not illustrated, a reference mark is printed on each of the laminate strips 510a, 510b at a position corresponding to the reference point M created on the separator film-attached optical film laminate, and identification information for identifying each of the laminate strips 510a, 510b is also printed in the same manner as that described in connection with FIG. 33.

Figure 36:
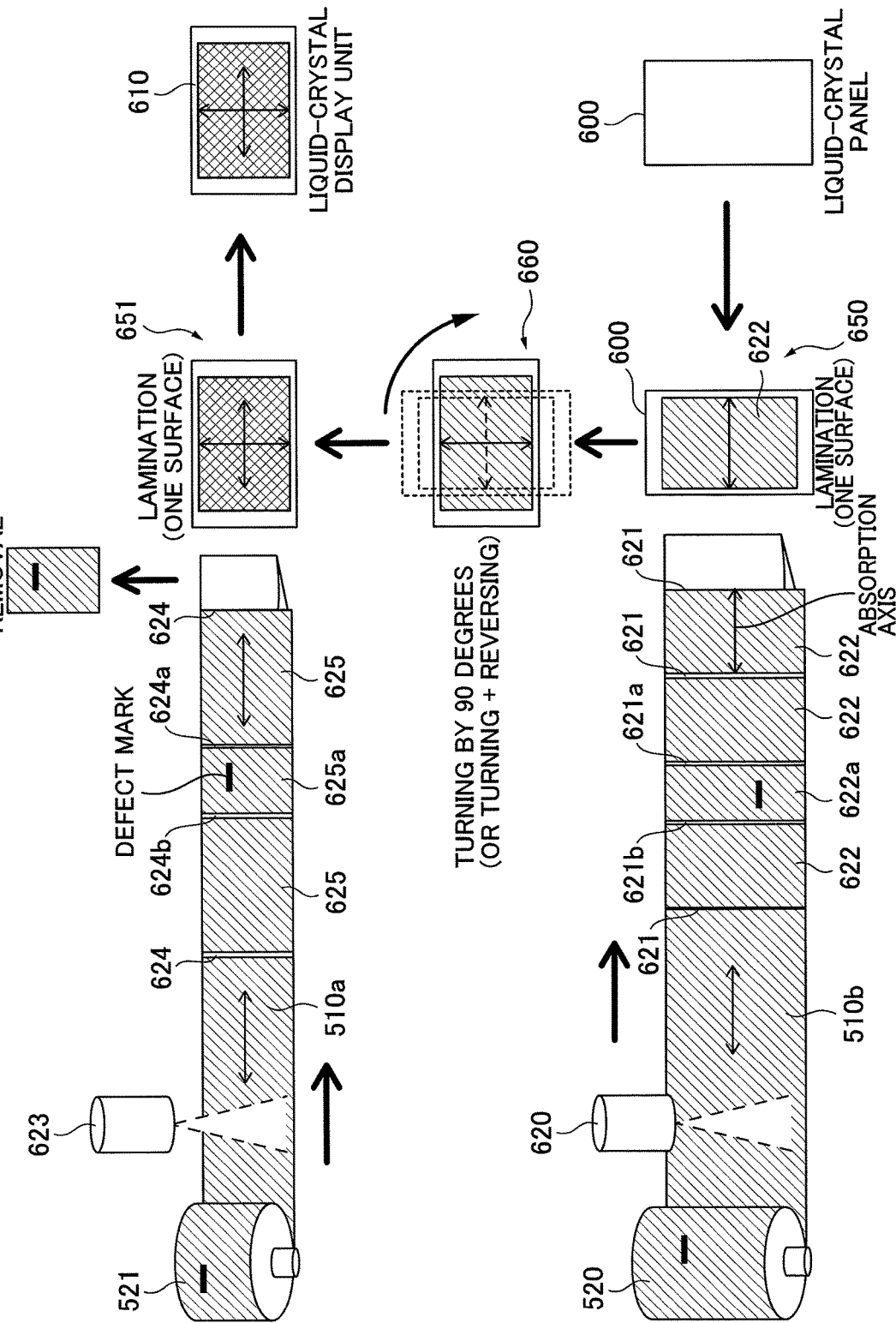
FIG. 36 is a schematic diagram illustrating one example of a step of laminating a polarizing film to a liquid-crystal display panel.

FIG. 36 schematically illustrates a process of, using the laminate strips 520, 521 produced through the process described with reference to on FIG. 35, laminating the polarizing films 3 thereof on respective opposite surfaces of a liquid-crystal display panel 600, while allowing the absorption axes of the polarizing films 3 to orthogonally intersect each other, to produce a liquid-crystal display unit 610. Referring to FIG. 36, the second laminate strip 510b having a width corresponding to the long side is unrolled from the roll 520, and fed in the length direction. The second laminate strip 510b unrolled from the roll 520 is fed to pass under defect-mark reading means 620. The defect-mark reading means 620 is operable to read the defect mark M. If no defect mark is detected, it is determined that no defect exists in the second laminate strip 510b, and a plurality of slits 621 are formed at lengthwise intervals corresponding to the short side of the liquid-crystal display panel 600, to extend from a surface of the substrate 1 through the polarizing film 3 and the adhesive layer 235 in a width direction perpendicular to the length direction, up to a depth reaching a surface of the separator film 231. A cut formed by this slit will hereinafter be referred to as "half-cut". According to the half-cut, a polarizing film laminate sheet 622 comprising the substrate 1, the polarizing film 3 and the adhesive layer 235 is formed between two of the slits 621 located adjacent to each other in the length direction of the second laminate strip 510*b*. Each of the polarizing film laminate sheets 622 is maintained to adhere on the separate film 231 through the adhesive layer 235.

The second laminate strip 510*b* having the slits 621 formed therein is fed to a first polarizing-film lamination station 650. Each of a plurality of the liquid-crystal display panels 600 is fed from a side opposite to the laminate strip 510*b* to the first polarizing-film lamination station 650 in synchronous relation to a respective one of the polarizing film laminate sheets 622 of the second laminate strip 510*b*, and the polarizing film laminate sheets 622 are sequentially peeled from the separator film 231, and laminated to respective upper surface of corresponding ones of the liquid-crystal display panels 600. The liquid-crystal display panel 600 having the polarizing film 3 laminated to the upper surface thereof is conveyed to a reversing/turning section 660 in a direction perpendicular to a direction along which the liquid-crystal display panel 600 is fed to the first lamination station 650.

On the other hand, the first laminate strip 510*a* having a width corresponding to the short side is unrolled from the roll 521, and fed in the length direction. The first laminate strip 510*a* unrolled from the roll 521 is fed to pass under defect-mark reading means 623. The defect-mark reading means 623 is operable to read the defect mark. If no defect mark is detected, it is determined that no defect exists in the first laminate strip 510*a*, and a plurality of slits 624 are formed at lengthwise intervals corresponding to the long side of the liquid-crystal display panel 600, to extend from a surface of the substrate 1 through the polarizing film 3 and the adhesive layer 235 in a width direction perpendicular to the length direction, up to a depth reaching a surface of the separator film 231, in a half-cut manner. According to the half-cut, a polarizing film laminate sheet 625 comprising the substrate 1, the polarizing film 3 and the adhesive layer 235 is formed between two of the slits 624 located adjacent to each other in the length direction of the first laminate strip 510*a*. Each of the polarizing film laminate sheets 625 is maintained to adhere on the separate film 231 through the adhesive layer 235.

The first laminate strip 510*a* having the slits 624 formed therein is fed to a second polarizing-film lamination station 651. After the liquid-crystal display panel 600 having the polarizing sheet 622 laminated on the upper surface thereof is reversed and turned by 90 degrees in the reversing/turning section 660, the liquid-crystal display panel 600 is conveyed to the second polarizing-film lamination station 651 in a direction perpendicular to the first laminate strip 510*a*, in synchronous relation with a corresponding one of the polarizing film laminate sheets 625 of the first laminate strip 510*a*. In the second polarizing-film lamination station 651, the polarizing film laminate sheet 625 is peeled from the separator film 231, and laminated to the other surface of the liquid-crystal display panel 600 facing upwardly after the reversing. Through the above process, the two polarizing films 3 are laminated on respective ones of the opposite surfaces of the liquid-crystal display panel 600 while allowing the absorption axes thereof to orthogonally intersect each other.

When the defect mark is detected on the first laminate strip 510*a*, a distance between a slit 624*a* formed in the first laminate strip 510*a* on a leading side in the feed direction with respect to the defect mark, and a leading edge (downstream edge) of the defect mark in the feed direction is determined. If the distance is less than a dimension corresponding to the long side of the liquid-crystal panel, an operation of cutting a defective sheet is performed. In the defective slit cutting operation, a slit 624*b* on a trailing side in the feed direction with respect to the leading slit 624*a* is formed in the first laminate strip 510*a* at a position spaced apart from a trailing edge (upstream edge) of the defect mark toward an upstream side by a given distance, in a half-cut manner. According to a non-illustrated defective-sheet eject mechanism, a polarizing film laminate sheet 625*a* formed between the slits 624*a*, 624*b* is ejected as a defective sheet to a defective-sheet discharge path, without being fed to the second polarizing film lamination station. Generally, the polarizing film laminate sheet 625*a* formed between the slits 624*a*, 624*b* has a length less than that of the normal polarizing film laminate sheet 625 to be formed between the two adjacent slits 624. Thus, it is possible to reduce a material to be discarded as the defective sheet. However, if a defect has a large size extending in the length direction of the first laminate strip 510*a*, or a plurality of defects successively exist in the length direction of the first laminate strip 510*a*, the defective polarizing film laminate sheet 625*a* is likely to become longer than the normal polarizing film laminate sheet 625. In this case, in order to facilitate ejection of the defective sheet, an additional slit may be formed in an intermediate portion of the long defective polarizing film laminate sheet 625*a* to reduce a length of one defective polarizing film laminate sheet.

When the defect mark is also detected on the second laminate strip 510*b*, two slits 621*a*, 621*b* are formed in the second laminate strip 510*b* in a half-cut manner, respectively, at two positions: one position spaced apart from a downstream edge of the defect mark toward the downstream side by a given distance; and the other position spaced apart from an upstream edge of the defect mark toward the upstream side by a given distance. According to a non-illustrated defective-sheet eject mechanism, a polarizing film laminate sheet 622*a* formed between the slits 621*a*, 621*b* is ejected as a defective sheet to a defective-sheet discharge path, without being fed to the first polarizing film lamination station.

Figure 37:
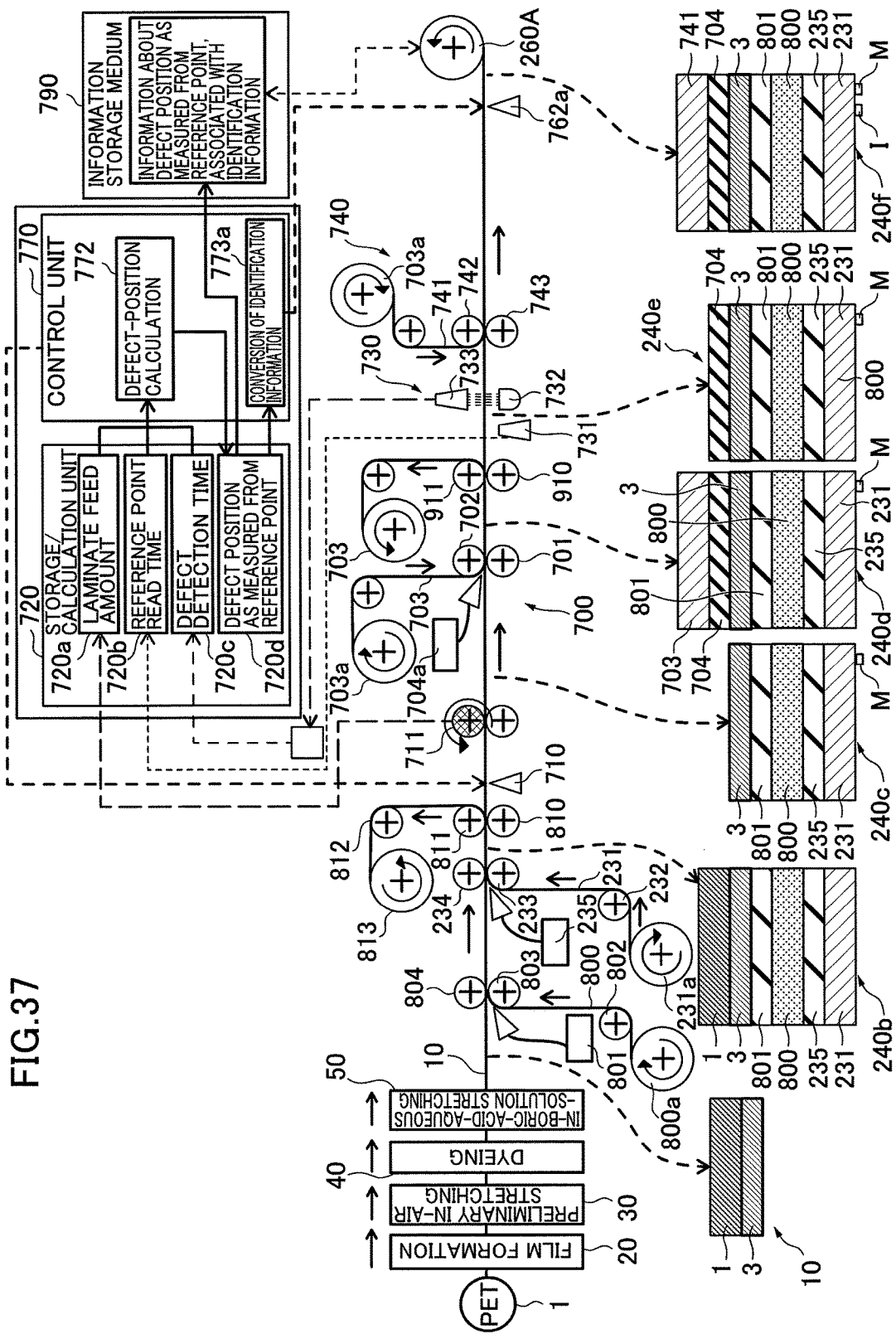
FIG. 37 is a schematic diagram illustrating a defect inspection in a production process for a roll of an optical film laminate, according to another embodiment of the present invention.

Differently from the first and second embodiments illustrated in FIGS. 30 and 31, FIG. 37 illustrates a third embodiment in which the substrate 1 is peeled from the optical film laminate. In the third embodiment, an optically functional film 800 is bonded to a surface of the polarizing film 3 of the optical film laminate 10 through a bonding agent 801. The optically functional film 800 may be a ¼ wavelength phase difference film, a viewing angle compensation film, or any other optically functional film used in the field of optical display devices. A separator film 231 is joined onto the optically functional film 800 through an adhesive layer 235. The separator film 231 is unrolled from a roll 231*a*, and fed via a guide roller 232. Then, it is attached onto the optically functional film 800 by a pair of attaching rollers 233, 234 to form a separator film-attached optical film intermediate laminate 240*b*. After the optically functional film 800 and the separator film 231 are bonded to the optical film laminate, the thermoplastic resin substrate 1 used for stretching is peeled from the polarizing film 3 by a pair of peeling roller 810, 811, to form a separator film-attached optical film intermediate laminate 240*c*. The peeled substrate 1 is taken up into a roll 813 through a guide roller 812.

In the separator film-attached optical film intermediate laminate 240c formed by peeling the substrate 1 from the optical film laminate, a mark M indicative of a reference point is printed on a surface of the separator film 231 by reference-point printing means 710. Then, the separator film-attached optical film intermediate laminate 240c is fed to a second separator-film attaching station 700 via a length measuring roller 711. The length measuring roller 711 is adapted to measure a feed amount of the laminate 240c and send a measurement signal to laminate-feed-amount calculation means 720a of a storage/calculation unit 720.

In the second separator film attaching station 700, a second separator film 703 unrolled from a roll 703a is fed to be superimposed on a surface of the separator film-attached optical film intermediate laminate 240c from which the substrate 1 is peeled, so that it is attached to the polarizing film 3 by a pair of attaching rollers 701, 702, through an adhesive layer 704 consisting of an adhesive supplied to the surface, to form a second separator film-attached optical film intermediate laminate 240d.

When the optical film laminate 240d passes through a pair of peeling rollers 910, 911, the separator film 703 is peeled therefrom to form a laminate 240e having a structure in which the adhesive layer 704 adheres to the polarizing film 3 of the separator film-attached optical film intermediate laminate 240c. The peeled separator film 703 is taken up into a roll 703a. On the other hand, the laminate 240e is fed to a protective-film attaching station 740 via a defect inspection station 730. In the protective-film attaching station 740, a protective film 741 is joined to the laminate 240e by a pair of attaching roller 742, 743 through the adhesive layer 704 on the surface of the polarizing film 3 of the laminate 240e, to form a protective film-attached optical film laminate 240f. The protective film-attached optical film laminate 240f formed in the above manner is wound into a roll 260A.

In the third embodiment, the defect inspection station 730 comprises reference-point reading means 731, and transmitted-light detection type optical-defect detection means composed of a light source 732 and a light sensing element 733. A read signal from the reference-point reading means 731 is sent to reference-point-read-time storage means 720b of the storage/calculation unit 720, and the reference-point-read-time storage means 720b is operable to store a clock time when the reference point is detected. A defect detection signal from the optical-defect detection means is sent to defect-detection-time calculation means 720c of the storage/calculation unit 720, and the defect-detection-time calculation means 720c is operable to calculate a clock time when the defect is detected and store the calculated clock time. Respective signals from the laminate-feed-amount calculation means 720a, the reference-point-read-time storage means 720b and the defect-detection-time calculation means 720c are input into a defect-position calculation section 772 of a control unit 770 provided in an optical film laminate forming apparatus. The defect-position calculation section 772 is operable, in response to receiving the input of the above signals, to calculate a defect position as measured from the reference point mark M, and send a signal indicative of the defect position to a defect-position storage section 720d of the storage/calculation unit 720. The defect position information stored in the defect-position storage section 720d is stored in another information storage medium 790 separate from the control unit 770.

Identification information conversion means 773a provided in the control unit 770 is operable to instruct roll-identification-information printing means 762a to print identification information I on the separator film 231 of the optical film laminate 240f to identify the laminate 240f. The information storage medium 790 is adapted to store the identification information in association with the defect position information. Thus, in a subsequent station using the roll 260A of the optical film laminate, the defect position of the roll 260A can be read from the information storage medium 790.

Figure 38:
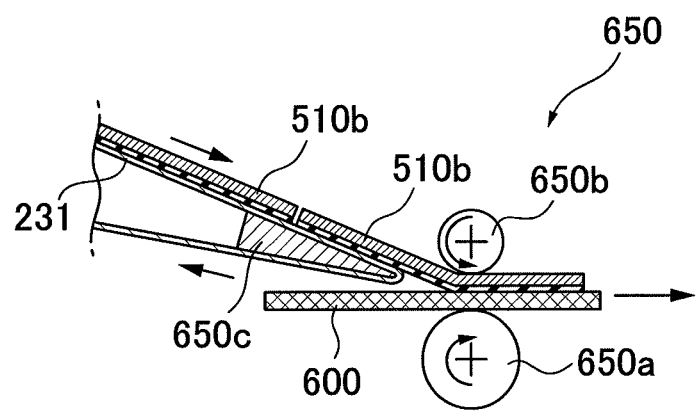
FIG. 38 is a schematic sectional view illustrating one example of a mechanism for continuously laminating a polarizing film to a liquid-crystal display panel.

FIG. 38 is a sectional view illustrating a specific example of a mechanism for laminating a polarizing film. For the sake of simplifying explanation, the example illustrated in FIG. 36 has been described on an assumption that a plurality of liquid-crystal display panels 600 are fed to the first polarization-film lamination station 650 in a direction opposite to the feed direction of the second laminate strip 510b in synchronous relation to respective ones of the polarizing film laminate sheets 622 on the second laminate strip 510b. In order to continuously perform lamination of the polarizing film, it is preferable that the liquid-crystal display panels 600 are fed in synchronous relation to respective ones of the polarizing film laminate sheets 622 on the second laminate strip 510b and in up-and-down relation to the second laminate strip 510b. FIG. 38 illustrates one example of such a mechanism. The liquid crystal panels 600 are fed into the first polarization-film lamination station 650 in synchronous relation to respective ones of the polarizing film laminate sheets 622 on the second laminate strip 510b and at a position below the second laminate strip 510b. In the first polarization-film lamination station 650, a pair of laminating rollers 650a, 650b are arranged in an upward-downward direction, and a peeling edge member 650c having an acute-angled distal end for peeling the separator film 231 is disposed upstream of the rollers 650a, 650b in the feed direction. Just before the polarizing film laminate sheet 622 is fed into a nip between the laminating rollers 650a, 650b in synchronization with the liquid crystal panel 600 fed into the nip, the separator film 231 is peeled by the peeling edge member 650c, and only the polarizing film laminate sheet 622 will reach the nip between the laminating rollers 650a, 650b. Then, the polarizing film laminate sheet 622 is pressed against and fully lamented to the liquid crystal panel 600 by the laminating rollers 650a, 650b. The lamination in the second polarizing-film lamination station 651 is performed in the same manner.

Although the present invention has been described in term of specific exemplary embodiments, it is to be understood that various changes and modifications will be apparent to those skilled in the art. Therefore, the present invention is not limited by the description contained herein or by the drawings, but only by the appended claims and their legal equivalents.

EXPLANATION OF CODES

1: Substrate
2: PVA type resin layer
3: Polarizing film
4: Optically functional film
5: Second optically functional film
7: PVA resin layer-including laminate
8: Stretched laminate
8': Roll of stretched laminate
8": Insolubilized stretched laminate
9: Dyed laminate
9': Cross-linked dyed laminate
10: Optical film laminate
11: Optically functional film laminate
20: Laminate forming apparatus 21: Coating means
22: Drying means
23: Surface modifying unit
30: Preliminary in-air stretching apparatus
31: Stretching means
32: Take-up unit
33: Oven
40: Dyeing apparatus
41: Dyeing solution
42: Dyeing bath
43: Feeding unit
50: In-boric-acid-solution stretching apparatus
51: Boric acid aqueous solution
52: Boric acid aqueous solution bath
53: Stretching means
60: Insolubilization apparatus
61: Insolubilizing boric acid aqueous solution
70: Cross-linking apparatus
71: Cross-linking boric acid aqueous solution
80: Cleaning apparatus
81: Cleaning solution
90: Drying apparatus
91: Take-up unit
100: Lamination/transfer apparatus
101: Unrolling/laminating apparatus
102: Take-up/transfer apparatus
(A): Laminate preparation step
(B): Preliminary in-air stretching step
(C): Dyeing step
(D): In-boric-acid-solution stretching step
(E): First insolubilization step
(F): Cross-linking step including second insolubilization
(G): Cleaning step
(H): Drying step
(I): Laminating/transfer process
230: Separator-film attaching station
231: Separator film
260, 260A: Roll of optical film laminate
310: Defect detection section
510a, 510b: Laminate strip
520, 521: Roll of laminate strip
600: Liquid-crystal display panel
621: Slit
770: Control unit

What is claimed is:

1. A method of producing a roll of an optical film laminate strip, comprising the steps of:
forming an optical film laminate which comprises an optical film having at least a continuous web of polarizing film, and a resin film bonded to the optical film, wherein the polarizing film is stretched to a thickness of 10 μm or less and formed to have optical characteristics satisfying the following conditions:

$P > -(10^{0.929T-42.4}-1) \times 100$ (where $T<42.3$); and $P \geq 99.9$ (where $T \geq 42.3$), where T is a single layer transmittance, and P is a polarization rate;
applying a reference mark to extend across the optical film laminate in a widthwise direction thereof, in a continuous line pattern or a dotted line pattern consisting of a plurality of dots, while feeding the optical film laminate in a lengthwise direction thereof;
performing a defect inspection for detecting any defect existing in the optical film, while feeding the optical film laminate in the lengthwise direction, and, when a defect is detected, recording the position of the defect in the form of a laminate widthwise position and a laminate lengthwise position as measured from the reference mark;
cutting the optical film laminate along a direction parallel to the lengthwise direction to form a plurality of continuous webs of laminate strips each having a given width;
based on the widthwise position of the defect detected by the defect inspection, determining which of the cut laminate strips has the defect, and, with respect to a specific laminate strip which is determined to have the defect, storing information about the defect together with identification information for identifying the specific laminate strip; and
winding each of the laminate strips into a roll.

2. The method as defined in claim 1, wherein:
the optical film is a polarizing film formed on a continuous web of a thermoplastic resin substrate to have the thickness of 10 μm or less, by a process comprising a step of subjecting a laminate comprising the continuous web of thermoplastic resin substrate and a polyvinyl alcohol type resin layer formed on the substrate, to a 2-stage lengthwise uniaxial stretching consisting of preliminary in-air stretching and an in-boric-acid-solution stretching, to attain a total stretching ratio of 5 to 8.5 to thereby reduce the thickness of the polyvinyl alcohol type resin layer to 10 μm or less, and a step of subjecting the laminate to dyeing with a dichroic material; the resin film being the thermoplastic resin substrate stretched together with the polyvinyl alcohol type resin layer.

3. The method as defined in claim 2, wherein the stretching ratio during the preliminary in-air stretching is 3.5 or less.

4. The method as defined in claim 2, wherein the impregnation of the dichroic material is performed by immersing the polyvinyl alcohol type resin layer in a dyeing solution containing iodine in a water solvent in an iodine concentration ranging from 0.12 to 0.30 weight %.

5. The method as defined in claim 2, which further comprises a step of cleaning the optical film laminate by a cleaning solution containing an iodide salt at a solution temperature within 40° C.

6. The method as defined in claim 2, which further comprises a step of laminating a separator film on a surface of the polarizing film on a side opposite to the thermoplastic resin substrate, through an adhesive.

7. The method as defined in claim 2, which further comprises a step of laminating an optically functional film on a surface of the polarizing film on a side opposite to the thermoplastic resin substrate, through a bonding agent.

8. The method as defined in of claim 7, which further comprises a step of laminating a separator film on a surface of the optically functional film on a side opposite to the polarizing film, through an adhesive.

9. The method as defined in of claim 7, wherein the optically functional film is a biaxial phase difference film having a three-dimensional refractive index, in which refractive indexes in triaxial directions have the following relation: nx>ny>nz.

10. The method as defined in claim 1, wherein:
the optical film includes at least a polarizing film formed on a continuous web of thermoplastic resin substrate by subjecting a laminate comprising the continuous web of thermoplastic resin substrate and a polyvinyl alcohol type resin layer formed on the substrate, to a lengthwise uniaxial stretching, and dyeing with a dichroic material;

the resin film being a carrier film made of a resin material and bonded to the polarizing film through an adhesive layer, wherein the surface of the carrier film in contact with the adhesive layer has an adhesion force with respect to the adhesive layer, which is weaker than an adhesion force between the optical film and the adhesive layer.

11. The method as defined in claim 1, wherein the cutting along a direction parallel to the length direction is performed to make at least one of the laminate strips to have a width dimension corresponding to a dimension of one of long and short sides of a rectangular panel, and wherein the method further comprises a step of, before the step of winding, forming a plurality of slits in the optical film laminate strip in a width direction thereof at lengthwise given intervals corresponding to one of the long and short sides of the panel, to extend from a surface of the optical film on a side opposite to the resin film to a depth reaching a surface of the resin film adjacent to the optical film to thereby form an optical film sheet supported by the resin film, between lengthwisely adjacent two of the slits.

12. The method as defined in claim 11, wherein, when the optical film laminate strip includes a defect, the two slits are formed across the defect at positions on upstream and downstream sides thereof in a feed direction of the optical film laminate strip and spaced apart from an edge of the defect by a given distance.

13. The method as defined in claim 12, wherein, when a distance between the two slits formed across the defect at positions on the upstream and downstream sides thereof in the feed direction of the optical film laminate strip is greater than the given distance, at least one additional widthwise slit is formed between the two slits formed across the defect at positions on the upstream and downstream sides thereof in the feed direction of the optical film laminate strip to prevent a distance between two of a plurality of widthwise slits to be formed in a region having the defect from becoming greater than the given distance.

14. A method of producing a roll of an optical film laminate strip, comprising the steps of:

forming an optical film laminate which comprises an optical film having at least a continuous web of polarizing film, and a resin film bonded to the optical film, wherein the polarizing film is stretched to a thickness of 10 μm or less and formed to have optical characteristics satisfying the following conditions:

$$P > -(10^{0.929T-42.4}-1) \times 100 \text{ (where } T<42.3\text{); and}$$

$$P \geq 99.9 \text{ (where } T \geq 42.3\text{),}$$

where T is a single layer transmittance, and P is a polarization rate;

applying a reference mark on the optical film laminate, while feeding the optical film laminate in a length direction thereof;

performing a defect inspection for detecting any defect existing in the optical film, while feeding the optical film laminate in the lengthwise direction, and, when a defect is detected, recording the position of the defect in the form of a laminate widthwise position and a laminate lengthwise position as measured from the reference mark;

cutting the optical film laminate along a direction parallel to the lengthwise direction to form a plurality of continuous webs of laminate strips each having a given width;

measuring a lengthwise feed amount of the optical film laminate and a lengthwise feed amount of each of the cut laminate strips to determine that the position of each of the laminate strips corresponding to the reference mark reaches an individual-reference-mark creating position, and, in response to the determination, creating an individual reference mark on each of the laminate strips based on the widthwise position of the defect detected by the defect inspection, determining which of the cut laminate strips has the defect, and, with respect to a specific laminate strip which is determined to have the defect, storing information about the defect together with identification information for identifying the specific laminate strip; and winding each of the laminate strips into a roll.

15. A method of producing a roll of an optical film laminate strip, comprising the steps of:

forming an optical film laminate which comprises an optical film having at least a continuous web of polarizing film, and a resin film bonded to the optical film, wherein the optical film is a polarizing film formed on a continuous web of a thermoplastic resin substrate to have a thickness of 10 μm or less, by a process comprising:

a step of subjecting a laminate comprising the continuous web of thermoplastic resin substrate and a polyvinyl alcohol type resin layer formed on the substrate, to a 2-stage lengthwise uniaxial stretching consisting of preliminary in-air stretching and an in-boric-acid-solution stretching, to attain a total stretching ratio of 5 to 8.5 to thereby reduce the thickness of the polyvinyl alcohol type resin layer to 10 μm or less, and a step of subjecting the laminate to dyeing with a dichroic material, wherein the resin film is the thermoplastic resin substrate stretched together with the polyvinyl alcohol type resin layer; wherein the polarizing film is formed to have optical characteristics satisfying the following conditions:

$$P > -(10^{0.929T-42.4}-1) \times 100 \text{ (where } T<42.3\text{); and}$$

$$P \geq 99.9 \text{ (where } T \geq 42.3\text{),}$$

wherein T is a single layer transmittance, and P is a polarization rate;

applying a reference mark to extend across the optical film laminate in a widthwise direction thereof, in a continuous line pattern or a dotted line pattern consisting of a plurality of dots, while feeding the optical film laminate in a lengthwise direction thereof;

performing a defect inspection for detecting any defect existing in the optical film, while feeding the optical film laminate in the lengthwise direction, and, when a defect is detected, recording the position of the defect in the form of a laminate widthwise position and a laminate lengthwise position as measured from the reference mark;

cutting the optical film laminate along a direction parallel to the lengthwise direction to form a plurality of continuous webs of laminate strips each having a given width;

based on the widthwise position of the defect detected by the defect inspection, determining which of the cut laminate strips has the defect, and, with respect to a specific laminate strip which is determined to have the defect, storing information about the defect together with identification information for identifying the specific laminate strip; and winding each of the laminate strips into a roll.

* * * * *